United States Patent [19]

Eickmann

[11] Patent Number: 4,571,157

[45] Date of Patent: Feb. 18, 1986

[54] PROPELLER WITH AN INTERIOR ARRANGEMENT TO VARIATE THE PITCH

[76] Inventor: Karl Eickmann, 2420 Isshiki, Hayama-machi, Kanagawa-ken, Japan

[21] Appl. No.: 483,977

[22] Filed: Apr. 11, 1983

Related U.S. Application Data

[63] Continuation-in-part of Ser. No. 308,202, Oct. 2, 1981, Pat. No. 4,452,411.

[51] Int. Cl.$^4$ ............................................... B64C 11/38
[52] U.S. Cl. ..................................... 416/158; 416/240
[58] Field of Search ................... 416/158, 156, 240 R, 416/DIG. 5

[56] References Cited

U.S. PATENT DOCUMENTS

| | | | |
|---|---|---|---|
| 1,870,928 | 8/1932 | Smith | 416/156 X |
| 2,173,291 | 9/1939 | Ash | 416/156 X |
| 2,639,775 | 5/1953 | Hunt | 416/156 X |
| 3,292,710 | 12/1966 | Grut | 416/240 X |
| 3,614,260 | 10/1971 | Ellinger | 416/158 X |
| 4,341,176 | 7/1982 | Orrison | 416/DIG. 5 X |

FOREIGN PATENT DOCUMENTS

| | | | |
|---|---|---|---|
| 2290585 | 6/1976 | France | 416/DIG. 5 |
| 248708 | 12/1969 | U.S.S.R. | 416/DIG. 5 |

Primary Examiner—Everette A. Powell, Jr.

[57] ABSTRACT

A rotor having airfoil section shaped blades is set into a fluid stream. Over a connection or transmission means a propeller is connected to the rotor. The fluid stream whereinto the rotor is set gives airflow energy to the rotor and revolves the rotor. The propeller is driven by the rotor over the connection or transmission means. Since the propeller is revolved by the rotor in the fluid stream, the propeller provides a thrust. The thrust may be used to lift a weight or to drive a member. A suitable application of the arrangement is for example, to transform a multibladed helicopter into a gliding craft which descends under a gliding angle towards the surface of the earth, when the helicopter has a complete engine failure. Auto-rotation accidents can thereby become prevented. The device is also applicable to drive a vehicle or to lift a weight. Variable means can be applied to obtain variable thrusts in flying craft to improve their efficiencies or change from one flight system to another flight system. In other embodiments several novel concepts for air-borne craft are provided which include emergency landing devices, retractable and extendable or relation varifying devices for wings or propellers. Improvements are also proposed to engines and hydraulic devices to increase the power or efficiency, to lessen the weight per power output or to simplify the manufacturing and reduce the costs.

1 Claim, 109 Drawing Figures

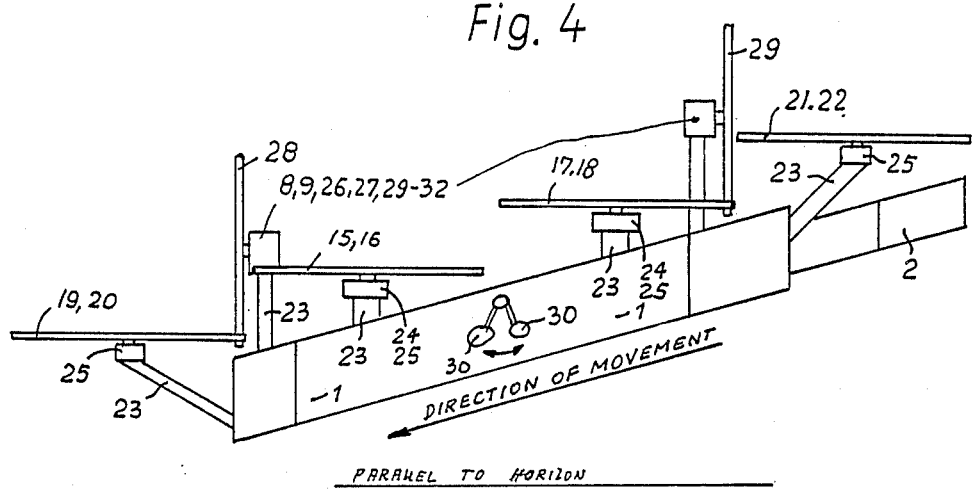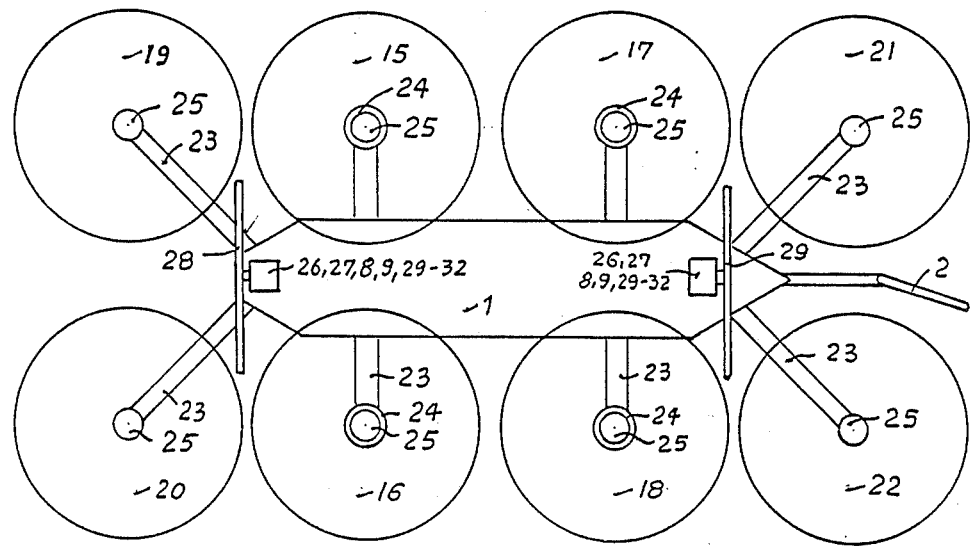

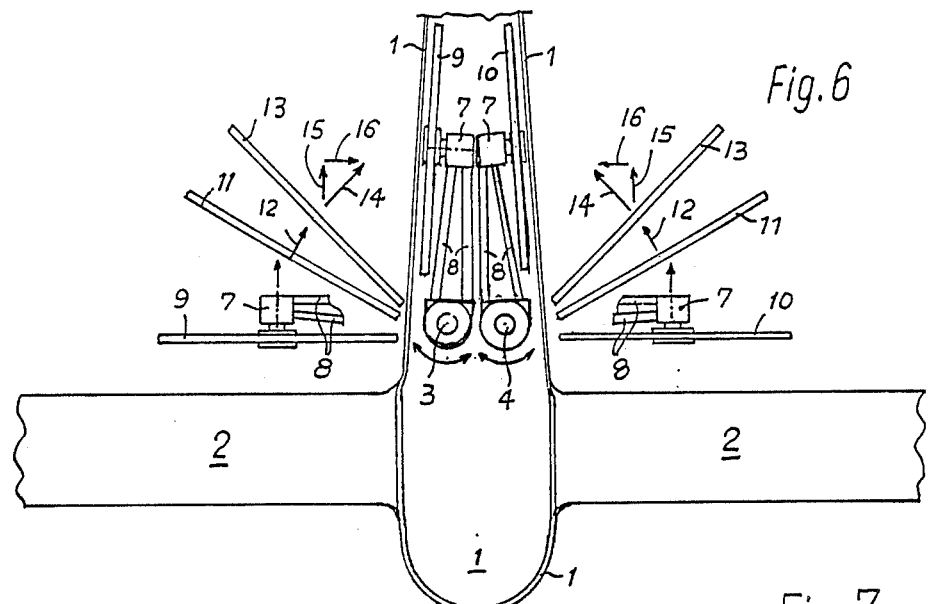
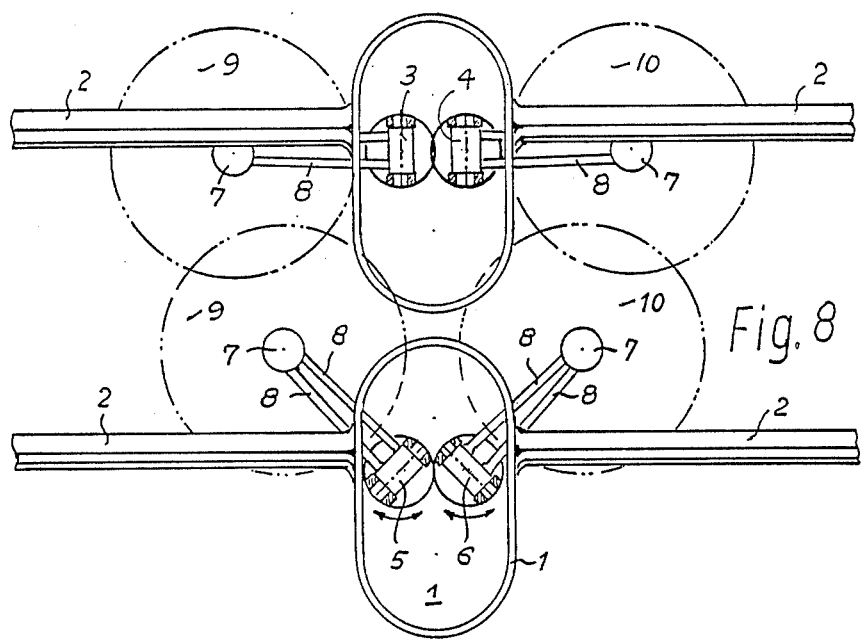

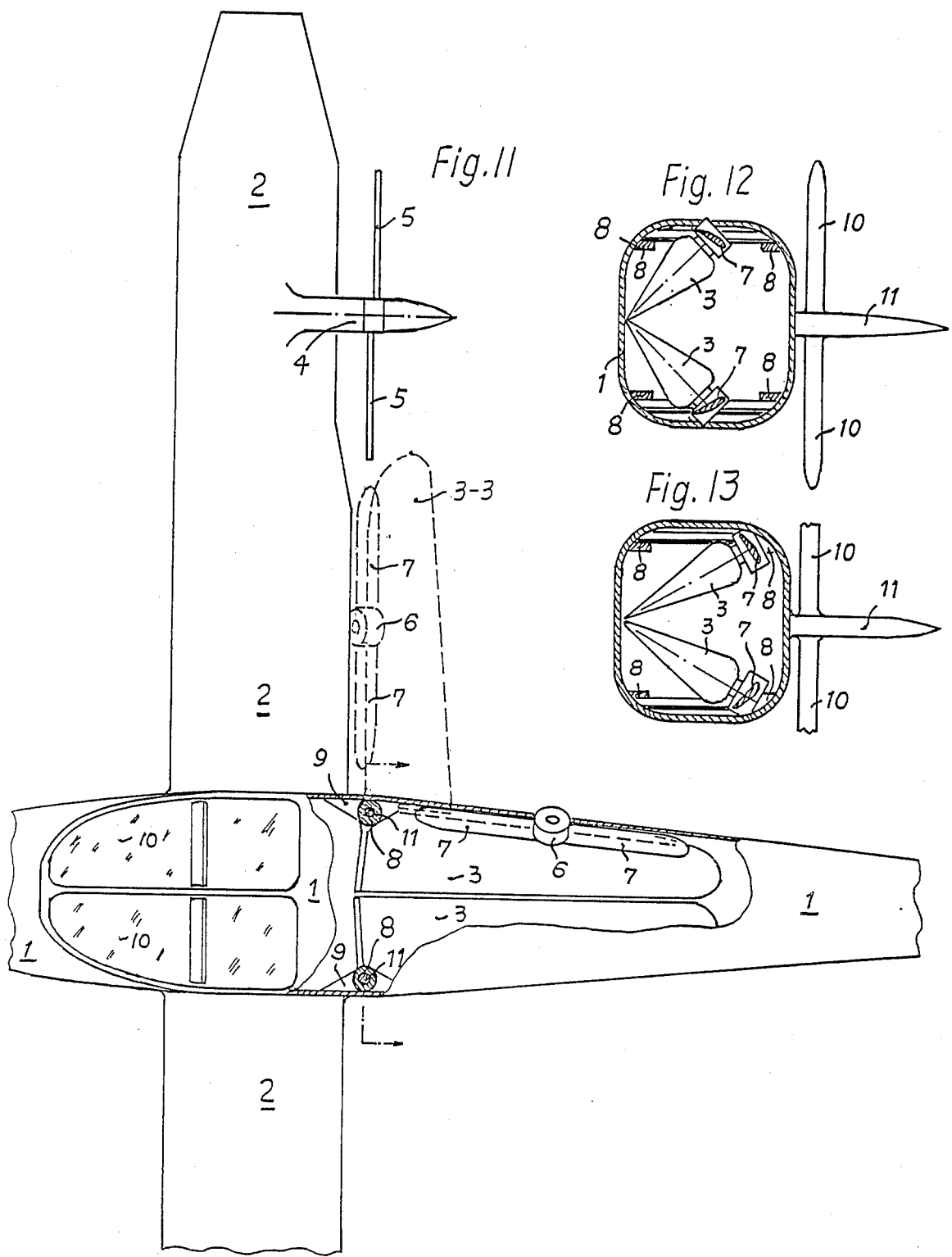

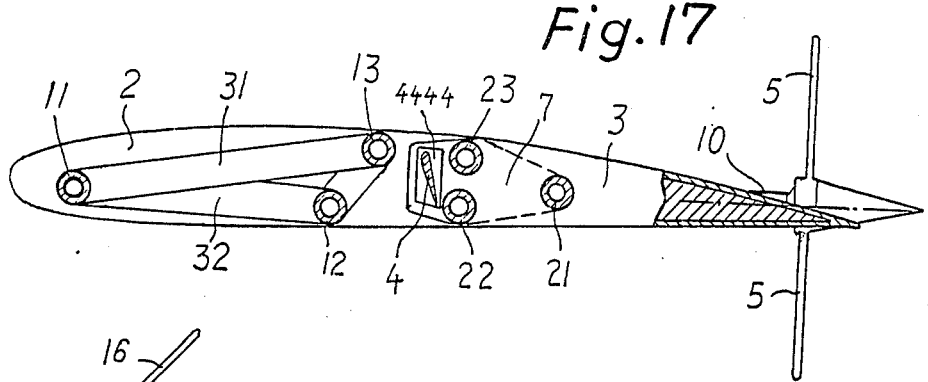
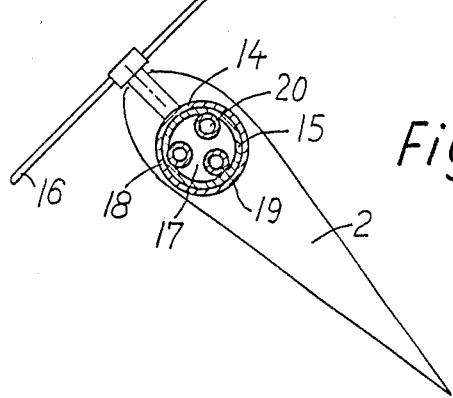
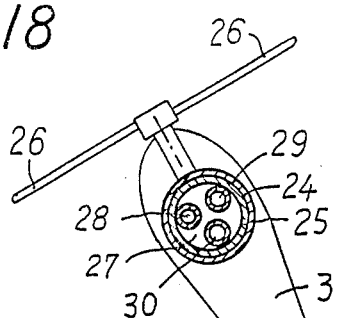
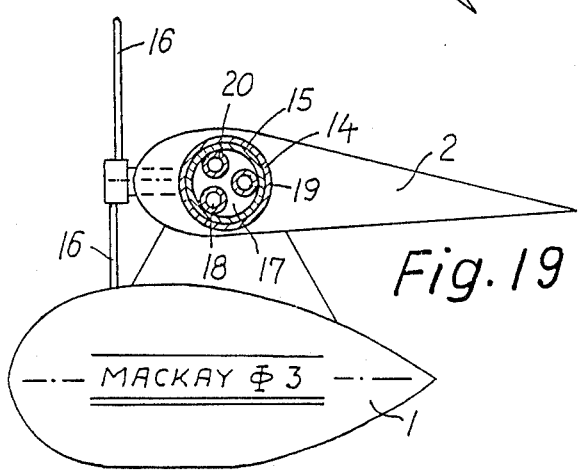
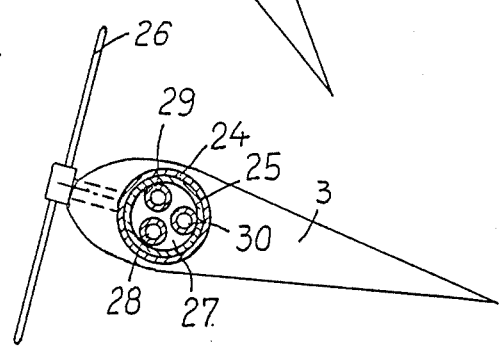

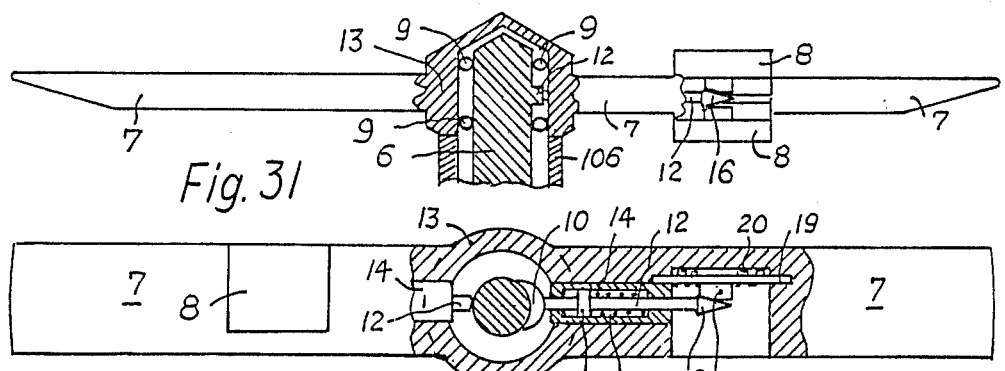
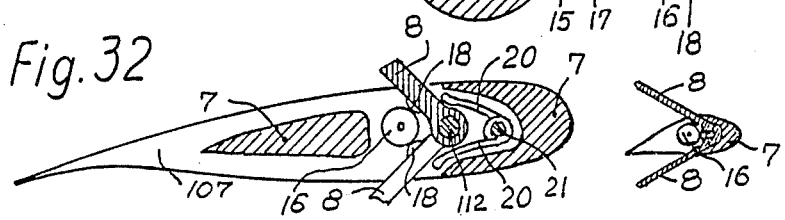
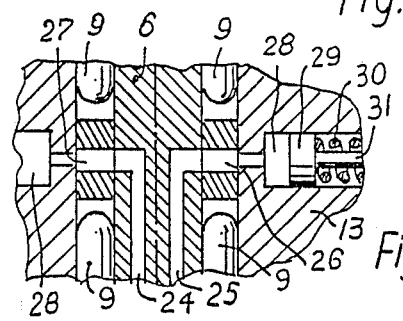
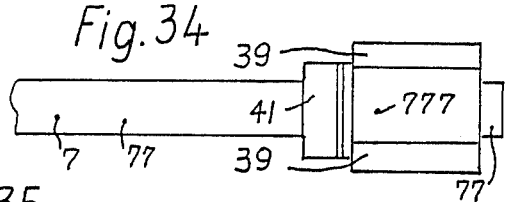
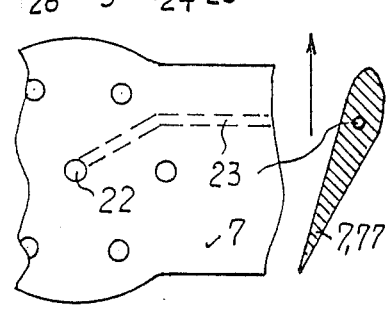
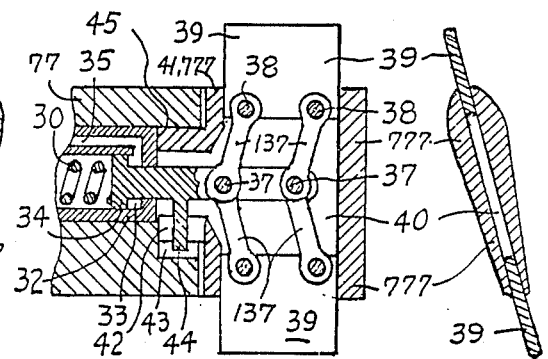

Fig. 36
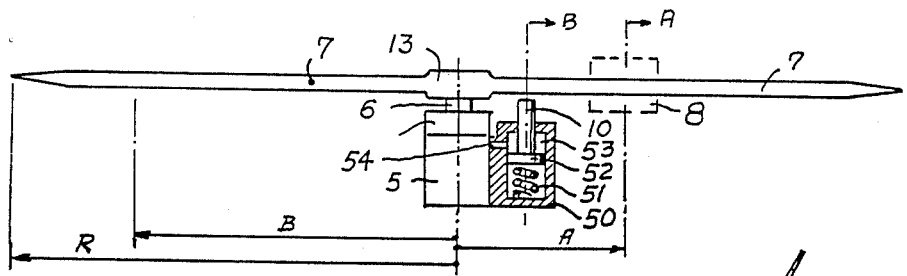
Fig. 37    Fig. 38
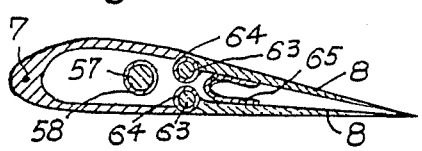    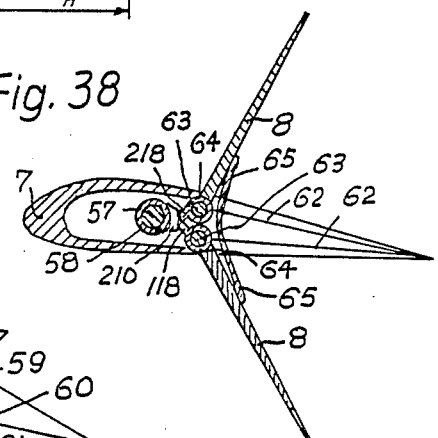
Fig. 39
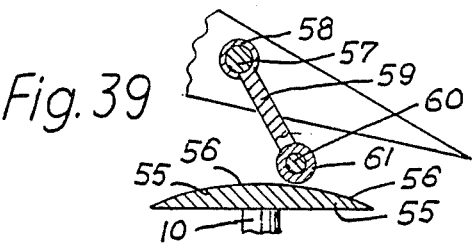
Fig. 40
$W = DRAG = (\vartheta/2) F C_W V_P^2$ with $F$ = Area of blade.
$V_P$ = Velocity of "F" to AIR
$C_W$ = Coefficient of DRAG
$B \approx 0.75 R$    $F_B \approx 0.5 F_{BLADE}$
$W_{LEFT} = W_{RIGHT}:$
$(\vartheta/2) F_L C_{WL} V_L^2 = (\vartheta/2) F_R C_{WR} V_R^2$
$(\vartheta/2) F_L C_{WL} (2B\pi n/60)^2 = (\vartheta/2) F_R C_{WR} (2A\pi n/60)^2$
$F_L C_{WL} B^2 = F_R C_{WR} A^2$
$A = \sqrt{(F_L C_{WL}/F_R C_{WR}) B^2/\eta}$ U.S. Patent  Feb. 18, 1986  Sheet 16 of 39  4,571,157

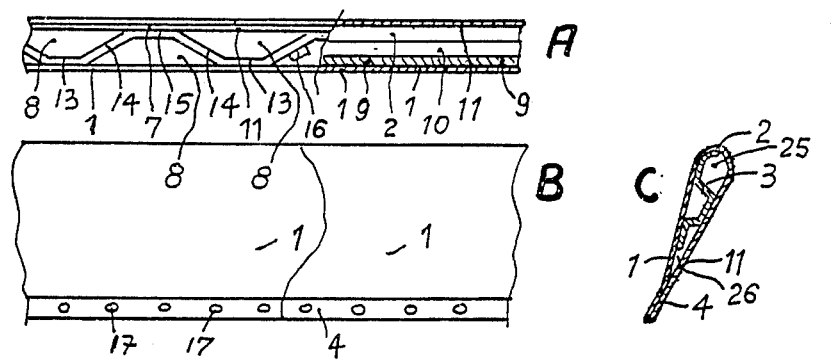
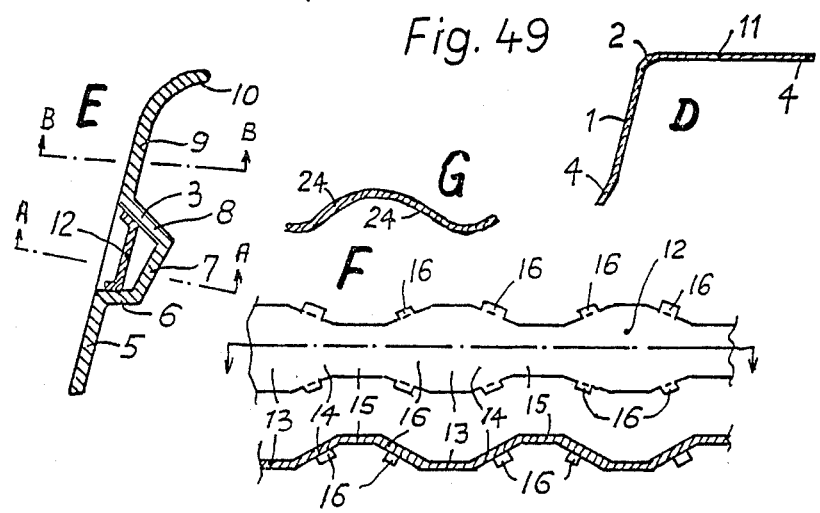
Fig. 49
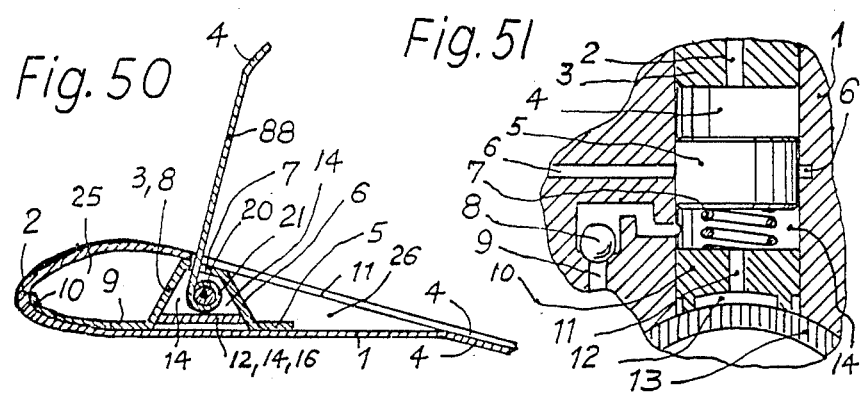
Fig. 50  Fig. 51

Fig. 52

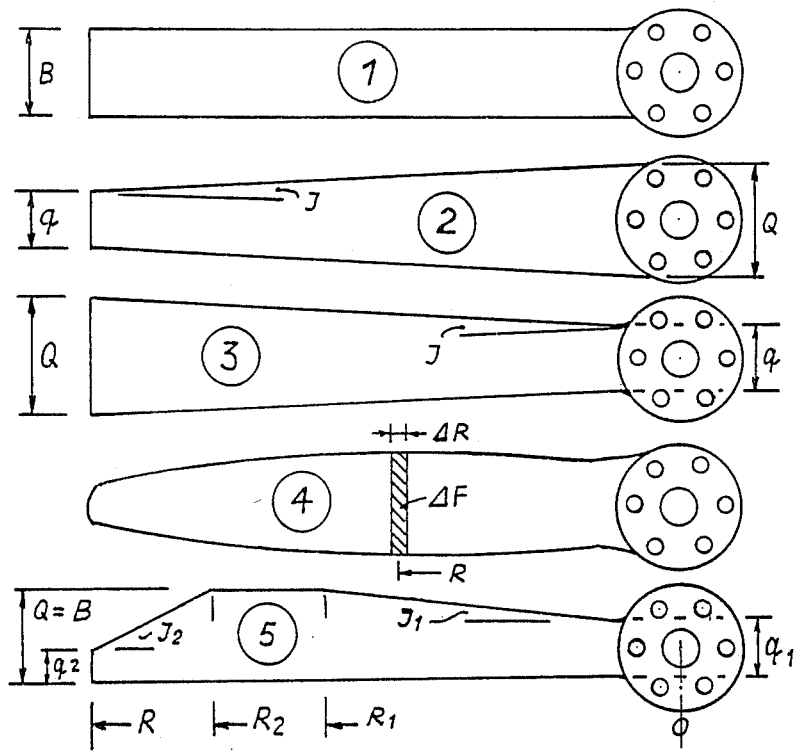

| TYPE | CALCULATION BY: | $N = Md\omega$ |
|---|---|---|
| 1 | $W = MBR^3$ or: $MB(R_2^3 - R_1^3)$<br>$Md = SBR^4$ or: $MB(R_2^4 - R_1^4)$ | $W$ = RESISTANCE<br>$Md$ = TORQUE<br>$N$ = POWER<br>$E = (9/2) C_w \omega^2$<br>$M = (1/3) E$<br>$S = (1/4) E;\ \bar{R} = Md/W$<br>$T = (1/5) E;\ N = \bar{R} W \omega$ |
| 2 | $W = [QM(R_2^3 - R_1^3) - JS(R_2^4 - R_1^4)]$<br>$Md = [QS(R_2^4 - R_1^4) - JT(R_2^5 - R_1^5)]$ | |
| 3 | $W = [qM(R_2^3 - R_1^3) + JS(R_2^4 - R_1^4)]$<br>$Md = [qS(R_2^4 - R_1^4) + JT(R_2^5 - R_1^5)]$ | |
| 4 | $W$ = SUM OF $E(1/2) \Delta F (R_2^2 - R_1^2)$<br>$Md$ = SUM OF $E(1/3) \Delta F (R_2^3 - R_1^3)$ } STEPWISE CALCULATION | |
| 5 | $W = [qM(R_1^3 - 0) + J_1 S(R_1^4 - 0)] + BM(R_2^3 - R_1^3) + [Q'M(R^3 - R_2^3) - J_2 S(R^4 - R_2^4)]$<br>$Md = [qS(R_1^4 - 0) + J_1 T(R_1^5 - 0)] + BS(R_2^4 - R_1^4) + [QS(R^4 - R_2^4) - J_2 T(R^5 - R_2^5)]$ | |

Fig. 53

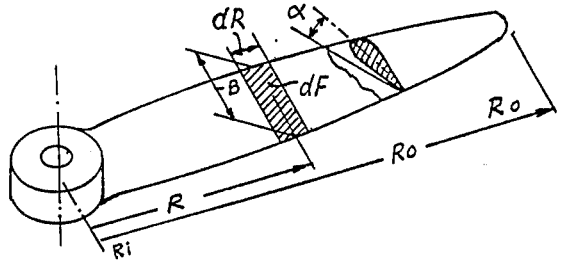

$\omega$ = angular velocity = 1/s $\qquad$ n = Rpm
$\omega = \pi n/30$; $\quad \pi = 3.14\ldots$
$g$ = density of air; f.e. 0.125 Kgs²/m⁴ near sea level.
$C_a$ = Coefficient of Lift $\qquad\qquad$ Md = Moment = TORQUE
$C_w$ = Coefficient of resistance $\qquad$ Lift = W($C_a/C_w$)
W = RESISTANCE $\qquad\qquad\qquad\quad$ $\underline{L}$ = Lift
N = POWER REQUIRED $\qquad\qquad$ $\overline{(\ )}$ = Integral mean values
K = Konstant = $(g/2)C_w$ $\qquad\qquad$ F = AREA
$W = (g/2)C_w F V^2 = KFV^2$ $\qquad$ $L = (g/2)FC_a V^2 = W(C_a/C_w)$
$V = 2R\pi n/60 = m/s =$ $\qquad\qquad$ $V = R\omega$
$E = K\omega^2$ $\quad M = (1/3)E$ $\quad S = (1/4)E$ $\quad T = (1/5)E$

DEVELOPMENT OF THE FORMULAS:

$dV = \omega dR$; $\quad V = \int \omega dR \quad V = \omega R \quad \overline{V} = \int \omega dR/\Delta R = 1/2 \omega R^2$ $dW = K\omega^2 dF R^2 = ER^2 dF = ER^2 dBdR$
$W = \int dW = \int ER^2 \overline{B} dR = E\overline{B} \int R^2 dR = EB(1/3)(R_2^3 - R_1^3)$ if B is constant, as in TYPE ①

$dMd = K\omega^2 R^3 dF = ER^3 dF = ER^3 dBdR$
$Md = \int dMd = \int ER^3 \overline{B} dR = E\overline{B} \int R^3 dR = EB(1/4)(R_2^4 - R_1^4)$ if B is constant For B linear inclined: $\qquad$ J: J introduced. $J = \left(\frac{\Delta Q}{\Delta R}\right)$ TYPE ③: $W = E(q+JR)R^2 dR = Eq\, 1/3 R^3 + EJ\, 1/4 R^4$
$\qquad\qquad Md = E(q+JR)R^3 dR = Eq\, 1/4 R^4 + EJ\, 1/5 R^5$
TYPE ②: $W = E(Q-JR)R^2 dR = EQ\, 1/3 R^3 - EJ\, 1/4 R^4$
$\qquad\qquad Md = E(Q-JR)R^3 dR = EQ\, 1/4 R^4 - EJ\, 1/5 R^5$ OR:
TYPE ③: $\qquad W = Mq(R_2^3 - R_1^3) + SJ(R_2^4 - R_1^4)$
$\qquad\qquad\quad Md = Sq(R_2^4 - R_1^4) + TJ(R_2^5 - R_1^5)$ TYPE ②: $\qquad W = MQ(R_2^3 - R_1^3) - SJ(R_2^4 - R_1^4)$
$\qquad\qquad\quad Md = SQ(R_2^4 - R_1^4) - TJ(R_2^5 - R_1^5)$ TYPE ⑤: CALCULATE INNER-MEDIAL-AND OUTER-PORTIONS BY ABOVE EQUATIONS.
FOR OUTER PORTION USE Q' INSTEAD OF Q. $\quad Q' = q_2 + J_2 R$ $\quad$ (R = R₀ above)

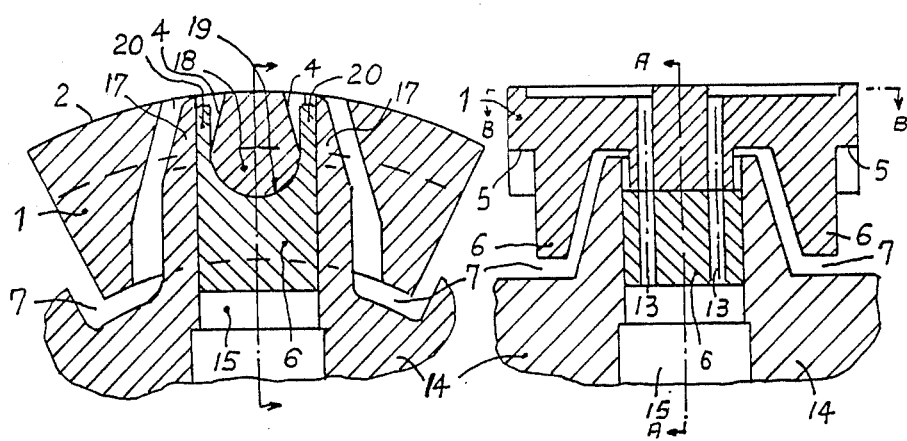
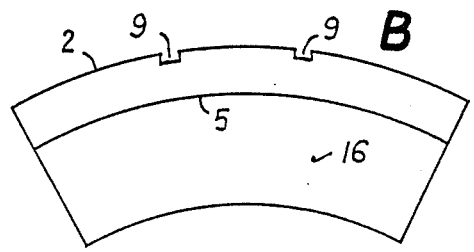
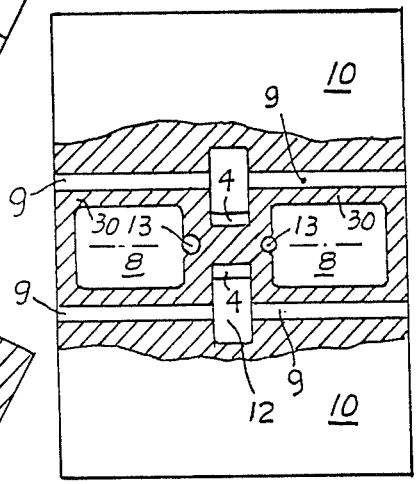
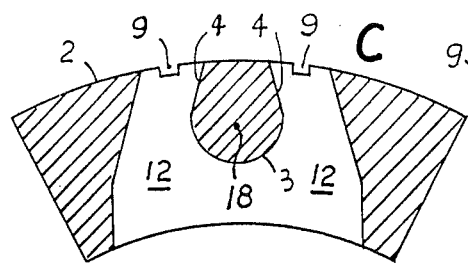

Fig. 60
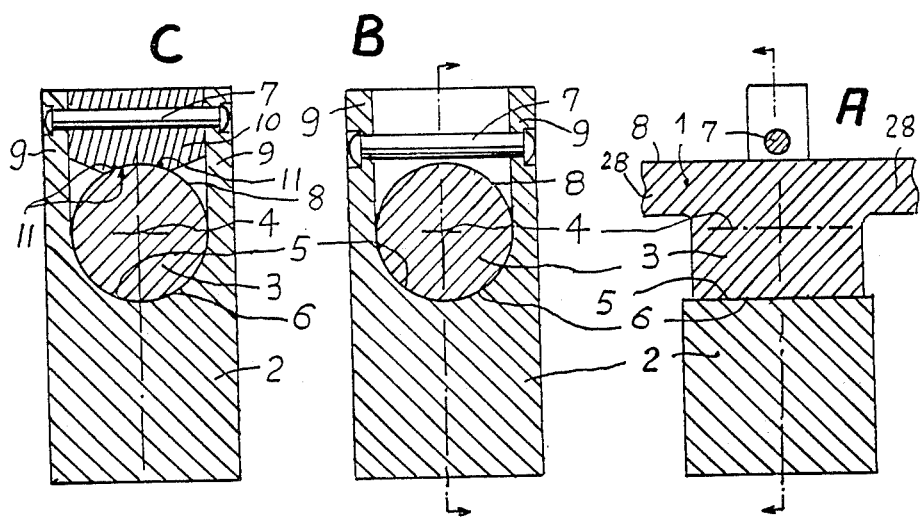
Fig. 62
Fig. 61
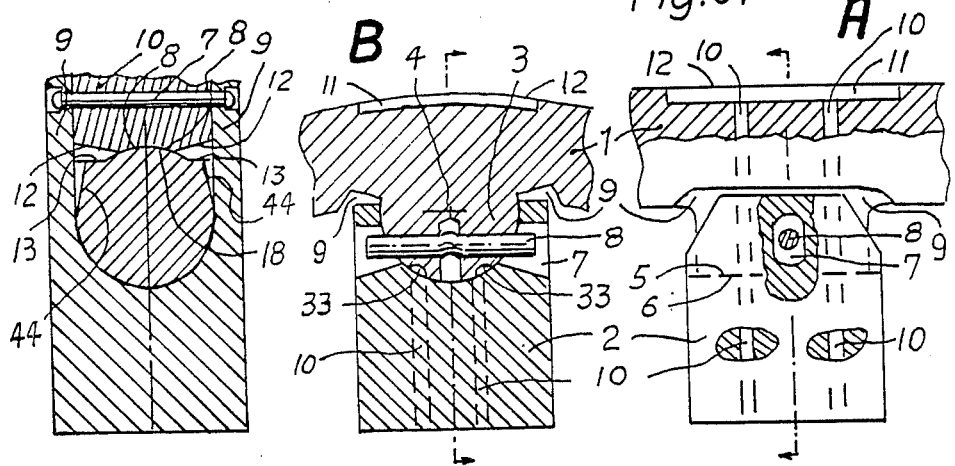

Fig. 63
Fig. 64
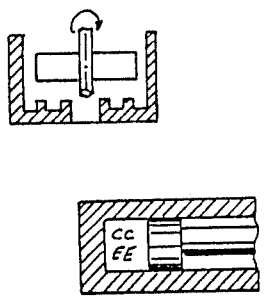
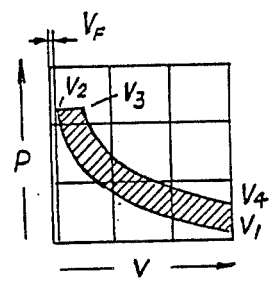
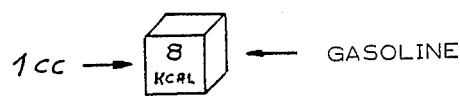
← GASOLINE
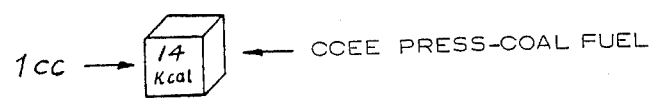
← CCEE PRESS-COAL FUEL

Fig. 65

$$P_1 V_1^{\varkappa} = P_2 V_2^{\varkappa} \qquad \frac{Kg}{cm^2} cm^3 = Kgcm$$

$$P_2 = P_1 (V_1/V_2)^{\varkappa}$$

$$\bar{P} = \text{Medial pressure} = Kg/cm^2$$

$$\bar{P} = P_1 V_1^{\varkappa} \int (1/V_2^{\varkappa}) dH$$

$$= P_1 V_1^{\varkappa} (1/\Delta H) \int V_2^{-\varkappa} dH$$

$$= P_1 V_1^{\varkappa} (1/\Delta H) \frac{1}{1-\varkappa} [V_2^{1-\varkappa}]_1^2$$

$$\bar{P} = P_1 V_1^{\varkappa} \frac{1}{V_2-V_1} \frac{1}{1-\varkappa} [V_2^{1-\varkappa} - V_1^{1-\varkappa}] \qquad \bar{P} = P_1 V_1^{\varkappa} \frac{1}{H_2-H_1} \frac{1}{1-\varkappa} [H_2^{1-\varkappa} - 1]$$

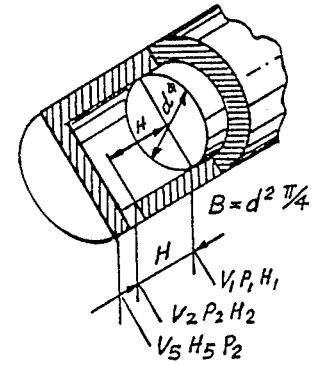

$B = d^2 \pi/4$ $V_1, P_1, H_1$
$V_2, P_2, H_2$
$V_5, H_5, P_2$

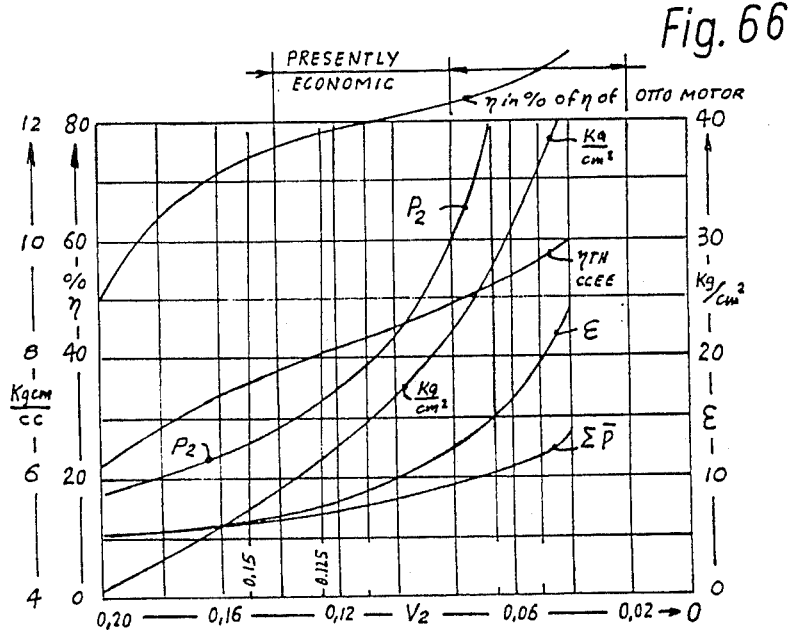

Fig. 66

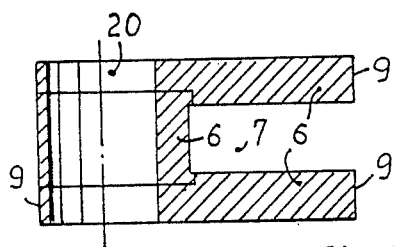
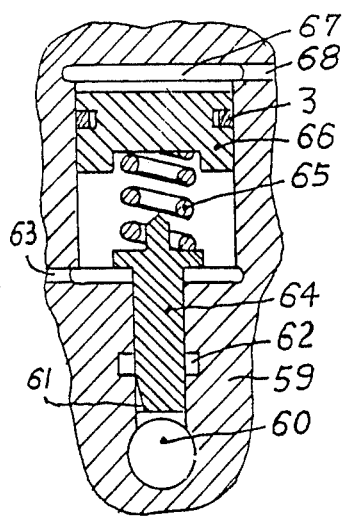
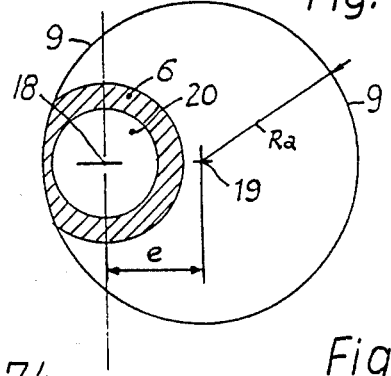
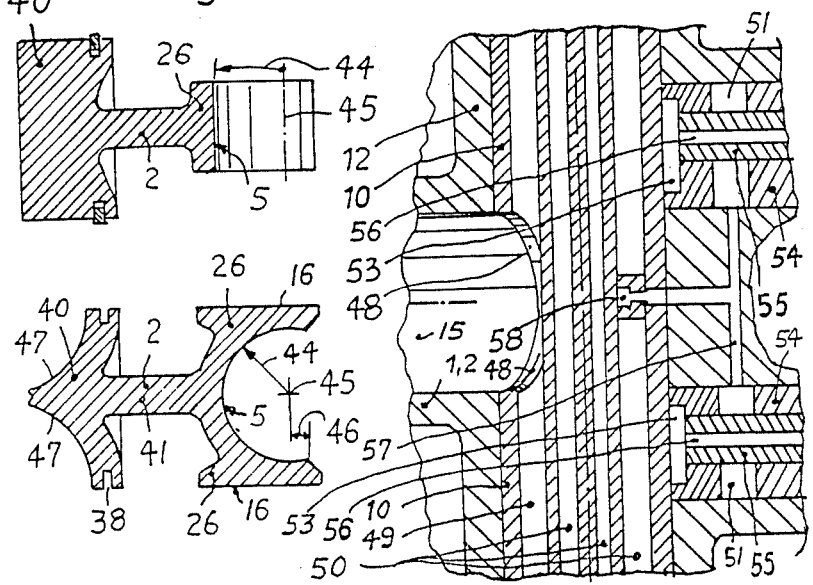

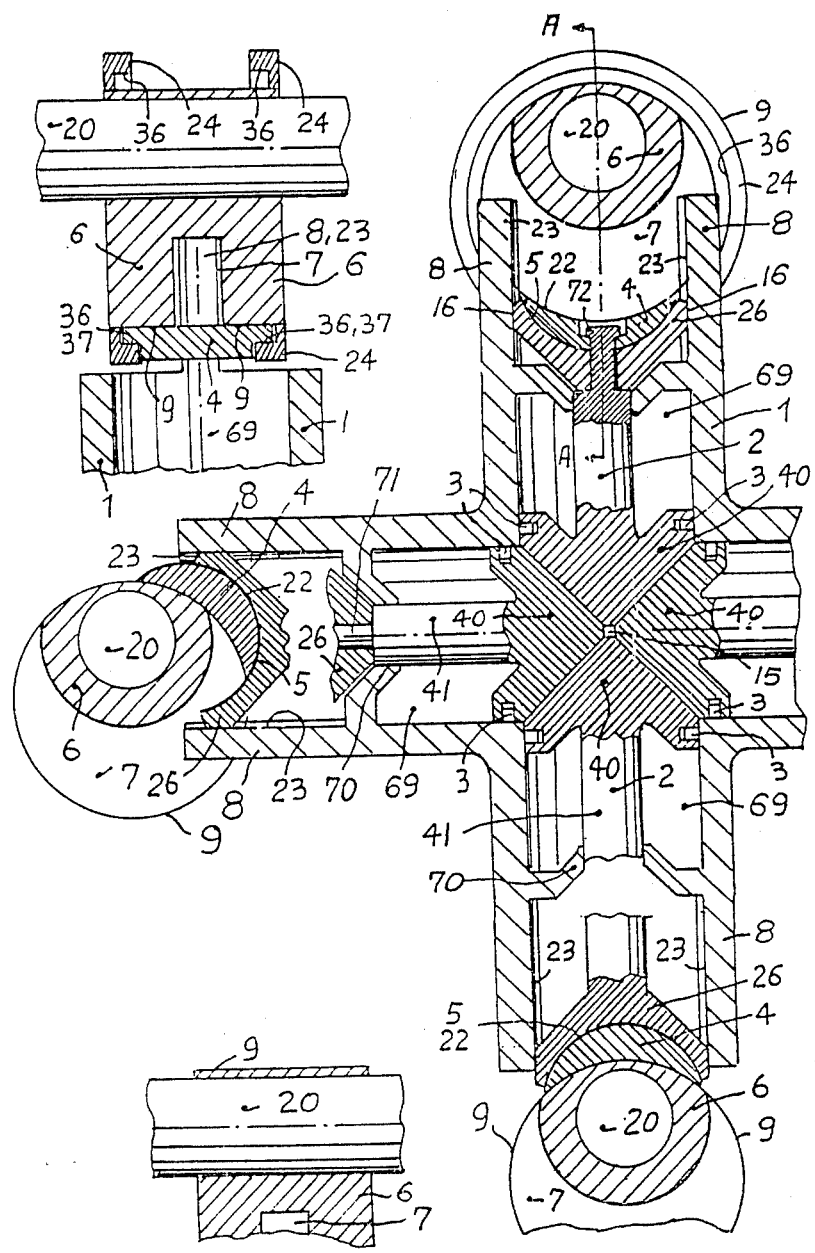

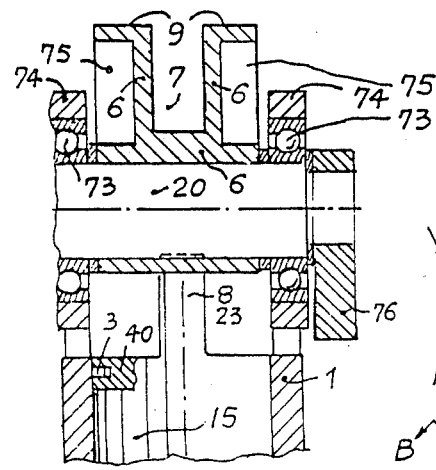
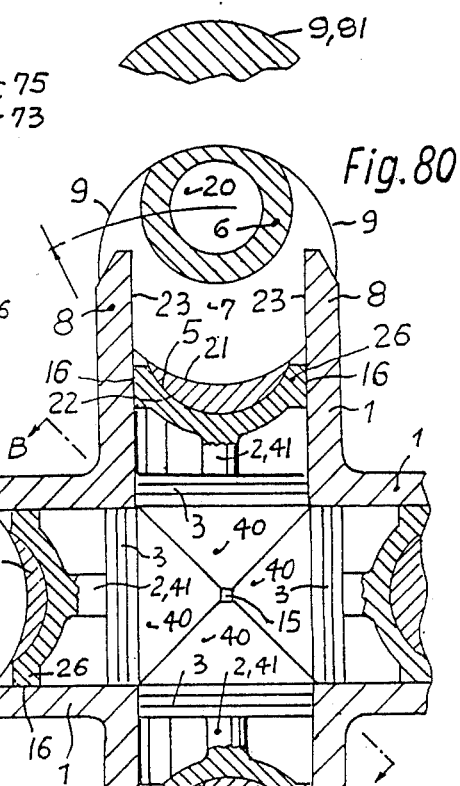
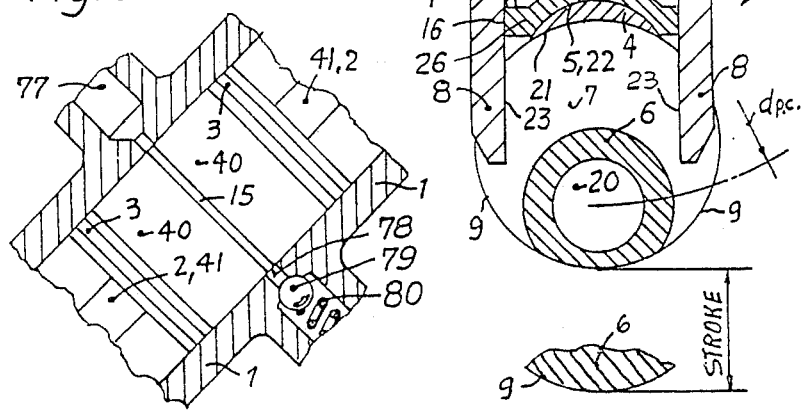
Fig. 80
Fig. 81
Fig. 82

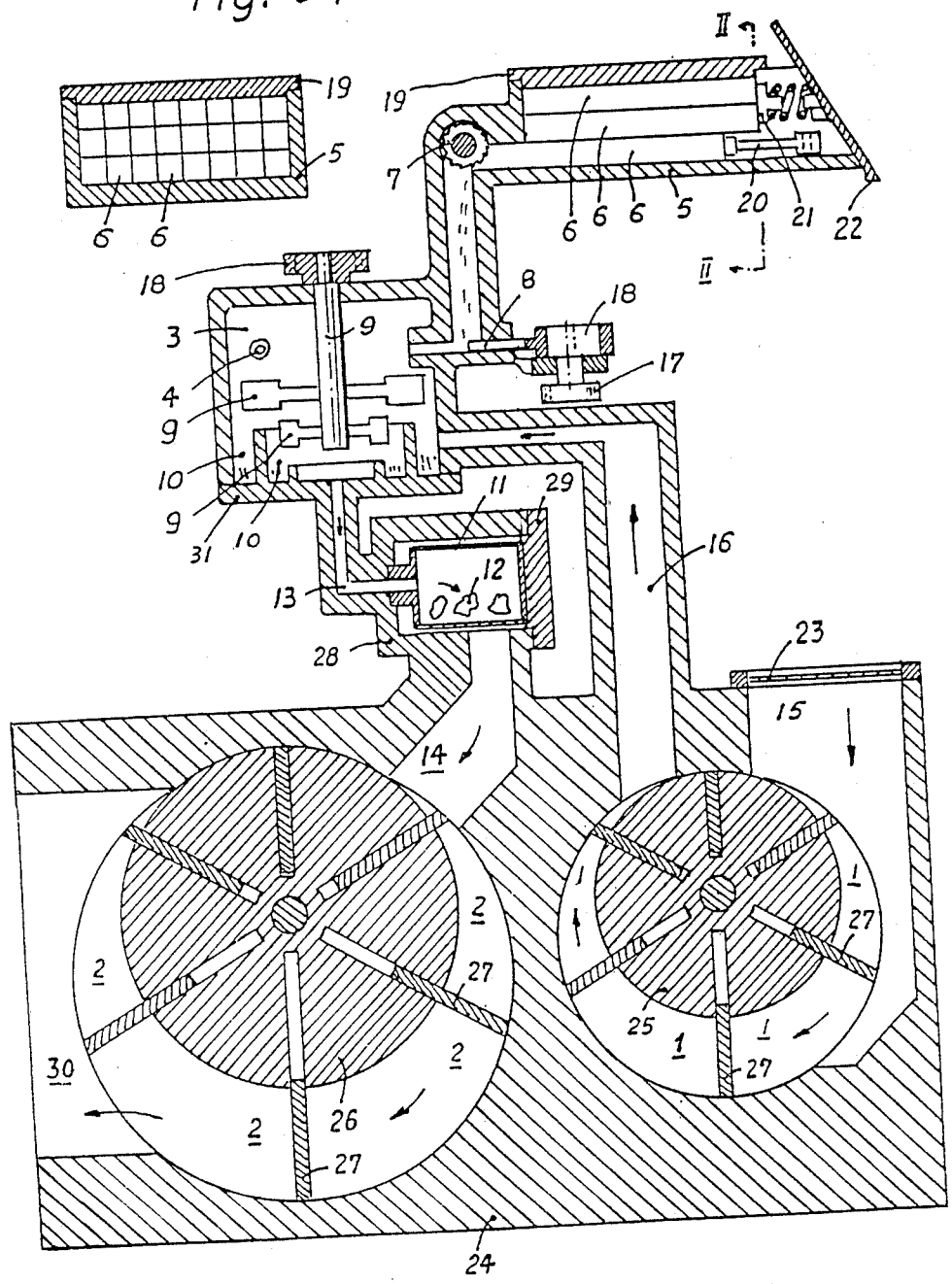

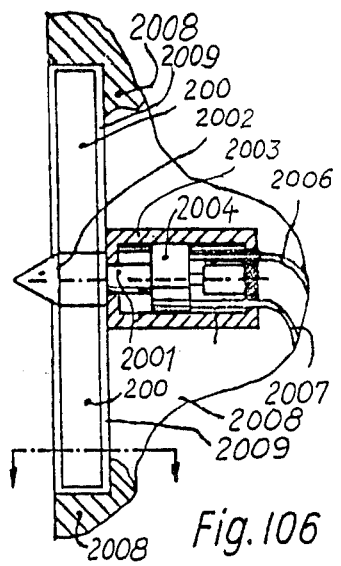
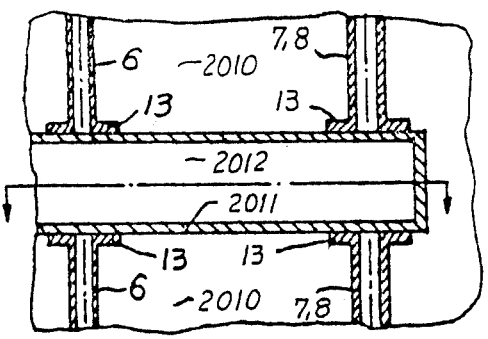
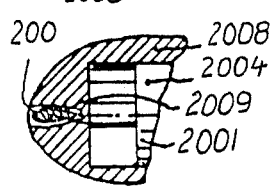
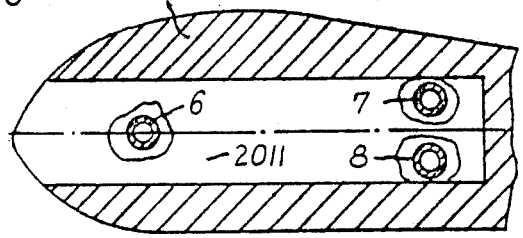
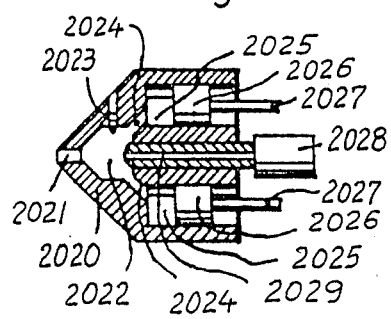
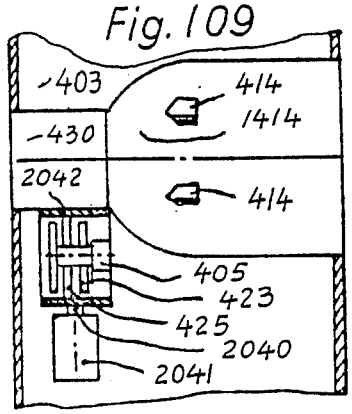

PROPELLER WITH AN INTERIOR ARRANGEMENT TO VARIATE THE PITCH

REFERENCE TO A RELATED APPLICATION

This is a continuation-in-part application of my copending patent application, Ser. No. 308,202 which was filed on Oct. 2, 1981, and which issued as U.S. Pat. No. 4,452,411 on June 5, 1984.

BACKGROUND OF THE INVENTION

1. Field of the Invention

This invention relates to flying or floating craft and to devices which utilize a flowing fluid or movement of a body in fluid to create a rotation and/or lift or thrust.

2. Description of the Prior Art

Helicopters were commonly provided with an autorotation arrangement. However the descending speed of the helicopter in auto-rotation is rather high. The "descent-speed slow down"-maneuver is a delicate proceedure which often fails and the helicopter crashes. The trend of development of helicopters is presently to reduce the weights. Also the weights of the rotors becomes reduced. That reduces as a side effect the time of the landing maneuver in auto-rotation and thereby increases the chance of failure of the landing maneuver, whereby the likeliness of a crash increases, when the engine of the helicopter fails.

In motor powered gliders it was custom in the former art to swing a motordriven propeller into and out of the craft, when a change-over from motorless gliding to powered gliding and vice versa was desired. The swing out of the propeller resulted in a negative influence on the flight path of the glider. The sudden appearance and disappearance of the drag of the propeller brought a negative influence on the speed and stability of the glider in the surrounding air.

SUMMARY OF THE INVENTION

It is the main object to overcome the problems and difficulties of the described former art and in addition to provide a fluid—flow responsive thrust—and/or rotation providing device.

Another object of the invention is, to provide to a helicopter a capability to glide similar to a glider down to the earth under an angle of inclination relatively to the ground when the power plant of the helicopter fails.

More objects of the invention are, for example; to provide:

(1) A device which may be capable of travel in air, for example, a helicopter or an aircraft, or devices which may be applied therein or in other vehicles or machines, wherein an improvement is provided, which provides an improved efficiency or power to the device, decreases its weight per power or simplifies the manufacturing thereof;

(2) The device of (1), wherein a fluid-stream responsive thrust arrangement is provided, which may be a fluid flow responsive, propeller containing, thrust providing, unit or a resistance body extendable and retractable provided to an arm of a propeller;

(3) The device of (1), wherein an arrangement is provided to maintain automatically an angle of autorotation of a propeller blade as long as the blade is in its natural shape, while the arrangement includes a fluid pressure responsive control arrangement which increases automatically the pitch of the propeller blade, when a power plant drives a fluid pump and supplies pressure to the said control arrangement in order to have a propeller pitch of helicopter flight performance when the power plant operates with the respective power and to have the angle of attack of the propeller blade automatically returned to its natural angle of autorotation or of gyrocopter performance, when the power plant or fluid supply fails in flight or when the power plant is turned off;

(4) The device of (1), wherein an arrangement is provided which automatically changes a helicopter into a glider, borne on revolving propellers, when the power plant(s) respectively fails (fail);

(5) The device of (1), wherein means are provided to retract a wing-portion, propeller, revolving disc or any other suitable arrangement entirely or partially into the body of the craft or into a medial propeller blade holder in response to a command or in automatic response to a respective pressure in fluid in a fluid flow supply arrangement;

(6) The device of (1), wherein second wing portions are provided relatively to first wing portions, while said first and second wing portions or one or more thereof are provided with means to change their location or angular relationship relatively to the other of said first and second wing portions;

(7) The device of (1), wherein a wing is provided which is constructed by the arrangements of FIGS. 20 to 22 or of FIGS. 23 to 27, or of FIG. 49 or FIG. 50;

(8) The device of (1), wherein the equations and/or diagrams of FIGS. 52 to 56 or of FIG. 40 are utilized to improve the performance of an airborne craft or the behaviour of such craft;

(9) The device of (1), wherein piston shoes, pisons or rotors of one or more of FIGS. 57 to 62 are provided;

(10) The device of (1), wherein one or more of the arrangements or details of FIGS. 63 to 59 are utilized or provided;

(11) An aircraft having a body with a longitudinal imaginary vertical medial plane through said body and a pair of first wing portions extending laterally from said body, one wing of said pair in one lateral direction of said plane and the other wing of said pair extending symmetrically in the opposite direction of said plane, wherein said wings of said pair include fluid lines to a pair of fluid motors which revolve propellers which are fastened to the rotors of said motors, wherein a second pair of secondary wings is provided in said craft, while one wing of said pair of secondary wings extends laterally of said medial plane and the other wing of said secondary wings extends from said body symmetrically in the opposite direction of said plane, wherein said secondary pair of wings includes fluid lines to secondary fluid motors which revolve secondary propellers which are fastened to the rotors of the motors of said secondary wing pair, wherein flexible means are included in said fluid lines, wherein said secondary wing pair includes flexibility arrangements to permit a change of the loacation or direction of said wings of said secondary pair, and wherein said secondary wings are variable in their position relatively to said first wing pair in order to obtain suitable flight conditions of said craft at different speeds of forward movement of said craft.

More objects of the invention and features obtained by one or more embodiments of the invention will become apparent from the description of the preferred embodiments of the invention.

FIG. 4 shows an aircraft of the invention seen from the side.

FIG. 5 is a view to the craft of FIG. 4 from above.

FIG. 6 shows an aircraft of the invention seen from above.

FIG. 7 shows the craft of FIG. 6 from the front.

FIG. 8 shows the craft of FIG. 6 from the front in a modified condition.

FIG. 11 shows another aircraft of the invention seen from above.

FIG. 12 is a sectional view through FIG. 11 along the arrowed line thereof.

FIG. 13 is a sectional view as in FIG. 12, however with modified parts.

FIG. 17 is a view as in FIG. 14, however with a modification of a portion.

FIG. 18 is a sectional, longitudinal view through wing portions.

FIG. 19 is a view as in FIG. 18, however with a modification.

FIG. 30 is a longitudinal sectional view through a propeller, partially seen from the rear of it.

FIG. 31 shows the propeller of FIG. 30 partially from above, partially by a horizontally laid sectional view.

FIG. 32 is a cross-sectional view through FIG. 30 along the arrowed line.

FIG. 33 is a longitudinal sectional view through a medial propeller portion.

FIG. 34 shows a propeller portion seen from the rear.

FIG. 35 shows sectional views through a propeller portion.

FIG. 36 shows a propeller seen from the rear and a portion in section.

FIG. 37 shows a cross-sectional view through FIG. 36 along arrowed line A.

FIG. 38 shows a view as in FIG. 37, however with a modification.

FIG. 39 shows a cross-sectional view through FIG. 36 along the arrowed line B.

FIG. 40 shows a mathematical evaluation and analysis.

Figure 46:
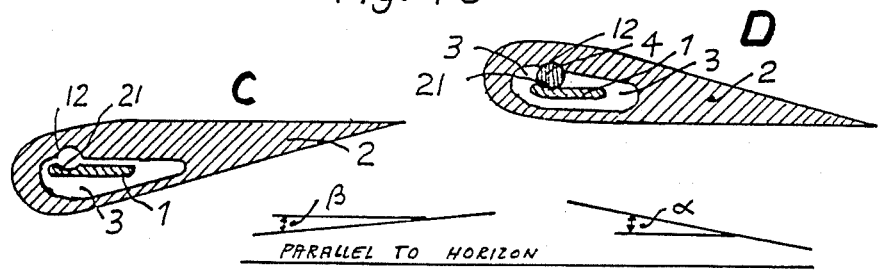
FIG. 46 shows sectional views through an arrangement to a propeller.
Figure 47:
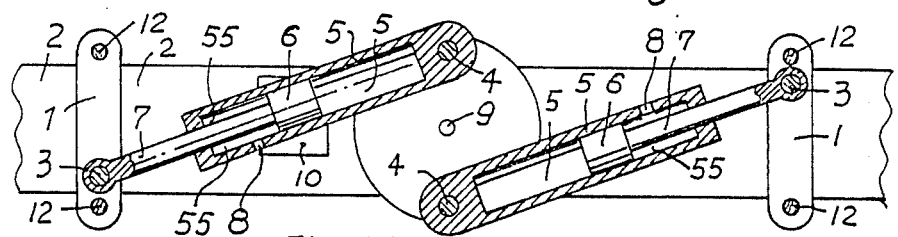

FIG. 47 demonstrates details of FIG. 46.

FIG. 47 is a cross-sectional view through FIG. 47 along the arrowed line.

FIG. 49 shows sectional views through a wing or propeller.

FIG. 50 shows a modification of FIG. 49.

FIG. 51 is a longitudinal sectional view through an automatic controller.

FIG. 52 demonstrates a mathematical analysis with formulas.

FIG. 53 demonstrates how the formulas of FIG. 52 were developed.

Figure 54:
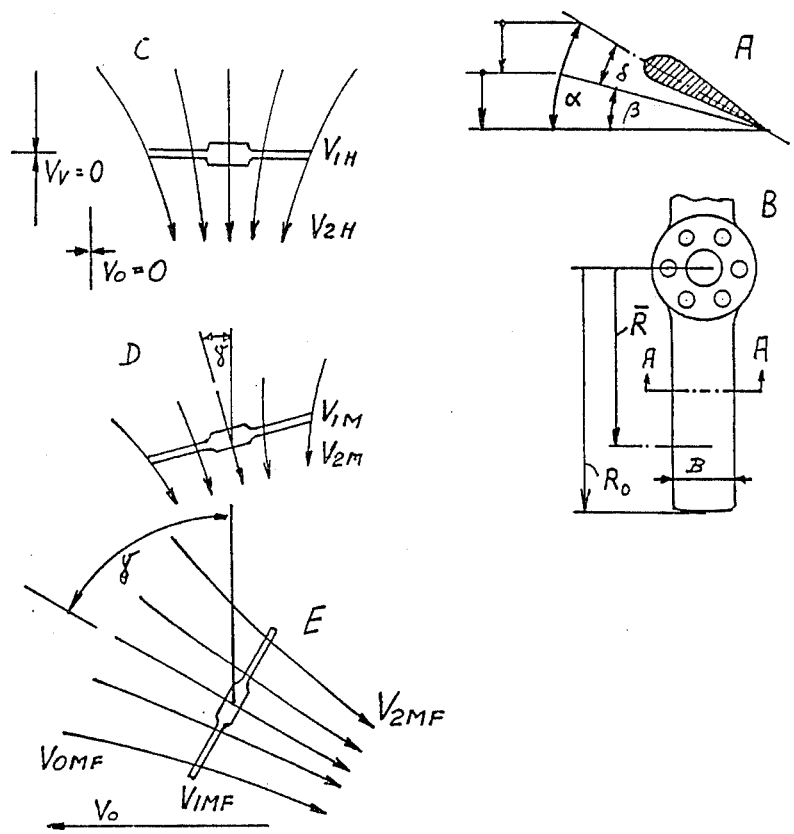

FIG. 54 demonstrates an analysis related to propellers.

Figure 55:
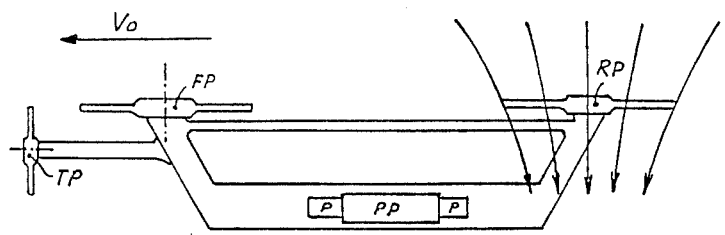

FIG. 55 demonstrates the influence thereof to a vehicle.

Figure 56:
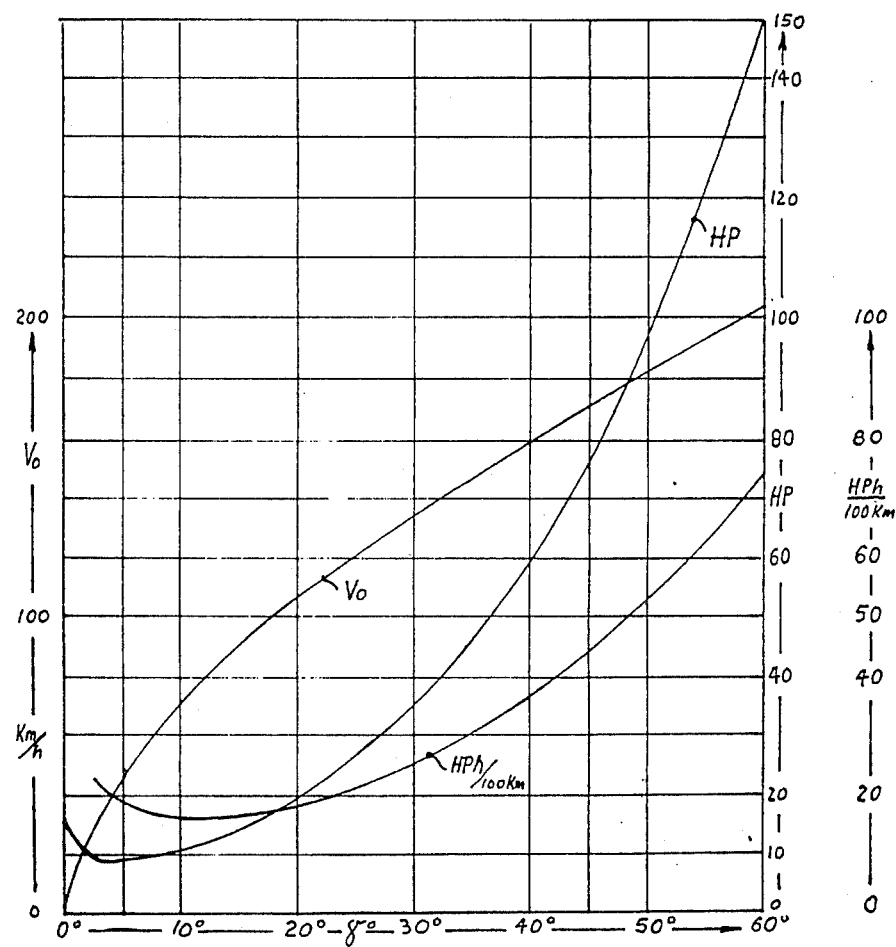

FIG. 56 shows a diagram in relation to FIG. 55.

FIG. 57 is a longitudinal sectional view through an arrangement.

FIG. 58 is a sectional view through FIG. 57 along the arrowed line therein.

FIG. 59 shows the shoe of FIGS. 57 and 8, separatedly shown.

FIG. 60 shows sectional views through a piston with shoe arrangement.

FIG. 61 shows another piston and shoe arrangement partially in sections.

FIG. 62 is a sectional view through a further piston and shoe arrangement.

FIG. 63 shows a schematic explanation.

FIG. 64 shows another schematic explanation.

FIG. 65 shows another schematic explanation.

FIG. 66 shows another schematic explanation.

Figure 67:
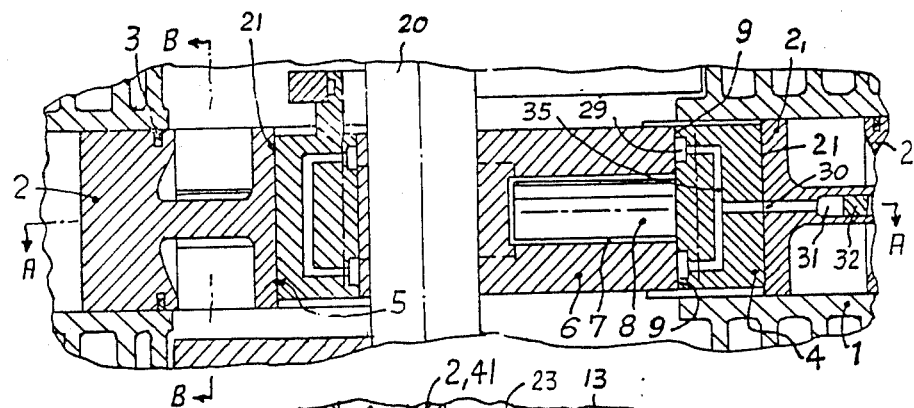

FIG. 67 is a longitudinal sectional view through an engine.

Figure 27:
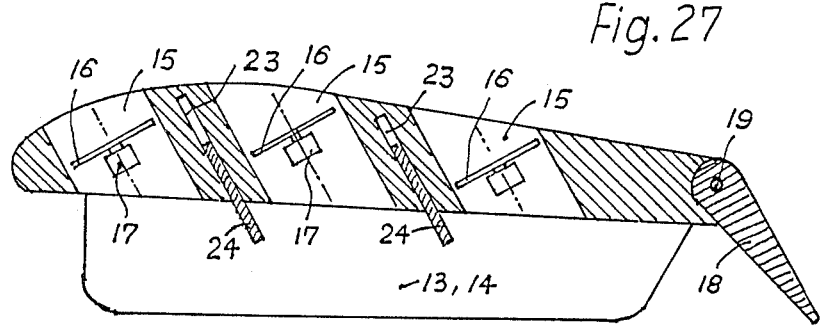
FIG. 27 is a longitudinal sectional view through a modification of FIG. 23.
Figure 68:
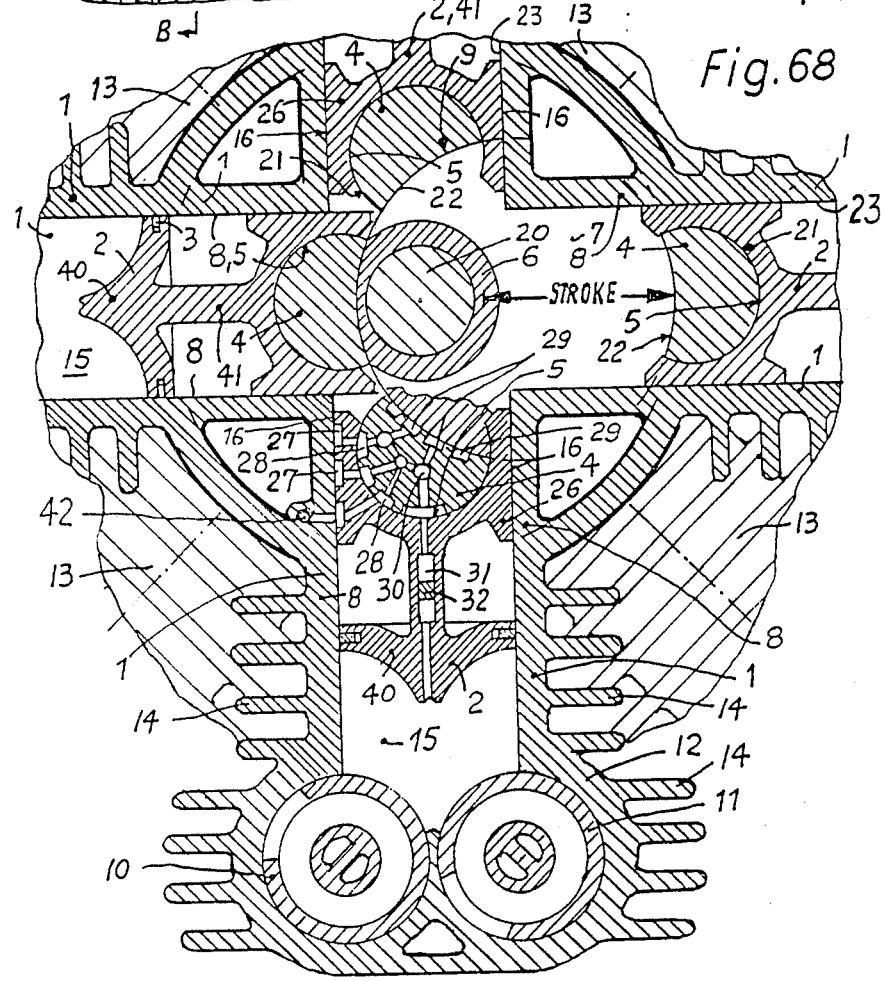

FIG. 68 is a cross-sectional view through FIG. 27 along the line A—A.

Figure 69:
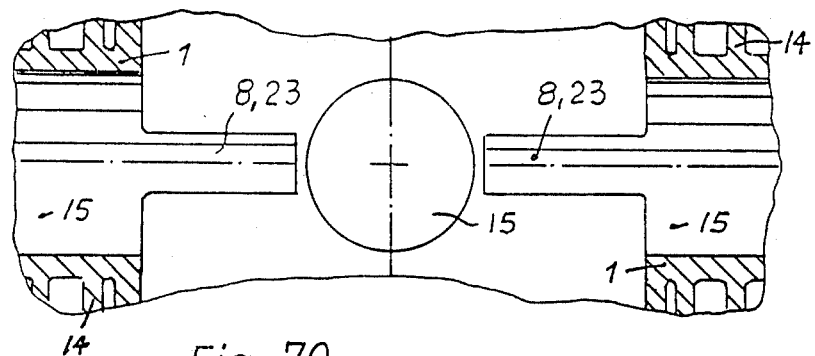

FIG. 69 shows a part of FIG. 27 in a sectional view.

Figure 70:
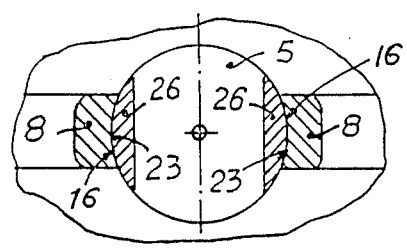

FIG. 70 shows a part of FIG. 27 in a sectional view.

Figure 71:
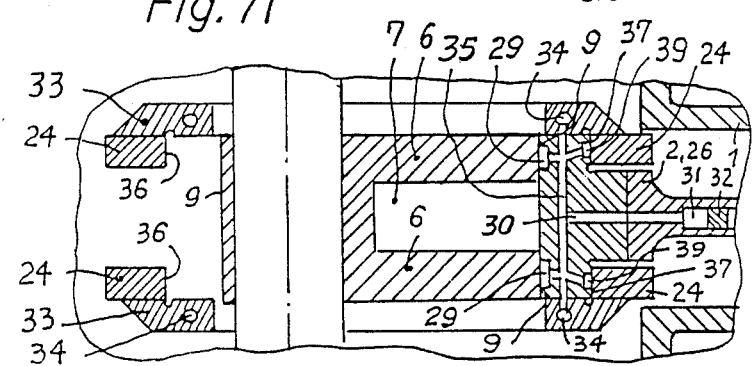

FIG. 71 shows a part of FIG. 27 in a sectional view.

FIG. 72 shows a part of FIG. 27 in a sectional view.

FIG. 73 is a sectional view through FIG. 32 along

FIG. 74 shows sectional views through a piston of FIG. 27.

Figure 75:
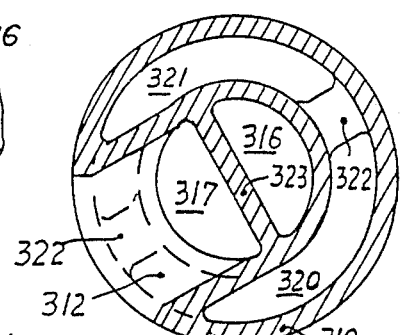

FIG. 75 is a cross-sectional view through a rotary valve.

FIG. 76 is a longitudinal sectional view through a rotary valve.

FIG. 77 is a longitudinal view through a control device.

FIG. 78 is a cross-sectional view through another engine.

FIG. 79 is a sectional view through FIG. 38 along the line A—A.

FIG. 80 is a cross-sectional view through still a further engine.

FIG. 81 is a sectional view through FIG. 40 along the line A—A.

FIG. 82 is a sectional view through FIG. 40 along the line B—B.

Figures 83, 84, 85:
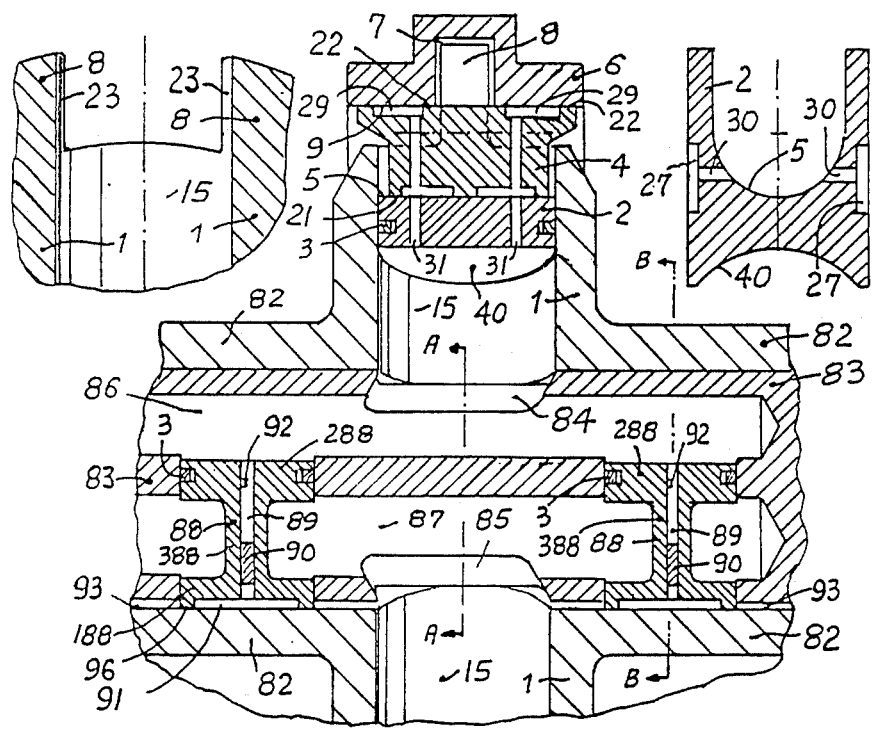

FIG. 83 is a longitudinal sectional view through a further engine.

Figure 43:
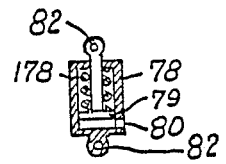
FIG. 43 shows a longitudinal sectional view through a controller.

FIG. 84 shows a sectional view of the piston of FIG. 43.

FIG. 85 shows a portion of a rotor of FIG. 43 in sectional view.

Figures 86, 87:
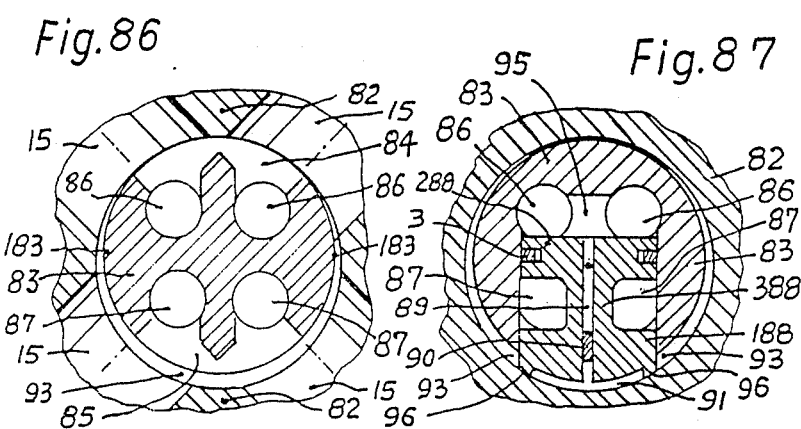

FIG. 86 is a sectional view through FIG. 43 along A—A.

FIG. 87 is a sectional view through FIG. 43 along B—B.

Figure 88:
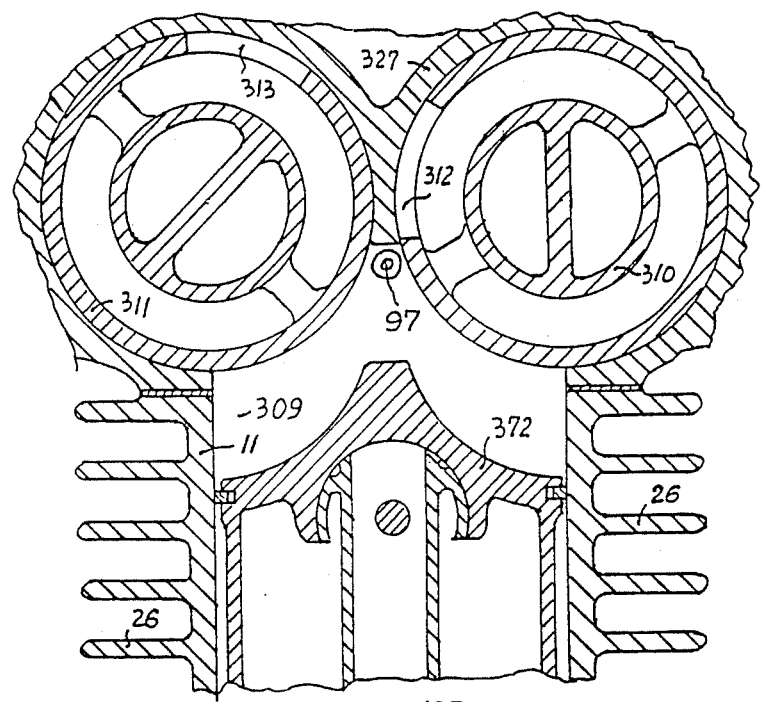

FIG. 88 is a sectional view through a portion of a cylinder and head.

Figure 89:
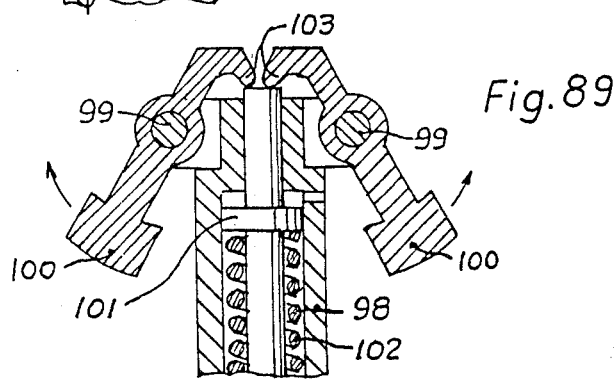

FIG. 89 is a sectional view through another control device.

Figure 90:
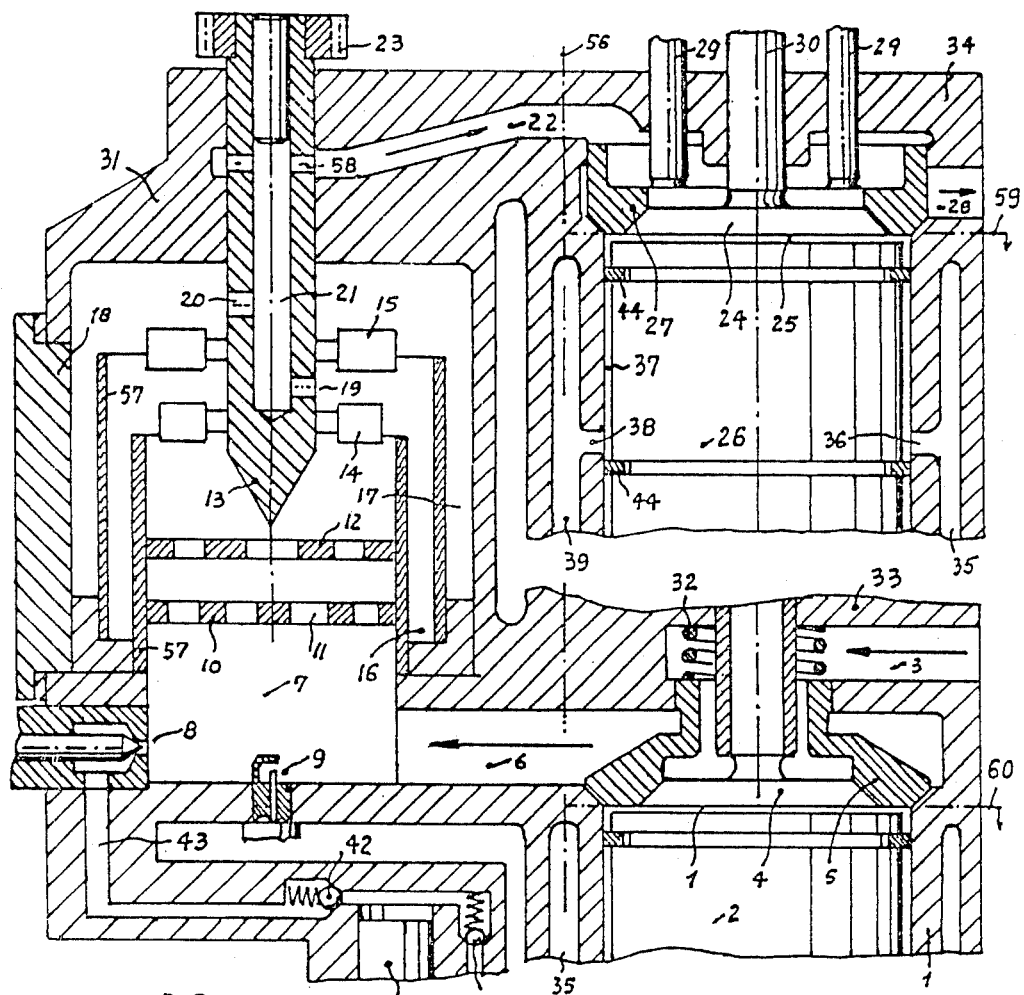

FIG. 90 is a sectional view through an engine of the invention.

Figure 91:
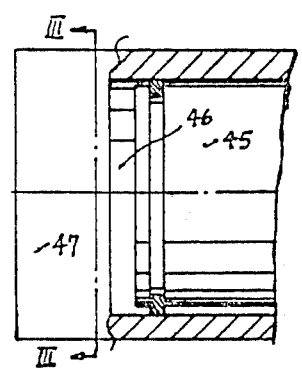

FIG. 91 is partially a sectional view through an engine portion.

Figure 92:
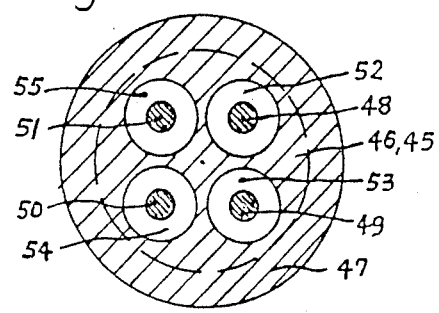

FIG. 92 is a sectional view through FIG. 91 along line III—III.

FIG. 93 is a sectional view through another engine of the invention.

FIG. 94 is a sectional view through FIG. 93 along line II—II.

Figure 95:
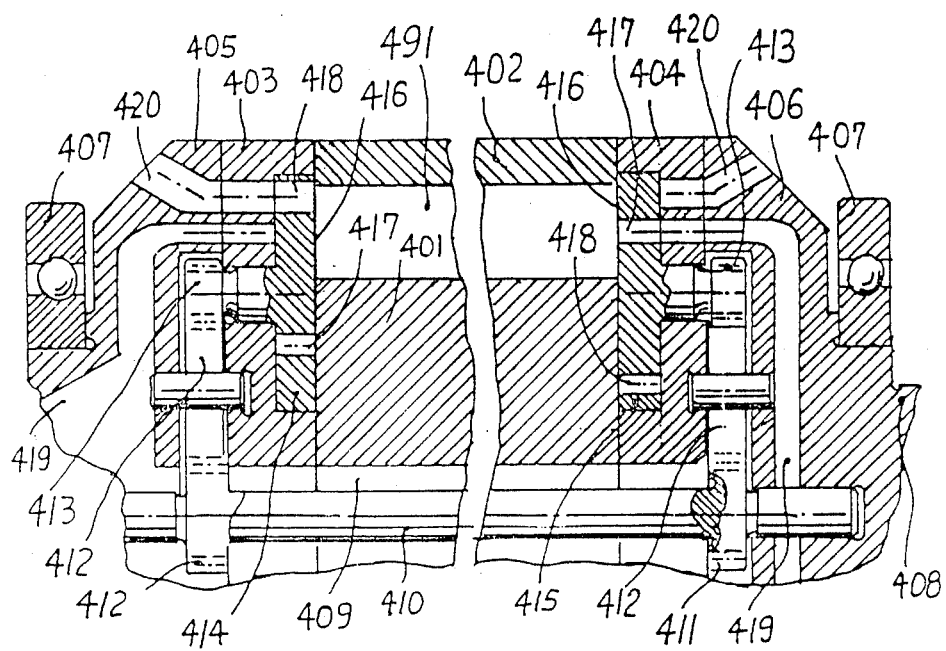

FIG. 95 is a longitudinal sectional view through a portion of a rotary vane machine of the invention.

Figure 96:
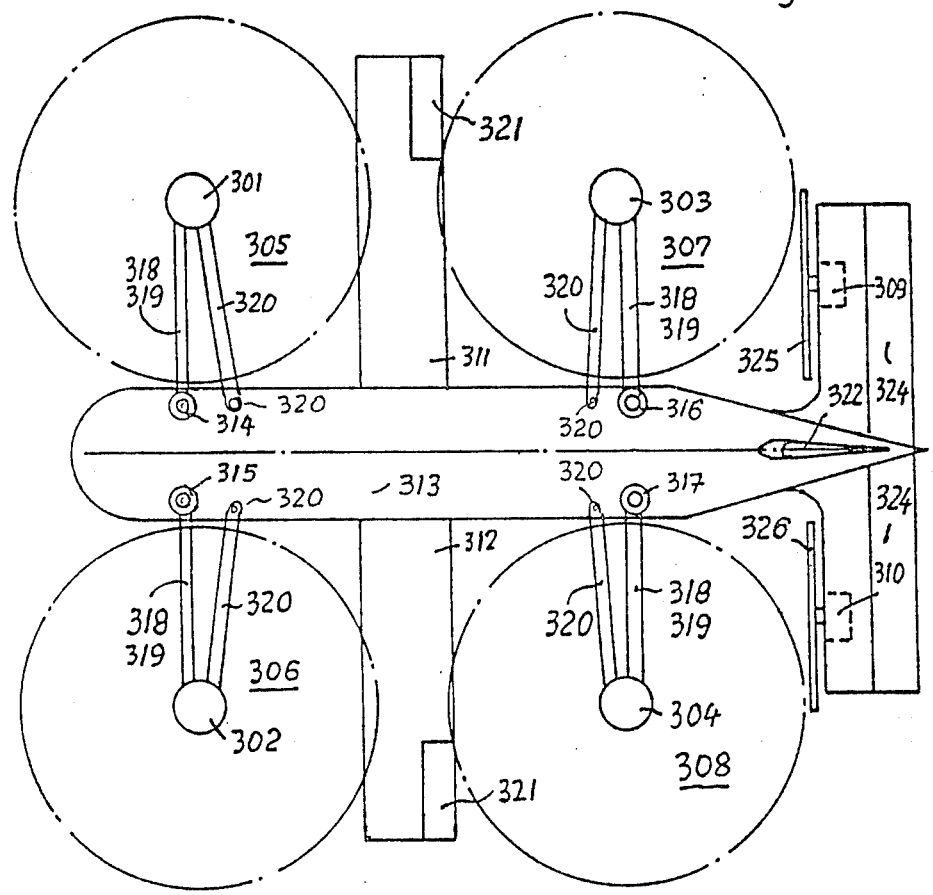

FIG. 96 is a view from top onto a vehicle of the invention.

Figure 97:
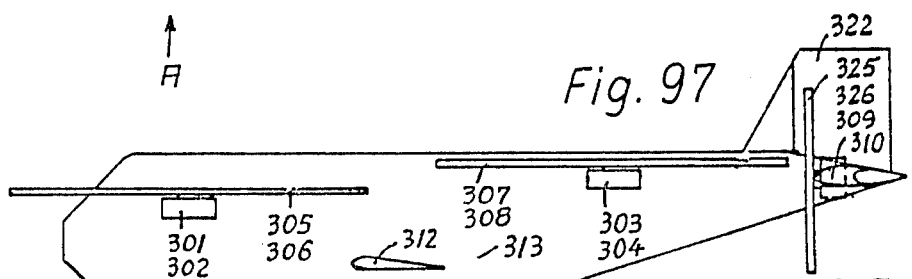

FIG. 97 is a view from the side onto the vehicle of FIG. 96.

Figure 98:
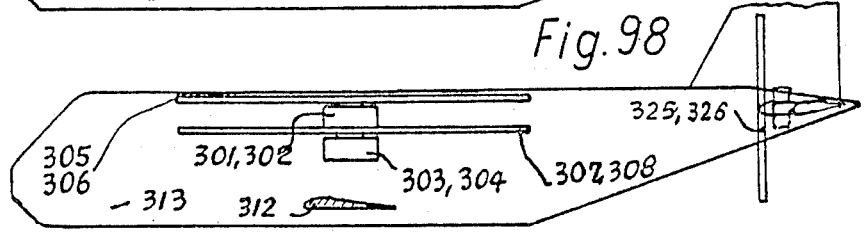

FIG. 98 is a view from the side onto the vehcile of FIG. 96.

Figure 99:
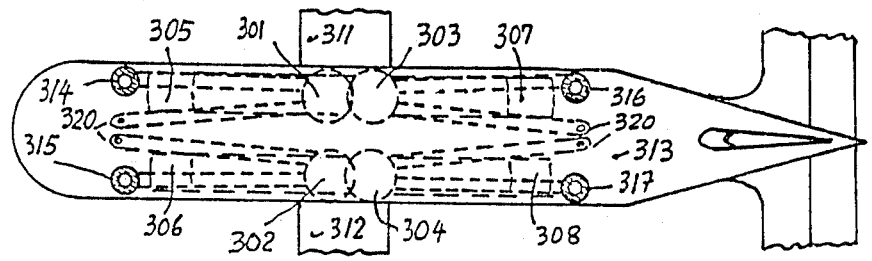

FIG. 99 is a view from top onto a portion of the vehcile of FIG. 96.

Figure 100:
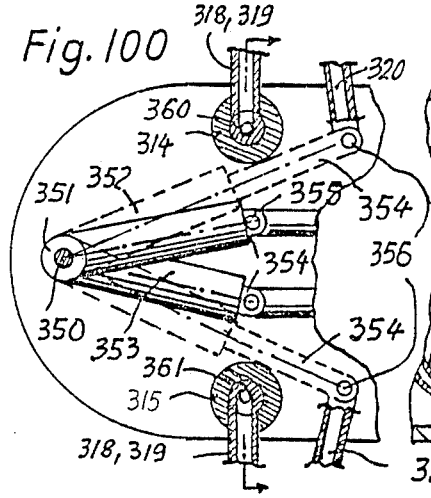

FIG. 100 is an enlargement of a portion of FIG. 99.

Figure 101:
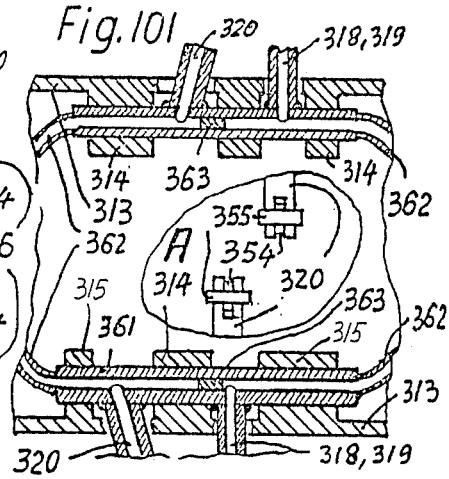

FIG. 101 is a section through FIG. 100 allong the arrowed line therein.

Figure 102:
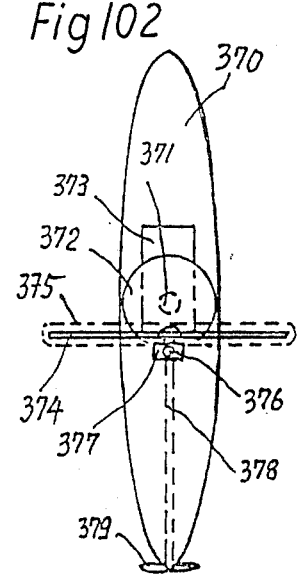

FIG. 102 is a view from top onto another vehicle of the invention.

Figure 103:
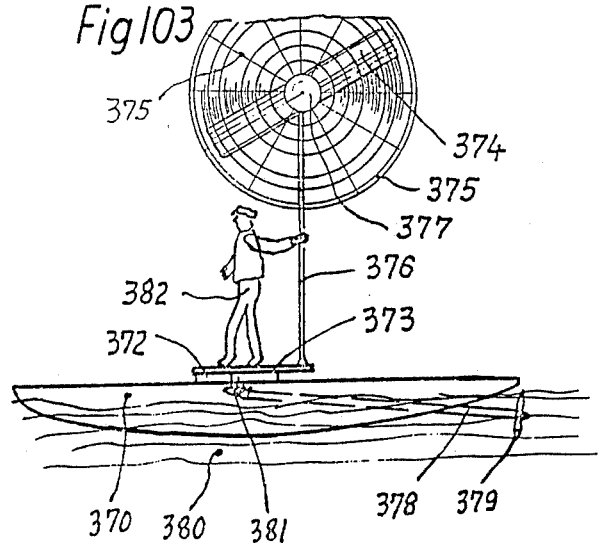

FIG. 103 is a view onto the vehicle of FIG. 102 from the side.

FIG. 104 is a view through a section of a portion of a wing.

FIG. 105 is a sectional view through a portion of a wing.

FIG. 106 is a sectional view through FIG. 104 along its arrowed line.

FIG. 107 is a sectional view through FIG. 105 along its arrowed line.

FIG. 108 is a sectional view through a portion of a device of the invention; and;

FIG. 109 is a sectional view through a portion of an arrangement of the invention.

All figures are demonstrating embodiments of the invention, schematic explanations or mathematical analyses of the respective embodiments of the invention. As far as figures are mentioned by three digets with first diget 1, they define respective figures of my co-pending application Ser. No. 064,248 and as far as the first diget is 2, they define respective figures of my co-pending application, Ser. No. 184,687.

DESCRIPTION OF THE PREFERRED EMBODIMENTS

Figure 1:
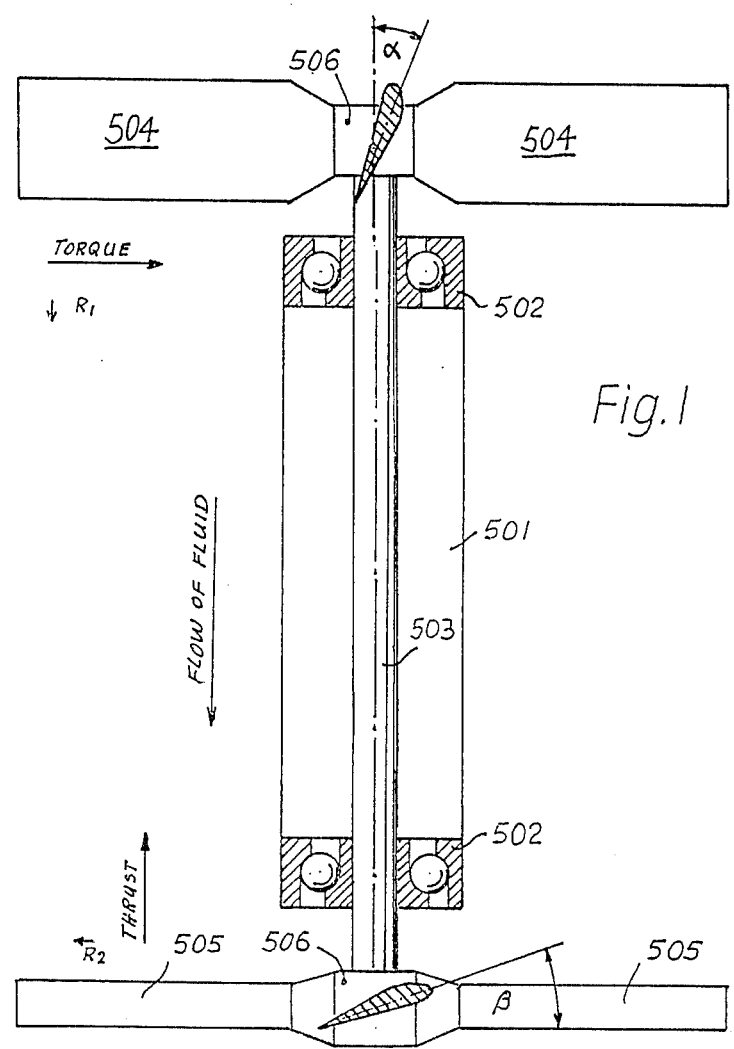
FIG. 1 is a longitudinal sectional view through a unit of the invention.

FIG. 1 demonstrates a thrust unit which has a body 1 with bearings 2. A shaft 3 is revolvingly borne in the bearings 2 and the bearings 2 are capable of carrying a thrust in one of the axial directions. Shaft 3 holds a front propeller 4 and a rear propeller 5, to revolve the propellers in unison when the shaft 3 revolves. The front propellers 4 have angle of attack "alpha" while the rear propellers have angle of attack "beta". Note, that the bases for the angles of attack are 90 degrees turned between the front- and rear-propeller. When a fluid streams from top of the figure towards the front propeller 4 or when the entire unit moves upwards in a resting fluid, the relative fluid-stream, which might also be a water stream or an air-stream, moves downwards in the figure, relatively to the front propeller 4. The angle of attack alpha then provides a rotation of the front propeller and thereby also of the shaft and of the rear propeller in the direction to the right in the figure. The angle of attack beta then creates a thrust in the direction of the arrow with the word "thrust", which is a thrust in the direction upwards in the figure. The direction of thrust is thereby contrary to the direction of the fluid stream or of the arrow with the word "Flow of fluid".

The feature of this arrangement of FIG. 1 is, that a thrust can become obtained, which may be directed contrary to the movement direction of the driving fluid stream. For example, the front propeller may be set into the wind and the rear propeller may be set into the water behind a boat. The boat will then be able to run against the wind. The entire unit may also be set into the wind and it will then give a thrust against the wind. For example, the unit may also be mounted onto an aircraft and the forward flight speed of the aircraft may then be utilized to obtain a thrust of a local place on the aircraft in the direction forward. The propeller pitches may be fixed or variable. When they are variable, the angles "alpha" and or "beta" may be variable. The thrust will increase with the increase of the flow of fluid. For example with the forward speed of the aircraft.

With variable pitch propellers the size of the thrust can be varified. The unit may be used also, to incline wings, propellers or other members of the aircraft in dependency on the forward speed of the aircraft. It may also be utilized to obtain and maintain a rotary movement, when the unit moves relatively to the air or when a fluid flow moves along the unit in the direction substantially parallel to the axis of shaft 3.

Figure 2:
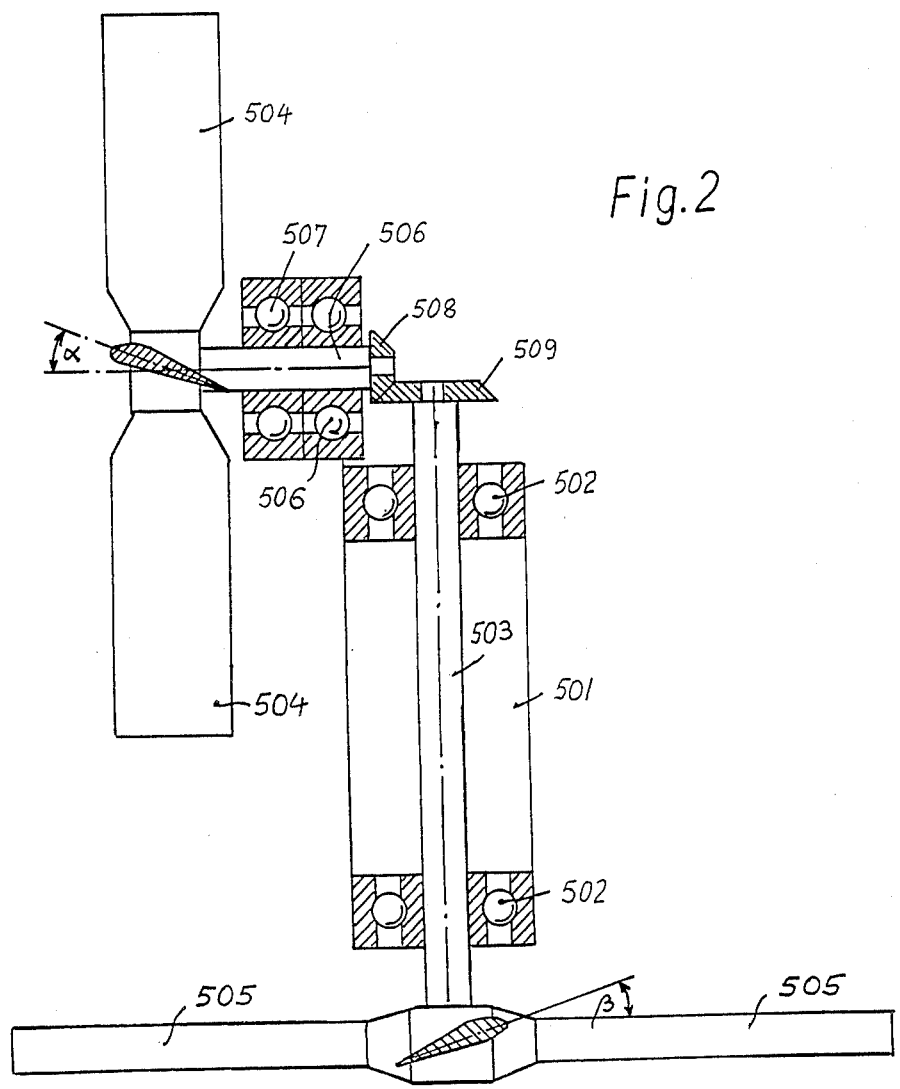
FIG. 2 is a longitudinal sectional view through another unit.

FIG. 2 demonstrates a modification of the unit of FIG. 1. It has in addition to the parts of FIG. 1 a second shaft 6 revolvably borne in further bearings 7 and an angular gear 8, 9 between the first shaft 3 and the second shaft 6. In the figure the preferred arrangement is demonstrated wherein the first and second axes 3 and 6 are normally directed relatively to each other. The angular gear 8,9 revolves the first shaft 3, when the second shaft 6 revolves.

The practical application of this figure is, that a fluid flow relatively along the second axis will provide an upwards directed thrust. For example, when it is mounted on a forward moving air-borne craft, the forward movement will provide an airflow along the axis of the second shaft 6 and with the angle of attack alpha revolve the front propeller 4. Gears 8,9 will transfer the revolution of shaft 6 to shaft 3 and thereby revolve the rear propeller 5. The rear propeller 5 will then by the angle of attack beta give an upwards directed thrust. In suitable arrangements, the thrust of propeller 5 may carry the air-borne craft, whereby wings may be spared on the air borne craft. As will be seen at the later discussion of FIGS. 4 and 5, the unit can be used to transform a multibladed helicopter into a glider, whereby a helicopter can continue to fly as a glider, when the engines to drive the rotors fail.

Figure 3:
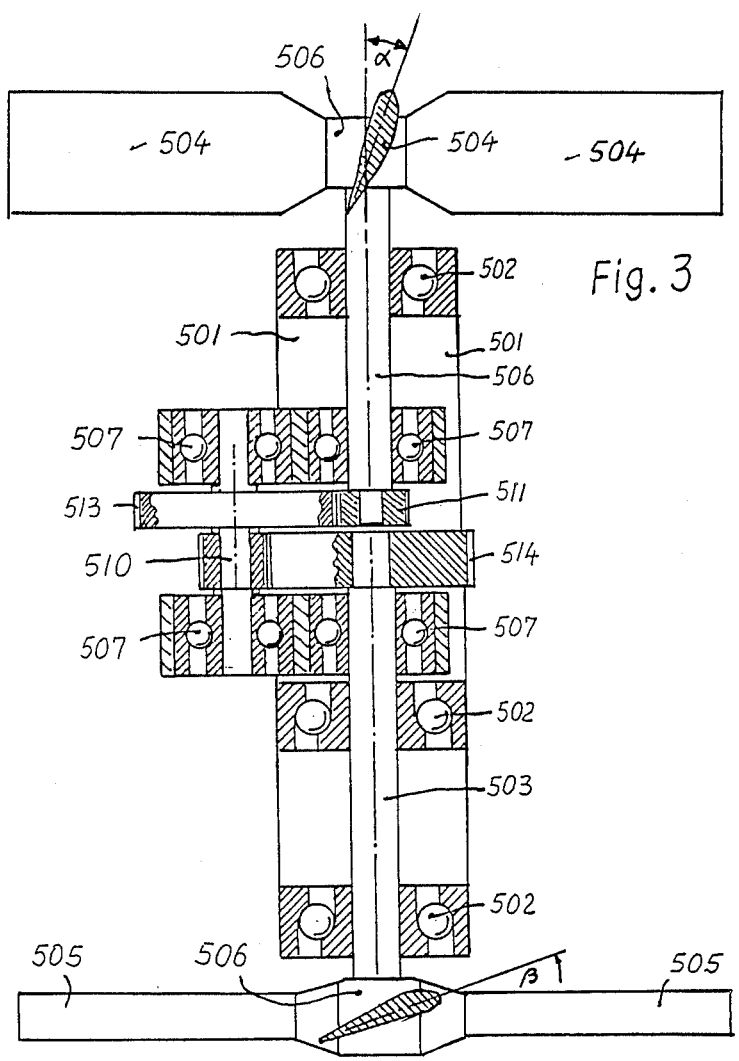
FIG. 3 is a longitudinal sectional view through still a further unit.

FIG. 3 shows, that a speed-up or a speed-down gear may be provided between the front propeller and the rear propeller. In the same way, the angular gear 8,9 of FIG. 2 may be a speed-up or a speed-down gear and the gear arrangement of FIG. 3 may also be provided in FIG. 2. Additional bearings 7 serve to bear portions of shafts 6 and 3 or to bear a third shaft 10. The gears 11 to 14 are provided on shafts 3,6,10 to form the described speed-up or speed-down gear. With the gear means between the front propeller 4 and the rear propeller 5 any desired ration of relative speed of propeller 5 relatively to propeller 4 may be obtained.

FIG. 4 demonstrates together with FIG. 5 a multibladed helicopter with plural rotors. Such helicopters with multirotors are generally known. They are however assumed to achieve by the pilot's control action, an auto-rotation of the rotors, when the engine failes to drive the rotors. The auto-rotation should then effect an emergency landing. Very often however, the emergency landing becomes a failure and the helicopter crashes. That occurs because the autorotation must be utilized to effect a change of angle of attack of the propeller blades shortly before the craft reaches the ground. If the height is misjudged, the craft may not obtain the desired break of the speed of descent and may fall with too much speed against the ground. This matter is more dangerous in the present time, as the propellers are becoming lighter and thereby of less mass. The lower mass of the newer rotor blades reduces the moment of inertia of the blades and thereby reduces the number of revolutions, which with the blades would continue to turn during the emergency landing "autorotation flare-out" maneuver Therefore, the time duration for the emergency landing maneuver is reduced with newer, lower mass, propellers relative to the heavier propellers of the past.

The emergency landing maneuver in auto-rotation of the past and present is therefore no longer the ideal solution for an emergency landing. The invention therefore provides a novel kind of emergency landing for a helicopter. This novel system of the invention is, not to land in auto-rotation with descent-speed break maneuver close to the ground, but to transform the helicopter into a glider, when the engine(s) fail(s) to drive the rotor(s) of the helicopter.

While FIGS. 4 and 5 demonstrate one of the methods of the invention to transform a helicopter into a glider, FIGS. 28 to 44 show related systems with other means, than in FIGS. 4 and 5, to provide a glider-performance to the helicopter.

The helicopter of FIGS. 4 and 5 has multiple rotors 15 to 22 with substantial vertical axes to carry the craft including its body 1 which may have the power plants and passenger cabin or other compartments, fuel tanks etc. Each rotor is borne by a shaft with a free wheeling arrangement 25. Some rotors, for example, 15 to 18 may in addition to the free-wheeling arrangements 24 have revolution-drive arrangements, for example, fluid motors 25 to revolve the rotors 15 to 18 over the fluid motors by the power plant.

Each free-wheeling arrangement 24 and thereby the respective bearing rotor 19 to 22 is held by a holder 23. In addition to the rotors with the substantial vertical axes, the craft is provided with at least one propeller 28,29 with a substantial horizontal axis. In the FIGS. 4 and 5, the craft has two or more such propellers 28,29. The propellers with the substantially horizontal axes are driving propellers, while the propellers with the substantial vertical axes are the carrying propellers, or the bearing propellers. The bearing propellers are bearing the craft in the air, while the driving propeller may be utilized to drive the vehicle forward in the air.

The driving propellers may therefore also have drive-arrangements; for example, fluid motors 27, to revolve the propellers. The driving arrangements of the bearing propellers and of the driving propellers may be actuated and be driven by the main power plant, for example in body 1, by a transmission means for example by a fluid pump and fluid lines, when the drive arrangements include fluid motors to drive the respective propellers.

The drive means to drive the driving propellers are however not in all cases required. Required is to each driving propeller 28,29 however a transmission means and/or free wheeling means, 26,8,9,29 to 32. The transmission means transfers the rotary movement of the propellers 28 and/or 29 to one or more of the propellers 19 to 22. This can be done for example by the arrangement of FIG. 2 or any other suitable solution.

Considering now, that the craft is flying with the forward movement parallel to the horizon(-as shown by the arrow between the figures)under power of the power plant, when at least propellers 15 to 18 are driven and revolved by the power plant over the respective transmission means, which might include the fluid motors 25.

When then suddenly the power plant or all of the power plants fail(s) or a fluid line breakes, the pilot will incline immediately his craft slightly downwards with the front portion, as shown in FIG. 4. The craft still has the full forward directed flight speed.

The flight speed will then drive the drive propeller(s) 28,29 as demonstrated in FIG. 4. The free-wheeling arrangement will over-run the connection to the fluid motor or first transmission.

The forward speed of the craft will create the fluid flow of FIG. 1 along the propeller 4 of FIG. 2 and thereby along the axes of propellers 28 and 29. The transmission of FIG. 2, which might split into plural exits to plural propellers, will now drive the bearing propellers 19 to 22 or a plurality thereof. Similarily as propeller 4 drives propeller 5 in FIG. 2.

The high-speed forward movement of the craft will provide a strong torque on the propellers 28,29 which is strong enough to drive the propellers 19 to 22. It should be noted, that propeller(s) 28,29 may have a great angle of attack, while the bearing propellers 15 to 22 may have only very small angles of attack. The drag of the bearing propellers 15 to 22 is thereby small, while the thrust or lift of the blades of propeller(s) 28,29 is very high, because of the great angle of attack and because of the high forward speed of the craft. At this moment the craft has no downward or upwardly directed speed, because it flew horizontally, when the power plant failed. The gravity however acts on the weight of the craft and starts to pull the craft downwards to the ground. The craft thereby obtaines the direction of movement as shown by the arrow between the drawings. This direction of movement after the engine failure is directed strongly forward and slightly downwardly as such of a glider. The gravity pulls the craft downward, but since the forward speed drives the propeller(s) 28,29 and the said propeller(s) 28,29 thereby drive, as shown in FIG. 2, the bearing propellers 15 to 22 with the vertical axes, the bearing propellers 15 to 22 are continuing to bear the craft. However under loss of some height, because the craft now moves in the slight y downwardly inclined direction of the arrow of movement. The direction of movement maintains itself under the force of the gravity. Thereby the foreward movement is maintained and the bearing capacity is maintained; -however, under loss of some height.

Thus, the arrangement of FIGS. 4 and 5 provides a multi bladed helicopter, which does not require an autorotatin descent speed break maneuver, but which flies on as a glider under loss of some hight but under maintainance of the forward speed. Even, the forward speed may slow down slightly, the craft glides, but does not fall downwards. The pilot might look for a suitable landing place on the ground to land on wheels or on slides. For example, as an aircraft or as a glider. The arrangement of these figures therefore provides an effective emergency landing means.

The free-wheeling arrangements 25 make sure, that the change from power-plant operated flight to emergency gliding flight appears automatically without adjustment by the pilot. However, when the pilot listens, that the power plant has stopped or otherwise becomes aware of the failure of the power-plant drive of his craft, he should actuate a shift of the gravity centre of his craft to icline the craft slightly downwards forwardly, to obtain an optimum of the gliding angle. A gravity centre shifting device 30 may be respectively provided in the craft. The pilot may control his gliding flight to the emergency landing place by the gravity shifting device 30 to icline his direction of movement sharper or softer relatively to the horizon and by the actuation or control of his side rudder 2 for yaw axis control FIGS. 6 to 8 demonstrate a motorglider of the invention. In common motor gliders with retractable propellers it was custom to swing a single propeller out of body 1 of the craft. Mostly that is done upwards. This common system to swing the propeller out and into the body of the glider has however certain disadvantages. For example, the centre of thrust of the propeller is not in the axis of the drag of the craft. Thereby the sudden "swing-out" of the propeller provides a sudden uncentric drag and influences negatively the flight path and stability of the flight of the glider. The sudden start of the propeller provides a second sudden negative influence in the flight of the glider. Both influences are appearing suddenly and they are demanding a piloting skill from the pilot to prevent a crash of the glider under uncentric sudden drag or thrust.

The invention therefore provides in FIGS. 6 to 8 a glider arrangement of the invention, which drastically reduces the negative effects of the swing motors of the common motorgliders. The invention provides at least one pair of propellers 9,10 arranged symmetrically relatively to a medial longitudinal vertical imaginary plane through the body 1 of the motor glider. The propellers 9,10, of the propeller pair are held on holder arrangements 8 and are driven by a drive means 7. I prefer to use fluid line pipes as holders 8 and to use fluid motors as drive means 7. The fluid motors are then driven by a double flow pump, while the pump is driven by an engine. Engine and pump can be located and remain at all times in body 1 of the motor glider.

Thereby the first feature of this embodiment of the invention appears, and is, that not the entire engine is swung in and out of the body, but only the propeller with the rather small and light fluid motor(s) 7.

The second feature of the invention is, that both propellers 9 and 10 are swung out symmetrically and in unison. That is seen in FIG. 6. Therein the fluid motors 7, the holders, fluid lines, 8 and the propellers 9,10 are shown in the position, whereat they are located in the body 1. That is the first position of location of the propellers.

Thereafter the propellers are schematically demonstrated in the second position of location by 13 and there the third feature of the motor glider of this embodiment of the invention becomes apparent. It is, that at this second position 13 the propellers can start to revolve, and that at this position only a small drag is added to the glider. The drag is added symmetrically of the body of the craft and thereby sums up to a drag in the centre line of the craft. And, in addition the thrust now acting rearwardly is only small, and corresponds to the reaction force to arrow 15 of FIG. 6. The rest of the thrust of the propeller is directed along arrows 16 towards the body of the craft. Thereby only portion 15 of total thrust 14 is in this second position 13 of the propellers acting forwardly on the body 1. Or, in other words, at position 13 the motor glider obtains smoothly a slight forward thrust and the thrust is acting substantially along the medial centre line of the body of the craft. Any lateral influence on the flight path of the glider of the invention is prevented.

The next position is the third position and location 11. The thrust in forward direction is now increased and obtains now about 71 percent of the entire thrust. Again, the thrusts sum up to a combined thrust in the longitudinal axis of body 1.

The fourth position and location of the propellers is shown by their positions 9 and 10, when the blades of the propeller are substantially parallel to the wings 2 of the glider. At this position and location the entire thrust of the propellers 9 and 10 is now acting forwardly on body 1 of the glider. The holders 8 are partially shown in this position in FIG. 6 and the drive means or fluid motors 7 are fully shown in this fourth location and position of the propeller pair 9,10.

While four locations have been shown, namely those of the location in the body, swung out 45 degrees, swung out 60 degrees and swung out 90 degrees, it should be noted that the swinging out can be done steplessly. A very smooth build up of the thrust is then obtained. And any lateral disturbances of flight are prevented. The arrangement of this embodiment of the invention therefore acts very smoothly and is very convenient in handling. At the same time it prevents all sudden lateral drags and thrusts and disturbances of the flight path of the vehicle.

The "swing-out" and the "swing-in" may be done around the swing bars in swing bearings 3 and 4. If fluid motors 7 are used to drive the propellers 9,10, respective fluid lines may extend through or along swing means 3,4 and the fluid may flow through holding pipes 8. Otherwise a transmission portion will be extended through or along swing means 3,4 and through or along the holders 8 to the drive means 7 of the propellers 9,10. Flexible transmission means or flexible fluid pressure hoses may be set between the engine or pump and the swing means 3,4. A device may be added to swing the holders 8 around the swing means 3 and 4 respectively and in unison.

An additional feature of the invention may be provided as demonstrated in FIGS. 7 and 8. Therein the glider is shown from the front and shows the propellers 9,10 in FIG. 6 in the flight position, but in FIG. 7 in the take off or landing position. In the flight position of FIG. 6 the propellers 9,10 are substantially behind or before the centre line of the sum of drags of the body 1 and of the wings 2. Thereby any lateral disturbing thrust or drag is fully prevented. The location of the propellers is now ideal as in a common aircraft. When however at start or landing the tips of the revolving propellers would become too close to the ground, it is better to swing the propellers slightly upwards. The centres of thrust of the propellers are then above the centre line of drag of the craft. But, since the swing-up can be handled steplessly, a respective control action by the elevators can smoothly and in unison with the swing-up operation keep the craft in a straight flight path. FIGS. 6 and 7 therefore demonstrate second swing arrangements 5 and 6 which are preferredly normally arranged respectively to the first swing members 3 and 4. For example the swing members 5,6 may be mounted on swing members 3,4 or vice versa.

The arrows in FIG. 6 as far as they are within body 1, are demonstrating the action of swing of means 3,4 and the arrows in FIG. 7 are demonstrating the action of swing of swing means 5 and 6.

With these arrangements of the invention, a superior motorglider is obtained. The arrangement can be a complete built-in unit to be assembled to existing gliders. It can also be used in common aircraft. For example to provide additional propellers for take off.

Figure 9:
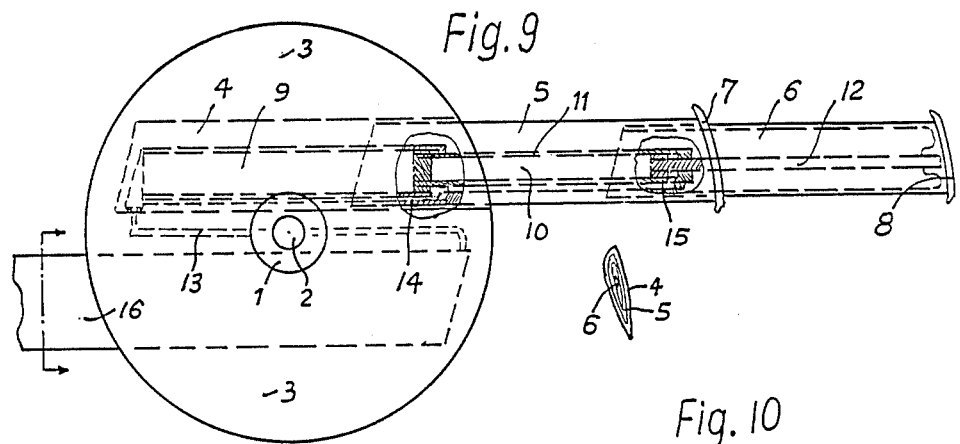
FIG. 9 shows a portion of a propeller of the invention from above.

FIG. 9 demonstrates an improved propeller of the invention. It has one first propeller body 4 with a second propeller body 5 axially guided and extendable in the first propeller body 4 and a third propeller body 6 axially guided in and extendable in the second propeller body 5. The figure shows the propeller bodies in the most outwardly extended positions and locations. The other extreme position is, that the third and second propeller bodies are fully retracted into the first propeller body 4. The propeller body 4 may be provided in a revolving disc 3 or laterally distanced from the drive motor 1 with shaft 2, if so desired. Such arrangement makes especially large differences between the smallest and biggest extensions of the propeller portions possible, and a second propeller set 16 may then be provided diametrically opposite relative to the propeller holding and driving shaft 2. The end plates 7,8 are serving to direct the flow along the tips of the propeller bodies and also to arrest the second and third propeller bodies in the innermost positions.

To control the locations of the propeller bodies either in their outermost or innermost positions or in any other position steplessly therebetween, the following arrangement is preferred in accordance with the present invention:

A fluid line extends from a pressure supply device along or through holding- and drive-shaft 2, wherefrom the fluid line(s) 13 are extending into or along first propeller body 4. A fluid line 14 extends along or through body 4 into the radially outer portion of the second propeller body 5 and into a cylinder 10 which is arranged in the second propeller body 5. The first mentioned fluid line 33 extends into the radial outer portion of a cylinder 9 which is arranged in the first propeller body 4. A valve-not shown in the figure-is provided to permit the opening of the fluid line which leads to fluid line 13. When now the propeller(s) which might include the medial disc 4, revolves, the second and third propeller bodies 5 and 6 are moving outwardly to their radial outermost position and location under the centrifugal force of the weights of the mentioned bodies. The propeller bodies are obtaining the positions which are shown in the drawing of FIG. 9. The propeller now provides the highest possible thrust at a given revolution per unit of time. These positions of the propeller bodies are especially suitable as helicopter propellers for vertical take off, landing or for hovering.

When the aircraft has obtained a forward speed, the large diameter propellers of the demonstration in FIG. 9 may become uneconomic or may provide too large a drag. It is then preferred to retract the propeller arrangement to a smaller outer diameter or to shorter propeller arms. The second and third propeller bodies are then partially steplessly or entirely subtracted into propeller body 4. The retraction into the first propeller body 4 may be done by mechanical transmission means. I however commonly prefer the hydrostatic retraction device, which is illustrated in the figure. Because this device is specifically safe in operation, easy in handling and it can be provided easily for the operation of plural propeller arrangements in unison. In such case a fluid is led through the fluid lines into the mentioned cylinders 9 and 10, wherein pistons 11 and 12 are reciprocable. Since the fluid lines 14 and 15 enter the outer portions of the cylinders 9 and 10, they are entering radially outwardly of the fiiting heads of the pistons 11 and 12. Any quantity of fluid which is led through the fluid lines 13, 14,15 into the cylinders 9 or 10 therefore drives the pistons 11,12 in their cylinders 9,10 radially inwards and thereby retracts the second and third propeller bodies 5 and 6 into the respective propeller body 4 or 5. The quantity of fluid pressed into the cylinders decides how far the respective propeller body shall become retracted. Since the fluid pressure must act against the centrifugal force of the respective propeller body, the pressure in fluid will decide, which propeller body retracts how deeply into the respective other propeller body.

It will be easily understood, that the play of forces which act by centrifugal weight and by fluid pressure, a number of different propeller assemblies, for example, as in FIGS. 6,9 or others, can be handled from a single fluid pressure supply device in a fluid borne craft to retract and move out in unison.

While first, second and third propeller bodies 4,5 and 6 have been shown in the figure, it may be possible, if size and strength permit, that other numbers of bodies may be applied, depending on design, requirements and strengths. For example a first and a second propeller body or even a first, a second, a third, a fourth and a fifth propeller body or more propeller bodies. In FIG. 9 the diameter of the propeller circle is variable almost 3 to 1. That defines a variable circle area of $3^2$ or 9 to 1 for the propeller circle. The lift of the propeller in outermost extended location, as in FIG. 9, will thereby be roughly two times higher at equal power consumption and revolution, than in the innermost retracted position of the propeller bodies, when the propeller is used in stand or for hovering of a helicopter. In the retracted position, which is the innermost location of the propeller bodies, the propeller will have little drag or no drag, when retracted into the disc 3. The arrangement is then suitable for higher speed forward flight.

Thus, the invention of this embodiment provides a steplessly variable diameter of a propeller arrangement, suitable for aircraft and high-speed flight as well as for vertical take off aircraft or helicopters.

Figure 10:
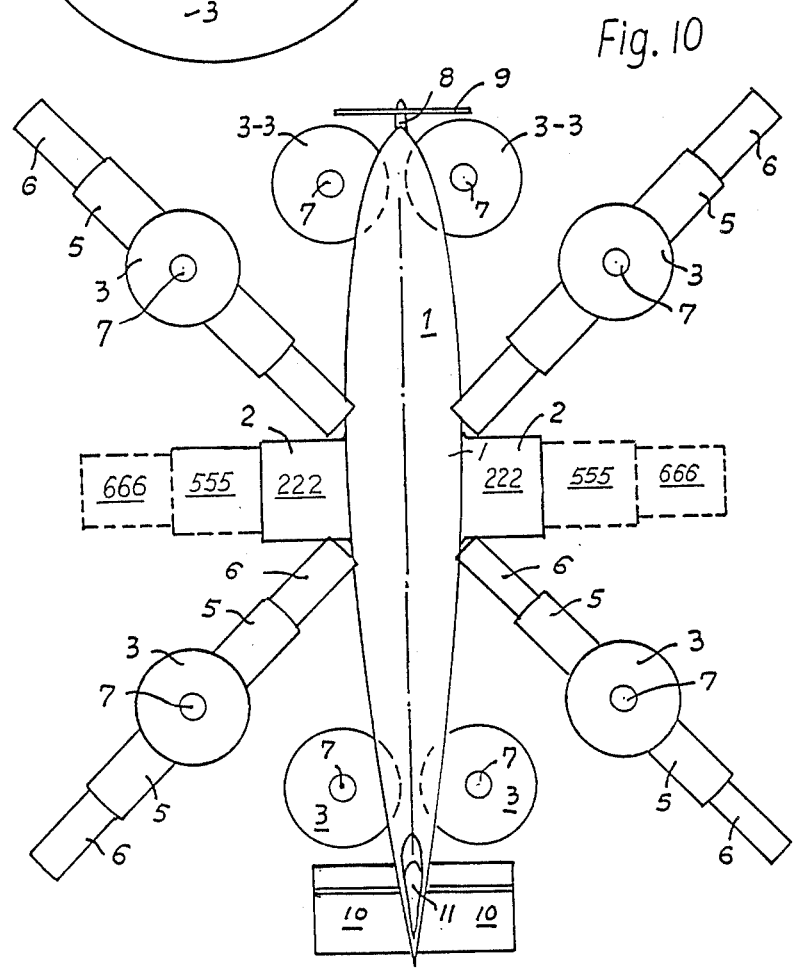
FIG. 10 shows an aircraft of the invention seen from above.

The consequences of the arrangement of the invention will be better understood at hand of the application in a craft of practical use which is demonstrated in FIG. 10.

In FIG. 10 a vertical take off and landing aircraft of the invention is demonstrated, which can also fly forward as an aircraft with forward speed. It may also land or start as a common aircraft if so desired. The feature of this embodiment of the invention is, that the aircraft can in flight transform from a helicopter like craft to an aircraft like craft. Due to another feature of the invention, it can transform steplessly from vertical craft like a helicopter to a horizontal moving craft, like an aircraft and vice versa. In addition, another feature is, that it can carry relatively heavy loads vertically off at vertical start and down at vertical landing. And, still a further feature is that it can do its actions with good economy and with relatively small and light engines or power plants with limited power and fuel consumption.

In FIG. 10 the craft has a body 1 which may contain the passenger-and/or freight compartment, the pilot's cabin or cockpit and the power plant. If the craft is operated hydrostatically or hydraulically, the body 1 may also contain the respective pump(s) connected to the respective power plant(s). Laterally from body 1 the wings 2 are extending. A propeller 9 is driven by shaft 8 and has a substantially horizontal axis to drive the craft in the foward flight as an aircraft, borne on wings 2. Instead of one forward driving propeller 8, there may be a plurality of such propellers provided. This propeller(s) is(may) be driven by a separated power plant or be driven hydraulically from the main or common engine or power plant or power plant set in body 1. Elevators 10 and side rudder 11 are provided as usual to control the flight path and location of the craft during movement in the air.

According to the invention, the wings 2 may be substantially formed as the arms of the propellers of FIG. 9. For example, the wings 2 may be formed similar as the first body 4 of FIG. 9. The second bodies 555 may be retractable into the first bodies 222 of the wings 2. The third bodies 666 may be retractable into the second bodies 555 as it was handled in FIG. 9. Thereby, the second and third bodies 555 and 666 may be entirely or steplessly fully extended radially from first wing bodies 2 and thereby laterally of body 1 of the craft into the outermost position or be retracted steplessly into the innermost position. In the innermost position the second and third bodies 555 and 666 are fully retracted into the first wing bodies 222.

The feature of this arrangement is, that the craft can start, land and fly at lower speeds with the wing bodies 555,666 fully extended to the outermost position, while it can also fly at high forward speeds with little drag when the second and third wing portions 555,666 are fully retracted to the innermost position. Any position and action therebetween is possible, when the arrangement is done stepplessly as in FIG. 9. Since the wing bodies 555 and 666 have no centrifugal force, the outward movement of them may be handled by spring means or by hydraulic means by replacing the one way pistons and cylinders of FIG. 9 by double way acting pistons and cylinders with a respective number of fluid lines and controls. When no variable wings 222,555,666 are required, simple, fixed wings 2 may be used.

For vertical take off and landing, for hovering in air, or also for relatively low speed forward flight, breaking in the air or backward or sidewards flight, the craft is provided with at least one propeller 5. I prefer to use at least one propeller pair or a plurality of propeller pairs and I prefer to drive the rotation of the propellers hydraulically. In FIG. 10 two pairs of propellers are shown and the propellers are corresponding in this example to the propellers of FIG. 9. One sees in FIG. 10 four propeller holding shafts 7 with discs 3 of FIG. 9. Each propeller disc 3 contains the first propeller bodies therein and the figure shows the second and third propeller bodies 5 and 6 exteneded to their outermost positions. At this location of the propeller pairs, the hydraulic motors which drive the propellers and the fluid lines which are forming the holding structures to hold and drive with the fluid which flows therethrough the revolutions of the propellers are not visible. Because the sizes of the structure and of the fluid motors are typically smaller than the sizes of the propellers and of their holding discs 3.

In this arrangement of all propeller bodies in the outermost position, the craft obtains a very high load capacity for vertical take off, landing and hovering as well as for forward flight with limited speed. As explained at hand of FIG. 9, the lifting capacity in outermost position of all propeller bodies is about double of that of first propeller bodies only when the same power is used to drive the lift and bearing propellers 3,5,6. For such applications, where the arrangement of FIG. 9 of the propellers is too expensive, simple propellers may be used and the discs 3 may also be spared, if so desired. That however goes on the expense of the extensive utility of the craft.

When the craft obtains a certain forward flight speed under propeller(s) 9 or other propulsion means, the second and third propeller bodies 5 and 6 of first propeller bodies or discs 3 may become gradually retracted in relationship and depending on the rate of foward speed. Until finally the second and third propeller bodies 5 and 6 will be entirely retracted into the first propeller bodies or discs 3. This will be accomplished fully, when the craft has obtained a respectively higher forward speed. At this time of second and third propeller bodies 5,6 completely retracted into their innermost position, the discs of first propeller bodies may act as small lifting bodies would act and may help to carry the craft.

With still further advancing forward speed the front propeller sets 3,5,6,7 will be swung forward until they are moved at least partially into the body 1 of the craft. The rear propeller sets 3,7,5,6 will be swung backward until they are at least partially located within body 1 of the craft. The swinging into the body 1 will be done for example, as in FIG. 6. The propeller sets 3,5,6,7 may either be swung entirely into body 1 as done in FIG. 6 or they may be swung partially into body 1. A preferred solution of swinging them partially into body is demonstrated in FIG. 10 by the location of the discs 3 partially in the body 1. In this location the discs 3 are cited by the referentials 3—3. The discs 3—3 are now forming small wings and may be used to help to carry the craft at very high forward speed or to help to assist the stability of the craft at speedy forward flight. The craft now has wings 222,555,666 and the pairs of front and rear wings 3—3.

For still higher forward speeds with less drag-area, the third wing bodies 666 may be retracted. Thereafter for still higher forward speeds the second wings 555 may become retracted. Or, the second and third wings 555,666 are retracted partially and in common as in FIG. 9 the second and third propeller bodies 5 and 6 are retracted. Finally the second and third wing bodies 555 and 666 may be entierly retracted into the first wing bodies 2 for very high speed forward flight. For still higher speed forward flight, the partwingpairs 3—3 may be further retracted into body 1 and at highest forward speed the wing pairs 3—3 may be entirely retracted into body 1.

When the craft nears the destination, the respective portions may become gradually extended. For example the wingpairs to 3—3, therafter the second and third wing bodies 555,666 And finally, for the landing also the propeller pairs 3,5,6,7 will be extended to the outermost positions as seen in FIG. 10 for the vertical landing on a small field or place of destination. When the destination however is an airport with a runway, the extension of the propeller sets 3,5,6,7 may not be required or may be done only partially.

The craft of the invention of FIG. 10 is therefore able to fulfill a great number of duties. For example, vertical take off and landing, hovering, and also medial and high or very high forward speed flight.

In FIGS. 11 to 13 an other embodiment of an aircraft of the invention is demonstrated. It serves for a shorter runway of take of and landing. It may also make an aircraft capable of an immediate "inclined-angle" take off and landing without a runway.

The embodiment of the invention obtains its capability and aim by the provision of a pivotable and retractable assistance-wing set. For example of each one or more retractable wing(s) at the left and right of the body 1 of the craft.

In FIGS. 11 to 13 again the body 1 may contain the passenger and/or freight compartments, the power plants, if provided also the hydraulic pumps, and at least the pilot's cabin or cockpit 10. Laterally from body 1 are the wings 2 extended, whereof the left one is only partially shown in the FIG. 11. Wings(s) 2 may be provided with propeller(s) 5 and with drive-means 4 to drive the revolving motions of these (this) propeller(s).

According to this embodiment of the invention however, a pair of assistance wings 3—3 with additional drive means 6 to revolve the propeller(s) and additional propeller(s) 7 is provided. I prefere to locate the assistance wings 3—3 behind the main wings 2 and I also prefere to incline them to a steeper angle of attack. For example to 30 degrees, 45 degrees or even to 60 degrees. Or to any other suitable angle of attack. Since the assistance wings 3—3 have propellers with axes substantially equal to the medial line through the chord of the respective assistance wing or only slightly inclined relatively thereto, the assistance propellers 7 of the assistance wings are helping to draw a flow of fluid over the main wings 2. That prevents stalling of the main wings 2 at least partially and it also assures a flow of air over the assistance wings 3—3 without stalling of the wings. Even if the stalling may not be entirely excluded, it at least reduces the possibility of stalling very drastically, when the arrangement of the invention is applied.

The assistance wings 3—3 with the assistance propeller(s) 7 will help the craft to get airborne after a shorter runway length and with smaller speed. It may even provide an immediate inclined take off and landing without any considerable runway. The effect on the runway and take off and landing possibilities will depend on the size of the assistance wings, on their angles of attack, on their location relatively to the main wings 2, on the size and revolutions of the assistance propeller(s) 7 in addition to the sizes of the main wings 2 and main propellers 5 as well as on the speeds of the main propeller(s) 5.

Once the aircraft of this embodiment of the invention has taken off and obtained a certain forward flight speed it is convenient to reduce the drag and power consumption of the craft in order to obtain a still higher forward speed. Therefore the assistance wings of the invention are provided with a "swing-in" and "swing-out" capability. The assistance wings 3,3—3 may gradually and steplessly or immediately completely be swung into the body 1. For example, as the propellers of FIG. 6 are swung into the body 1. Any location between full extension and full retraction into the body may be used for partial utilization of the thrust of the assistance propeller(s) 7 and of the lift of the assistance wing(s) 3,3—3. For example, substantially similar as it is the case with the retractable propeller(s) of FIG. 6.

In FIG. 11 the assistance wings are also shown in the innermost retracted position. At this position they are cited with the referential 3. In the outcut of FIG. 11 one sees the fully retracted right side assistance wing 3 once in the innermost retracted position with referencial number 3 and also the innermost retracted position of the left side assistance wing, also with referential 3. Also shown in FIG. 11, by dotted lines, is the outermost extended position of the right side assistance wing with referential 3—3, which demonstrates the outermost position of the right side assistance wing 3. The outermost location of the left side assistance wing 3,3—3 is not shown in the figure, because there is no space for it on the paper and also it is easily understood without writing it into the figure, because it is symmetrically to the wing 3—3 of the right side of the craft, respectively to the medial vertical longitudonal imaginary plane of body 1.

For making the "swing-in" and "swing-out" possible, the body 1 is provided with respective swing bars 11, bearings 8 therefore and holding arrangements 9 therefore. For the right side assistance wing as well as for the left side assistance wing 3,3—3. The swing out may be effected mechanically, if so desired. I however prefere to use hydraulic equipment to drive and accomplish the swing in and swing out-operations. For example, hydraulic motors, pistons, cylinders swings or the like to be operated by fluid pressure and to be controlled by valves or flow quantity controller or pressure controllers respectively.

The FIGS. 12 and 13 are sectional figures taken along the arrow-line in FIG. 11. They are demonstrating, that a single swing bar 11, supported in a pair of bearings 8 is enough to hold and guide the assistance wings 3,3—3 in all of their positions including in the innermost retrcated and outermost extended positions. FIG. 12 shows the assistance wings with 45 degrees inclination relatively to the forward flight movement and FIG. 13 demonstrates the inclination of 60 degrees of the assistance wings 3,3—3 relatively to the forward movement direction of the craft. The figures are showing that at these angle of the wings, they have adequate space in the body to be retracted into body 1. While the holding bars and swing bars 11 are shown vertically extended in the craft, it would also be possible to provide them in an inclination in bearings 8 in order to effect other angles of attack of the assistance wings. Also a combination of swing-arrangements as in FIGS. 6 to 8 is possible in order to change the angles of inclinations of the wings accordingly.

The arrangement of this embodiment of the invention provides a very effective assistance to the aircraft for short take off and landing or even for inclined angle take off and landing as well as for low landing and take off speeds or for carrying of higher loads. And the arrangement obtains these features by most simple construction, design and cost at low weight.

The actual design and building of the craft of this embodiment is rather easy and reliable, when my fluid motors and fluid pumps are used to drive the propeller(s) 7. Flexible hoses can easily be set from the pump to the swing arrangement. The wings 3,3—3 may be built around a fluid pipe structure to the motors, as for example illustrated in FIGS. 20 to 22. Also the main wings 2, motors 4 and propellers 5 may be of similar construction or also be hydraulically driven and operated.

FIGS. 14 to 19 show still further assistance wings or general wings in accordance with further embodiments of the invention. The wings are here in these figures shown schematically in cross-sectional views taken through the respective wings parallel to the direction of forward flight and vertically through the respective wings.

All these figures are showing a main wing 2 and an assistant wing 3 in different locations relatively to the main wing 2. Each of the assistance wings 3 is provided in these figures with an assistance propeller 4 or 26, while each main wing 2 has a main propeller 5 or 16. The propellers are driven by respective drive means to revolve. These drive means may be engines, individual power plants or remotely mechanically or electrically driven drive means. I however prefer to use my hydraulic motors to drive the propellers; for example by hydraulic motors, 7,6,27, while the mentioned hydraulic motors are driven by a respective pump arrangement which is driven by a prime mover or primary power plant. The hydraulic drive permits an easy laying of pipes as fluid lines and of flexible fluid line hoses. The hoses permit the easy varification of location of the respective wings, motors, propellers, while the pipe fluid lines permit the building of a structure to hold the wings, motors and/or propellers.

Figure 14:
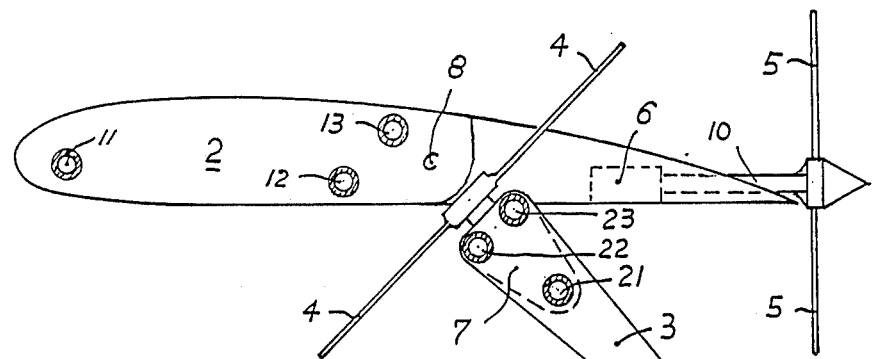
FIG. 14 is a longitudinal sectioonal view through wings of the invention.
Figure 15:
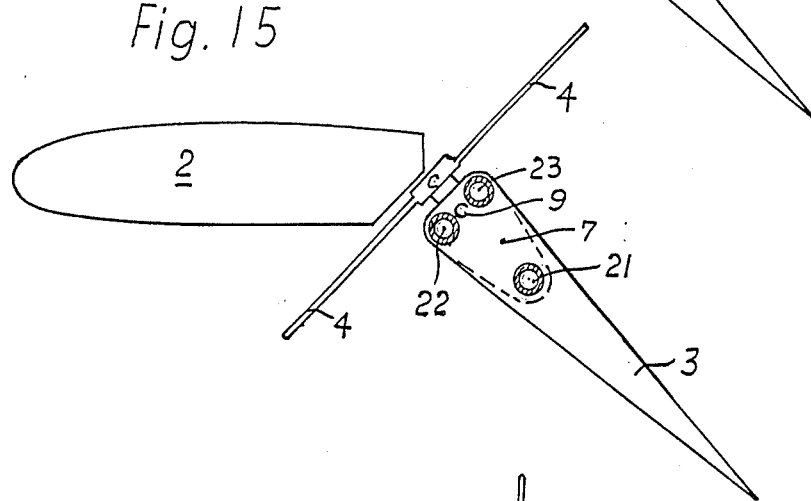
FIG. 15 is a view as in FIG. 14, however with a modified wing portion.
Figure 16:
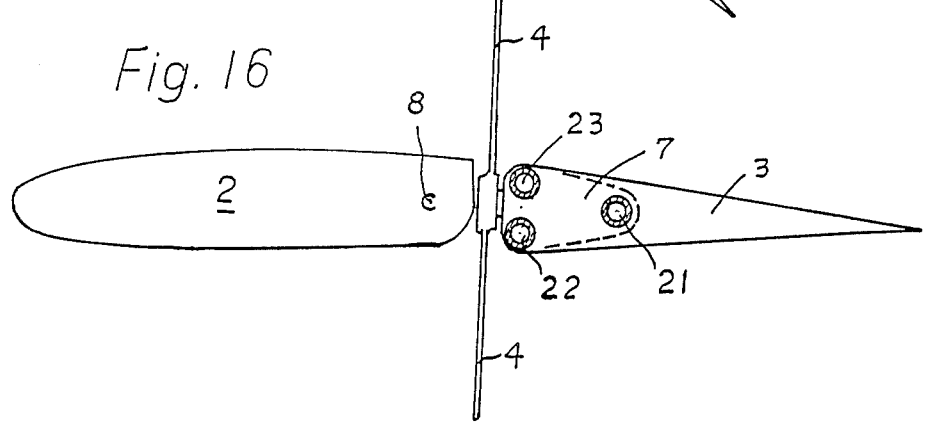
FIG. 16 is a view as in FIG. 14, however with another modification.
Figure 20:
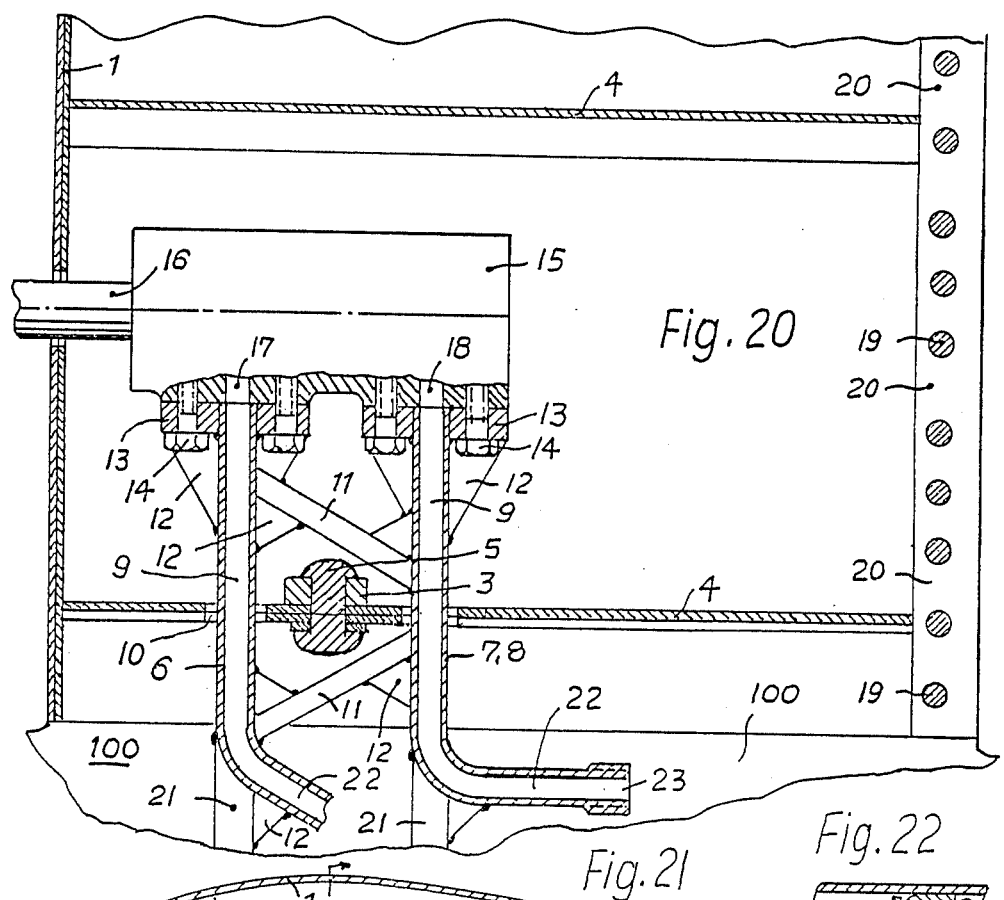
FIG. 20 is a horizontal sectional view through an aircraft wing.
Figure 21:
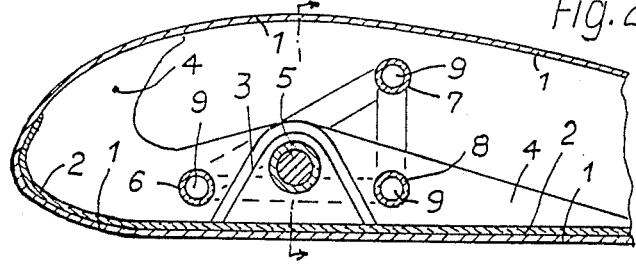
FIG. 21 is a longitudinal sectional view through the wing of FIG. 20.
Figure 22:
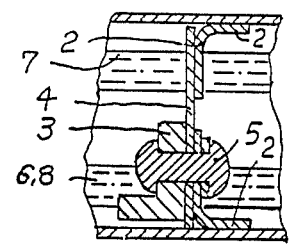
FIG. 22 is a sectional view through FIG. 21 along the arrowed line therein.
Figure 23:
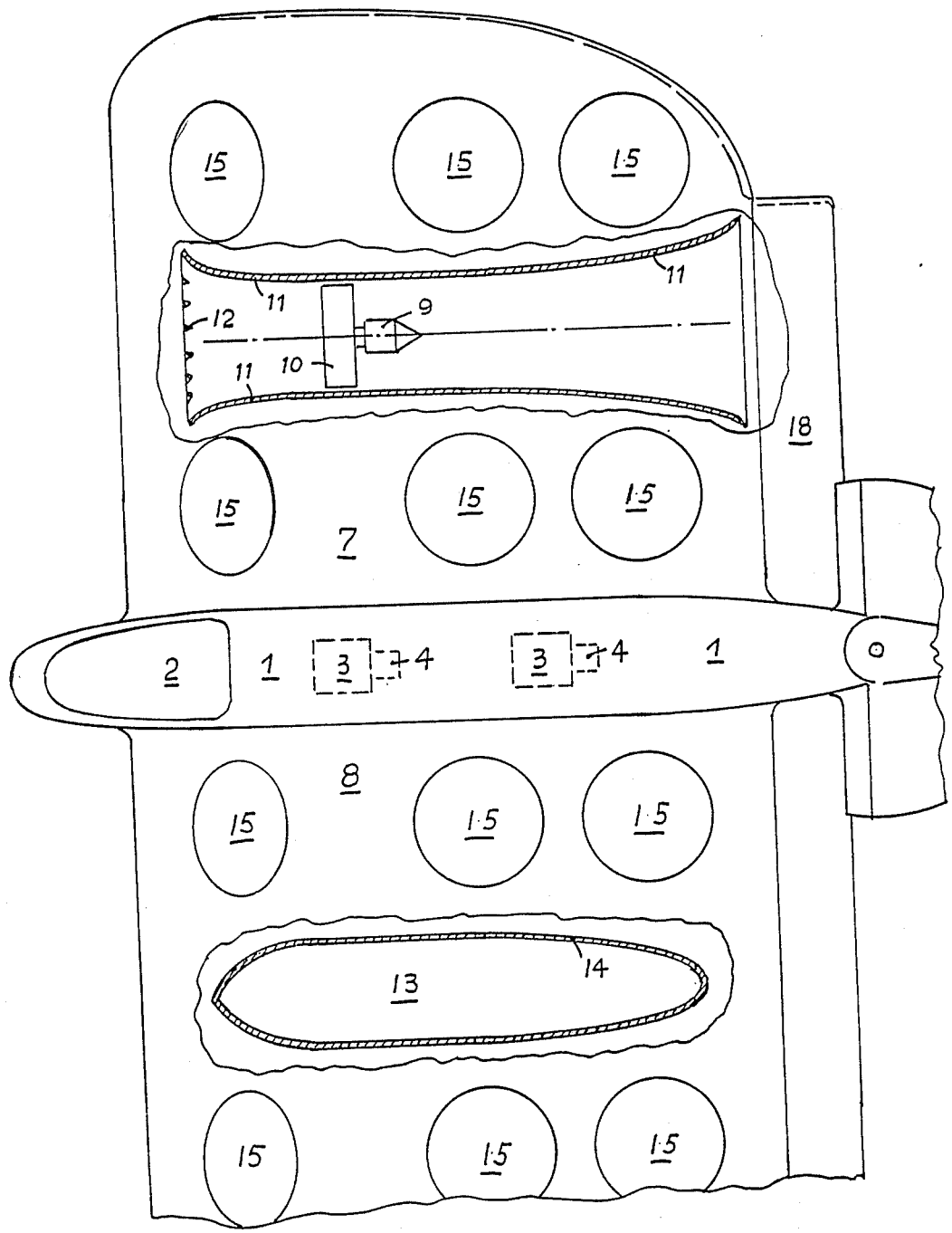
FIG. 23 shows another craft seen from above, partially in horizontal sections.

FIG. 14 with FIGS. 15 to 17 show the main wing 2 with a pipe structure 11,12,13 to form the holding bone structure of wing 2 and also to hold the motor(s) 6 to drive the main propeller 5; for example over shaft 10. One or more of the pipe structures 11, 12,13 are commonly used in my devices to carry the fluid to and from fluid motor 6. How the pipes 11 to 13 may form the structure for the wing(s) is shown in FIGS. 20 to 22 by way of example.

Wing 2 is provided with an assistance wing 3. Assistance wing 3 is pivotable around swing centre 8 or around swing centre 9. The assistance wing 3 is provided with a drive means 7,-for example, with hydraulic motor 7-, to drive a propeller. And the assistance wing 3 is provided with a propeller 4 or assistance propeller 4, to be revolved by drive means or fluid motor 7.

FIG. 14 shows the main wing 2 and the assistance wing 3 wherein the assistance wing 3 is strongly inclined relatively to the main wing 2. This is preferred for take off, landing and in flight with heavy load. In FIG. 14 the assistance wing 3 is pivoted around the pivot centre 8, while it is pivoted in FIG. 15 around a slightly differently located pivot centre or swing centre 9.

In FIG. 16 the assistance wing 3 is shown in the swung up position for speedy forward flight with utilization of assistance propeller 4.

When however, the assistance propeller 4 is not required in speedy forward flight and when it would cause additional undesired fuel consumption or drag, the assistance propeller 4 is set to rest and retracted into the main wing 2 as demonstrated in FIG. 17.

In FIG. 17 the assistance propeller 4 is set to rest and the entire assistance wing 3 is retracted forwardly partially into a respective space in the main wing 2. The assistance wing 3 now forms a portion of the main wing 2 and the propeller 4 becomes invisible and retained within the interior of the now main wing 2, which now consists of main wing 2 with assistance wing 3.

The assistance wings 3 may also be formed around a pipe structure 21,22,23. The pipe structures 21,22,23 may again partially or all of them carry hydraulic fluid to and from assistance propeller motor or drive means 7. Drive means 7 or hydraulic motor 7 revolves the assistance propeller 4 and holds and carries it by a respective arrangement. for example a shaft and a flange.

In FIGS. 18 and 19 the main wing(s) 2 and/or the assistance wing(s) 3 are pivotably borne in a swing bearing-or pivot bearing-arrangement 14,15 or 24,25 respectively. The pivot arrangement may consists of a bearing housing 14 for main wing 2 or 24 for assistance wing 3 with a pivotable bearing body 15 therein for main wing(s) 2 and 25 therein for assistance wing 3. The bearing housings 14,24 may be borne on a respective portion of the body of the craft. The pivotable bearing bodies 15,25 may contain portions of the wing pipe structures 18 to 20 for the main wing 2 and 28 to 30 for the assistance wing 3. The pipes 18 to 20 and 28 to 30 may thereby extend through the pivot bodies 15 or 25 respectively, for example, in order to carry on one of their ends the respective fluid motor 4,5,16 or 26, to carry the wing(s) 2,3 and to have on their other ends the connecters to flexible fluid hoses to the respective pump(s).

FIG. 19 shows also, how the main wing 2 may be borne on a holder 111 which carries the bearing housing 14 above the cabin 1 of the craft.

In FIG. 18 the main wing 2 and the assistance wing 3 are pivoted in the respective bearing housings 14,24 to a suitable position for almost vertical take off and landing. The assistance propeller 26 therein is adding to a smooth flow of fluid over the main wing 2 to reduce the possibility of stalling. The main propeller in this figure is 16 as well as in FIG. 19. The assistance propeller in FIGS. 18 and 19 is propeller 26.

In FIG. 19 the locations of the pivot bearing housings 14 and 24 are the same as in FIG. 18 respectively to the body of the craft. Because the housings are preferred to be fixed on the body of the craft. Changed in FIG. 19 compared to FIG. 18, are the angles of inclinations of the wings relatively to the horizon or flight direction of the aircraft. The change of direction of inclination of the wing(s) 2,3 is effected by pivoting the respective pivot body 15, 25 in the respective bearing housing 14, 24.

In FIG. 19 the wing(s) 2 and 3 now have the location and inclination suitable for forward flight. The assistance wing 3 still retains in the figure a slight inclination or angle of attack, slightly higher than that of the main wing 2. This is suitable to prevent stalling of the craft or to reduce the possibility of stall by the application of the assistance propeller 26 relative to main wing 2. Propeller 26 serves here to draw fluid over the main wing 2 whereby the possibility of stalling of the craft is reduced. When however the craft flies with high forward speed, it may not be necessary any more to consider the possibility of stalling and the drag may become more important for consideration. The assistance wing 3 of FIG. 19 may then be swung or pivoted to a smaller angle of attack, for example to an angle substantially similar to that of the main wing 2 of FIG. 19.

The pivotion of the main wing 2 and/or of the assistance wing 3 may be effected in unison by a common controller if so desired. It is often however also at least temporarily suitable to control the angle of attack of the main wing 2 and of the assistance wing 3 individually. Especially when the craft nears the flight speed of forward flight or when the craft enters acrobatics, where the possibility of stalling could become possible.

In FIGS. 20 to 22 the wing or propeller has an outer skin 1. The main bone structure of the wing is provided by the at least three pipes 6,7,8 with interiors 9. They are extending longitudinally or in an inclination into the respective wing 1. Stabilizing ribs 11 are provided for form a rigid structure by the mentioned at least three pipes and the mentioned ribs. Further stabilizers 12 may be welded between the pipes and ribs. The outer ends of the pipes may be provided with holding plates 13 with plane faces to be adaptable to respective plane faces of a fluid motor 15. Holding means or bolts 14 may fasten plates 13 to the entrance and exit ports 17,18 of the fluid motor 15 in order, that fluid may flow to one or more of the interiors 9 of the pipes 6 to 8 into or out of the entrance or exit ports of the motor 15. Thereby the pipes are holding the fluid motor 15 and they are leading the driving fluid to the rotor to revolve the rotor of the motor and they are leading the return flow away from the fluid motor 15. Shaft 16 of fluid motor 15 may hold and drive the respective propeller.

The inner ends of the pipes 6 to 8 may be bent to form bent inner ends 22. Thereby the pipes have only one single bending and they can be easily cleaned inside, whereby their interiors or passages 9 can be freed from dust and from disexcelled interior material portions after the welding of the ribs. As far as welding is mentioned here, other connections may be done, for example glueing or forming of the entire structure by fibres and resins. In order that the pipe structure can be borne on a body of the craft, it may be provided with holding pipes or holding portions 21 to extend in a direction commonly parallel or equal to the main extension of the pipes 6 to 8. They may however also extend under a relative inclination thereto. Since an aircraft has commonly a left wing and a right wing, the holding portions 21 are commonly in my invention welded to the pipes 6 to 8 of the right wing and of the left wing. Thereby they are forming a medial holding portion of the right and left wing of a common wing pair. These holding portions 21 may be utilized to form the pipes of the pivot bodies 17 or 27 of FIGS. 18 to 19 to have the left and right wing pivoted or be borne in holding bearing housing(s) 14 or 24 in unison.

The wing of this embodiment of the invention is also provided with airfoil-forming substantially vertical skin stabilizers 4 which are forming the outer skin 1 to the respective airfoil section, at least partially.

The stabilizers 4 may be provided with holders 2 to be fastened to the wing's skin 1. Additionally strong stabilizers or holders 3 may be added to permit the application of strong fasteners 5. For example, rivets or bolts 5. The holding portions 2 may be provided partially to the bottom portion and to the outer portion of the skin 1 of the wing. Skin 1 may consits of a single sheet 1 which is just laid around the stabilizers 4 to be fixed together on the rear ends of the wing skin, at location 20. Their fixing together may be done by glueing, or, as shown in the figure, by rivetting. The skin 1 may consists of a single sheet or of pluralities of sheets for example of metal like aluminium or of fibre sheets, for example, carbon fibre, while other suitable materials may also be used. The interior ends of the wing may be fastened to aircraft body 100. The inner ends 22 of the pipes 6,7,8 may extend into the body 100 of the craft. The vertical stabilizers or airfoil shape stabilizers 4 are provided with recesses 10 which are of such a size, that the respective pipes 6,7,8 can be extended through these recesses 10. It is preferred to make the recesses 10 of a bigger size than the outer diameters of the pipes 6 to 8. This prevents breaks by different heat expansions. The main holding of the wing is now done by the holding portions 2 of their fastening by fasteners 3,5 and by their fastening of the respective portions of the skin 1. The portions 2,3 permit according to their strength, a fastening of at least one of the pipes 6,7,8 to the holders 2,3 or 5. A second pipe of pipes 6,7,8 may be kept within a recess in the holding means 2,4,3,5. The arrangement 2,3,4,5 takes therefore over the duty to carry and hold the skin 1 on the pipe structure 6,7,8,11. Breaks are prevented by the sizes of the recesses 10 and by the suitable arrangement of parts 2,3,4 to hold also at different heat expansions of materials. It should be noted, that by the arrangements 2,3,4,5 a fastening of the commonly round or rectangular pipes 6,7,8 on the thin wing skin 1 is prevented. Skin 1 will therefore not be deformed by the pipe structure and thin or small fastening places are prevented. The wing of the invention thereby obtains a great strength at very small weight, even, when the outer skin consits of a single thin sheet of material and even, when it is laid only around the stabilizers 4 and kept together only at the rear end of the skin at location 20. Lateral escape of the wing can be prevented by fastening a portion of the wing to body 100 of the craft or by fastening members 2,3,4 or one thereof to the respective pipe 6,7 or 8.

FIGS. 23 to 27 demonstrate a craft which is capable to swim on water and to float above the water or even to fly through the air. Since it may be used as a pleasure craft on the beach, where also people swim in the water it is provided with several protection means or arrangements to prevent accidents by propellers.

It has a body 1 which contains the pilots seat or passenger cabin 2 and which may also contain the power plant(s) 4 with hydraulic pump(s) 4. On the end of the body 1 are the side rudder 5 and the elevators 6 provided. Laterally of body 1 are extending the right and left wings 7 and 8. The wings 7,8 may be provided with substantially vertically directed or inclined ducts 15 which may contain propellers 16 which are driven by fluid motors 17. Fluid motors 17 are driven by the pump(s) 4. Instead of using fluid motors 17, several arrangements 17 may consists of rotary transmission means to carry the rotary motion of the shaft of one fluid motor 17 to another or a plurality of other transmissions members 17. For example by chains, belts, rotary members with gears and the like.

Laterally on the right and left of body 1 but in a certain distance therefrom are the floating and driving arrangements 11,13 provided. The bottom portion is preferred to be a hollow room 13, see FIG. 26 to let the craft float on the surface of the water. Hull 14 may form the interior empty space 13 and closure device 25 may be provided to empty space 13 in hull 14 from nondesired matters. In the figures the forward driving arrangement is contained in the second floor above the floating compartment 13. It forms a duct 11 to contain a driving means 9, for example, a fluid motor therein for the revolving of the forward propeller 10. Note, that the craft has such arrangements on the right and left wings 7 and 8. Protector ribs 12 are provided to prevent accidental entering of swimmers or of animals into the ducts 11. Accidents by living beings meeting the revolving propellers are thereby prevented.

The vertical or inclined ducts 15 are inclined to longitudinal or horizontal ducts 11 or are normally arranged thereto. To prevent accidents with the propellers 16 in the lifting ducts 15, the ducts 15 are provided with swing doors 21 on the bottoms of the durcts 15. Doors 21 are pivotable around the holding axes 22. Doors 21 may also be used to direct the direction of the leaving fluid streams from the propellers 16 and ducts 15 more or less downwardly or more or less to the rear of the craft to either lift the craft or to drive it forward and thereby to assist the action of the horizontal driving propellers 10 in ducts 11.

Figure 24:
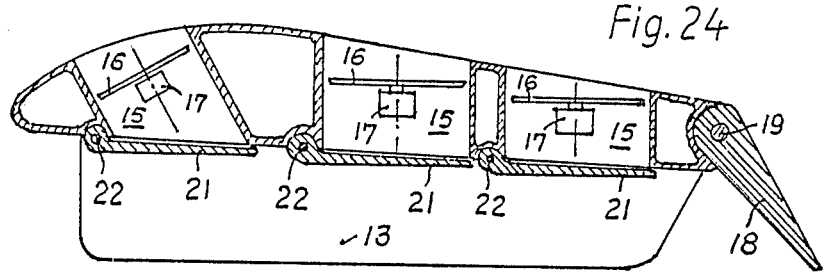
FIG. 24 is a longitudinal sectional view through a portion of FIG. 23.
Figure 25:
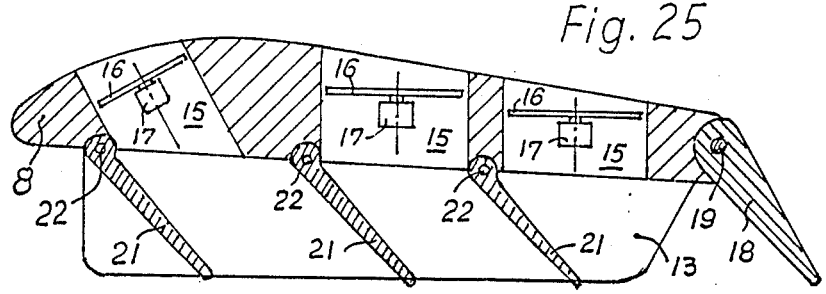
FIG. 25 is a view as in FIG. 24, however with a modification.
Figure 26:
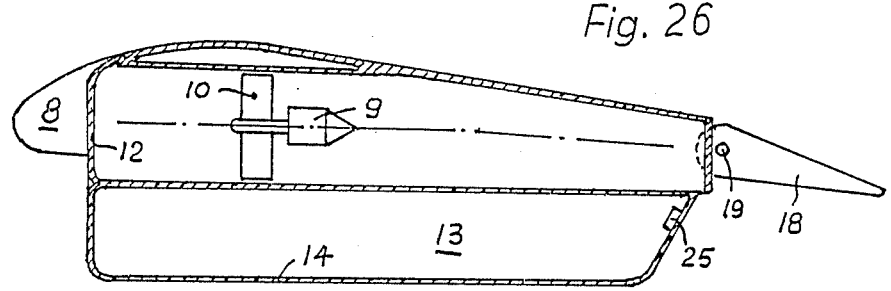
FIG. 26 is a longitudinal sectional view through a portion of FIG. 26.

On the rear of wings 7 and 8 are the swing plates 18 provided and pivotably borne on pivot bars 19. These swing plates 18 are serving to create below the wings 7 and 8 and between the body 1 and the floats 13,14 a lifting space 20. See FIG. 24. In this space 20 a pressure develops which exceeds the atmospheric pressure slightly, when the craft moves forward or when the vertical lift propellers 16 are revolving. The angle of inclination and the extension of size of swing plates 18 influence the pressure in the lifting space 20. When the craft obtains higher forward speeds, the swing doors 21 may close, as shown in FIG. 24. The closing of them may be done automatically by drag at forward speed and by stopping the lift propellers 16 in ducts 15. The craft as shown in FIG. 24 now floats above the surface of the water in the rolling air effect below the wings 7,8 and swing plate 18. This style of flight in a slight height of commonly less than a meter above the surface of the water can be obtained with less power, than the real flight higher in the air. At high speed forward flight, which requires a higher power supply, than the movement in FIG. 24 style, is shown in FIG. 26. The rear swing plates 18 are now directed more upwards to form rear extensions of the main wings 7 and 8. The lifting space 20 is now eliminated and the craft now flies on wings 7,8 with extensions 18, as a normal aircraft.

FIG. 27 shows, that instead of using swing doors 21 it would also be possible to use slots 23 with retractable and extendable plates 24 therein to influence the lifting space 20 accordingly. The lower speed the craft has, the longer may the plates 24 be downwardly extended. The higher the forward speed of the craft becomes, the more may the plates 24 be retracted into the slots 23. Whether the lift propellers 16, drive means 17 and ducts 15 are provided or left away depends on the actual design case by case.

It is uncomfortable to have big diameter forward drive propellers 10 in a pleasure craft. However only big diameter propellers are effective at low speed. Where high take off speed is permissible, the lifting devices 15,16,17 can be spared. But where the craft shall move out of the water at very low forward speed, it is preferred to set and to provide them.

Figure 28:
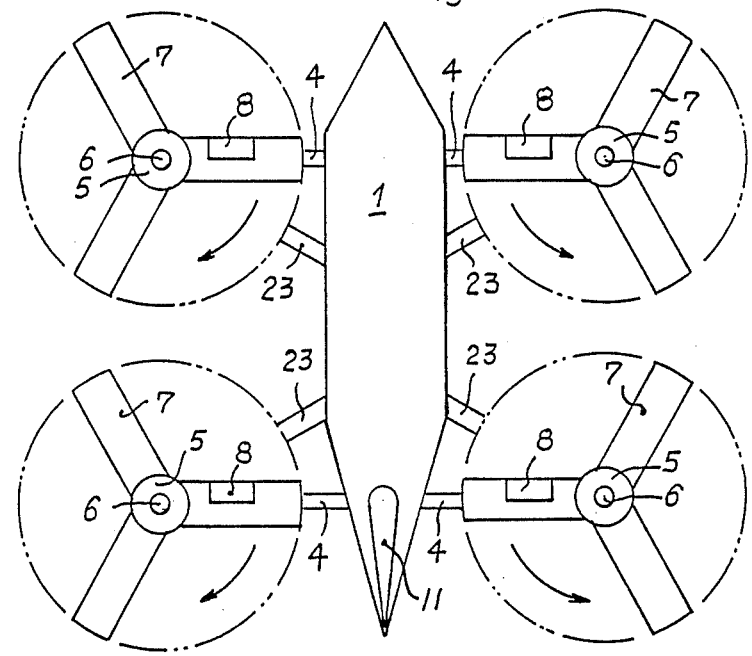
FIG. 28 shows an aircraft of the invention seen from above.
Figure 29:
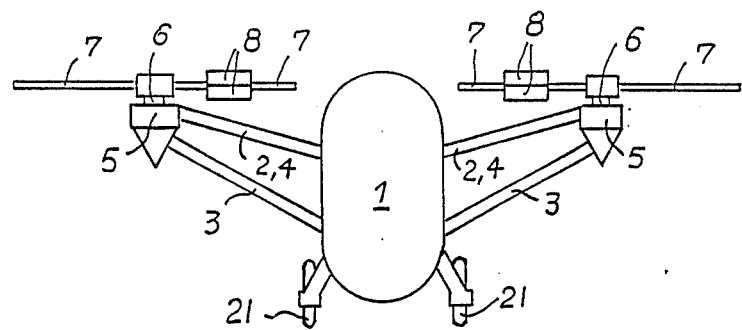
FIG 29 shows the craft of FIG. 28 seen from the front of it.

FIGS. 28 and 29 define a craft of the invention, which is simple and inexpensive and which is provided with an accident prevention device. The accident prevention device transforms the helicopter of these figures into a glider. By transforming the craft from a helicopter into a glider in accordance with this invention, the possibility of crashing of the craft after auto-rotation and failure of the landing maneuver out of auto-rotation is prevented. The craft therefore is more safe and can afford a gliding as a glider does. Thus, when all power plants of the engines fail or the driving of the propellers has otherwise failed, the craft does not need to crash but can fly on the same style as a glider does. If the craft is heavy and the propellers are small, the gliding angle may however be of a steeper inclination than that of a high performance glider of the present time.

Body 1 carries the power plant and the transmission to the drive means 6 to revolve the plural helicopter propellers 7 on both sides of body 1. Body 1 also may be provided with a side rudder 11 and with wheels, skids or floats 21. As drive means to revolve the propellers 7 any suitable means may be applied, as described above. The propellers 7 might also be driven by individual power plants, which then must not be located in the body 1. I however prefere to have at least one power plant in body 1 to drive a multi flow hydraulic pump which leads through holders 2,3,4 fluid to and return from fluid motors 5. Each fluid motor 5 is driven by an individual flow of fluid and revolved with equal rotary velocity or with proportionate rotary velocity relative to an other one of the fluid motors 5. The propellers 7 are fastened to the revolving shafts 6 of the fluid motors 5 and they are driven thereby in normal multiblade helicopter flight. In the figures the rotary directions of the propellers 7 are however in the directions of the arrows in FIG. 28. This is important in this arrangement.

According to the invention, the propellers are on portions of their trailing edges of the chords provided with resistance providing drive bodies 8. They may be swing plates, as later will be seen in other figures. Normally the bodies 8 are parallel to the skin of the propellers and they are then almost not visible. They are then just a portion of the airfoil section of the propeller blade(s).

If now an accident occurs, that the drive means to drive the propellers 7 stops, the craft has still a forward flight speed. A means of the invention is then provided to open the bodies 8 and thereby to actuate them. The forward speed of the craft now acts against the bodies 8 at their respective backwards swings. See hereto the arrows in FIG. 28. The forward speed of the craft provides an airflow against the resistance bodies 8. See FIG. 29. The airspeed now acts against the bodies 8 and ties to run them along with the equal air speed, which the body 1 has relatively to the air. Since the bodies 8 are arranged closer to the centre of the propellers 7 than the tips of propellers 7 are, the propeller blades which are on the opposite sides of the centres of the propellers 7 in forward swing have tips which run with higher speed than the air speed is and than the bodies 8 are running. This higher speeds of the outer portions of the propeller blades are now providing a lift. The lift may be almost as high as the lifting force was, when the propellers 7 were driven by the power plant. However that is the case only, when the craft maintains a high forward speed. The pilot will therefore try at such an emergency situation to run his craft of these figures with high forward speed. As for example was explained at hand of FIGS. 4,5. The faster the forward speed is, the higher becomes the rotary velocity of the propellers 7 and as smaller becomes the angle of inclination of the gliding flight. The bodies 8 of this present embodiment of the invention are thereby taking over the emergency propeller drive functions of the propeller sets 28,29 of FIGS. 4 and 5. A description of details of preferred embodiments of resistance bodies 8 are given for example in FIGS. 30 to 40.

In FIGS. 30 to 32 the free-wheeling arrangement or one-way clutch arrangement 9 is provided between shaft 6 and propeller centre housing 13. The propellers 7 have the resistance bodies 8. These are however in the radial inner or medial portions of the arms 7 of propeller 7 located. The resistance bodies 8 are serving as in the helicopter of FIGS. 28,29. The figures demonstrate the actuation of the resistance bodies 8. The resistance bodies may be plates 8. The resistance bodies are pivotably borne on a radially or substantially radially extending pivot bar 19 in propeller 7. Springs 20 may be provided to keep the resistance bodies 8 within the propeller blade airfoil section, for example in spaces 107. The bodies 8 are then fully retracted into the propeller blade, for example, as seen in the left portion of FIGS. 30 and 31. Shaft 6 is preferred to be stationary, while drive means 106 drives the propeller 7, when the power plant operates. When the driving means 106 fails, the free wheel means 9 permits the revolution of the propeller 7 around the stationary control shaft 6.

Control shaft 6 is provided with a control cam 10. A radially moveable piston 12 is provided in a guide 14 and subjected to the spring 17 on holder 15 of piston 12. The spring 17 presses the control piston 12 radially inwards towards the centre of the propeller 7. The piston 12 has a top portion 16 which is preferredly formed as a taper.

When the arm 7 of the propeller spins around, the inner end of piston 12 is freely revolving in the interior space or propeller hub in the centre housing 13. But when the piston 12 nears the control cam 10, and then moves over the control cam 10, the inner portion of piston 12 meets cam 10 and the piston 12 is thereby pressed radially outwards. Piston head 16 then meets the thrust portions 18 of the resistance bodies 8, presses against them and thereby with entering of the taper 16 into the thrust portions 18, the resistance bodies 8 are forced to open by swinging around the pivot axes 19. The bodies or resistance bodies 8 are thereby spread outwards as long as the inner end of piston 12 moves over the stationary control cam 10. As this move over cam 10 is done, the springs 17 force the piston 12 back into the innermost position of rest; the springs 20 are forcing the arresting bodies 8 back into their innermost positions in the propeller airfoil, because the piston head moves away from the thrust portions 18 and out of the space between them. FIG. 32 is an enlargement of the section through FIGS. 30,31 respectively to show the details more clearly. The size, location and configuration of cam 6 thereby decides at which angles of rotation the resistance bodies 8 are in the innermost position in the propeller blade and thereby not effective and at which angles of rotation the resistance bodies 8 are moved partially or entirely into their outermost and thereby outer position, which is the position and location of extension out of the airfoil section of the propeller blade 7 and thereby the effective position which provides the drive for rotating the propellers 7 at forward flight speed in the gliding action of the craft, for example of FIGS. 28 and 29.

In FIG. 33 a modification of the arrangement to operate the resistance bodies 8 is demonstrated. Shown therein is the revolving medial portion 13 of propeller 7. It has cylinder 28 in the respective rotor blade 7 and a piston 29 loaded by a spring 30 movable in cylinder 28. The stationary shaft 6 is provided with fluid lines 24,25 and fluid parts 26,27 of the fluid lines 24,25. During the revolution of the propeller the ports of the respective cylinders 28 are running alternately over the high pressure port 26 and over the low pressure port 27. When they run over the high pressure control port 26 the pressure in fluid forces the piston 29 radially outwards whereby its shaft 31 can take over the function of piston 12 of FIGS. 30 to 32. When the cylinder-port moves over the low pressure control port 27, the spring 30 forces piston 29 back into its innermost location. Thus, when the port of the respective cylinder 28 moves over a high pressure port 26, the resistance bodies 8 are forced into their outermost and effective position. But when the respective port of the respective cylinder 28 moves over the low pressure control port 27, the resistance bodies 8 are returned into their innermost and ineffective position of location within the airfoil of the propeller blade 7. It is therefrom easily understood, that the location and size of the control ports 26 and 27 are defining at which angles or angular intervals of rotation of the propeller blades the resistance bodies 8 are in their effective and in their ineffective positions.

Still a further modification to operate the resistance bodies 8 is shown in FIGS. 36 to 39 and a calculation is given in FIG. 40.

FIGS. 36 to 39 thereby demonstrate an arrangement to control the activity of the resistance bodies 8. Drive means, for example fluid motor, 5 may revolve the shaft 6 which holds the propeller 7. A free-wheeling arrangement may be provided in drive motor 5 or in the propeller centre portion 13. This embodiment of the invention now provides a control housing 50 with a piston 52 moveable therein. Spring 51 presses the piston 52 into the upwards position to engage and actuate the resistance bodies 8, for example, to engage their feelers 60,61 and press then upwards.

As long as however the motor 5 operates or the power plant of the craft operates, a fluid under pressure is led through passage 54 into the other cylinder portion 53 of body 50 onto the spring-remote end of the piston 52 to force the piston 52 downwards and against the spring 51, thereby compressing the spring 51. When the power plant operates, the thrust portion 10 of piston 52 can thereby never meet the feeler 60,61 of the resistance body' 8's control arrangement. The resistance bodies 8 are thereby automatically and at all times remaining in their innermost and ineffective positions of location within the airfoil section of the respective blade 7 of propeller 7. This innermost or ineffective location of resistance bodies 8 is clearly demonstrated in the enlargement FIG. 37 of the cross-sectional view through the propeller along the right arrow in FIG. 36.

When now however the power plant fails to operate, or, when the Oilmotor or fluid motor 5 fails to get oil under pressure or fluid under pressure, there will also be no pressure in the fluid in fluid passage 54. The spring 51 then immediately presses the piston 52 upwards in control housing 50, whereby the upper control end 10 of piston 52 enters, the location of the feeler 60,61 of the resistance body operation arrangement. FIG. 39 shows the control end of piston 52 in a greater scale. Thereby it is also shown, that the piston end 10 may carry a control cam 55 with a guide face 56 of a specifically curved configuration. As soon as the pressure is lost in passage 54 the control face 56 is now within the defines of movement of the feelers 60,61 of the control arrangement to control the operation of resistance bodies 8. The feelers may consists of a swing arm 59 with rollers 61 borne on an axis or bar 60. When the rollers 61 are rolling the control or guide face 56 of cam 55, the swing arm 59 becomes angularily pivoted around its pivot bar 57. Pivot bar 57 may be borne in bearings 58. FIG. 39 is thereby principally a section along the left arrow in FIG. 36. Pivot bar 37 extends radially in the propeller arm 7 towards the location of the right arrow in FIG. 36 and is therefore also visible in cross-sectional FIGS. 37 and 38. So are the bearing members 38. The pivotion of bar 37 by the rolling of feeler rollers 61 over the guide face 56 brings the cam(s) 110 in FIG. 38 into engagement with the thrust portions 118 and 218 of the resistance bodies 8. Thereby the resistance-bodies 8 are pivoted around their pivot bars 63 into the outer position outwards of the propeller blade airfoil section.

FIG. 38 shows the resistance bodies 8 in their outermost or effective location or position.

FIG. 37 shows the resistance bodies 8 in their innermost or ineffective position within the airfoil of the propeller blades.

When the feeler roller 61 has departed from the guide face 56 of cam 55 of piston 10, the swing arm 59 moves down again and the resistance bodies 8 are returning under the force of closing springs 65 into their innermost and ineffective location and position inside of the outer configuration of the airfoil of the propeller blade. The guides 62 may be provided in the airfoil or propeller blade to hold the resistance bodies 8 in their innermost positions. The resistance bodies 8 are then forming, as seen in FIG. 37, a portion of the airfoil shape of the respective propeller blade 7. Pivot bars 63 may be borne in bearings 64. As soon as the power plane works again, the pressure in fluid in the fluid will enter into space 53 and press the piston head 10 downwards together with piston 52 in control housing 50. The arrangement 50,10, 55,56 can then not interfere any more with the feelers 59,60,61 and the resistance bodies 8 are remaining in their innermost and ineffective locations of FIG. 37 inside of the airfoil-section of the propeller blade. It will be easily understood from this explanation, that the location and size as well as configuration of the members 55,56 in combination with the entire arrangement will strictly define at which angular intervalls of revolution of the respective propeller blade 7 the respective resistance bodies 8 are in the effective or in the ineffective position and location.

FIG. 40 gives a mathematical explanation in relation to FIG. 36, at which distance from the centre axis of the properller 7 the resistance bodies 8 should be located. This distance is "A" and a mathematical relationship to the distance "B" of the concentrated medial calculation point of the propeller arm. "Eta" in the final equation of FIG. 40 demonstrates the losses which will appear and "Vo" is the forward speed of the craft. The resistance bodies 8 would provide the speed "Vo" to arm length distance "A", if the arrangement would be hundered percent effective, whereby "eta" would be "1". The lift of the propeller arm would then be:

$$L_L = (F_l/2)C_{LL}(\zeta/2)(2A\pi\eta/60)^2$$

or:

$$L_L = (F_L/2)C_{LL}(\zeta/2)[(F_LCW_L/F_RCW_R)B^2/\eta].$$

When calculating the lift of the propeller arm through by the above equations, it will be found, that at high forward speed "Vo" of the craft the lift of the propeller arm remains considerable and the propellers are thereby capable of bearing the craft in a gliding flight under a certain inclination towards the ground. The pilot will have time to look for a suitable emergency loading place and be able to afford an emergency landing with the comfort of less risk of failure than with "autorotation flare out" of a helicopter.

In the above equations the drag factor Cw of the resistance body 8 is much higher, than the drag factor of the opposite propeller arm. For example, the drag factor of resistance body 8 may be about "Cw"=0.8 to 1.1; while the drag factor of the opposite propeller blade may be about "Cwl"=0.02 to 0.10. In the difference of the drag-factors the basis is given for the working effect of the arrangement of the resistance bodies 8 to drive the revolving of the propellers in accordance with this embodiment of the invention.

Figure 41:
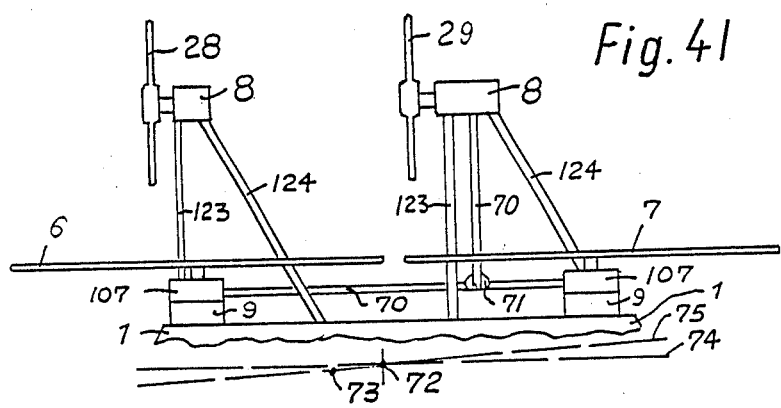
FIG. 41 shows a vehicle seen from the side.
Figure 42:
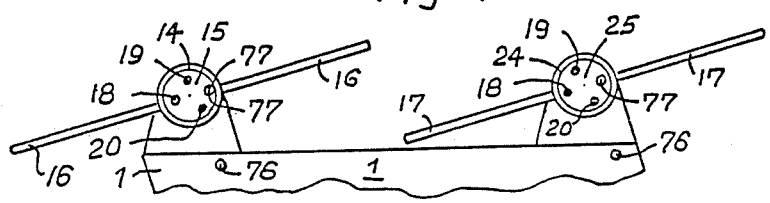
FIG. 42 shows the vehicle as in FIG. 41, however with a modification.

FIG. 41 demonstrates another system of the invention for automatic transformation of the craft into a glider, when the main engine(s) fail or the driving system fails. The craft shown therein has at least two propellers with substantially horizontal axes and at least two propellers with substantially vertical axes. The propellers 6 and 7 with the substantially vertical axes are carrying the helicopter in the air. The first propeller 28 with the substantially horizontal axis is driven by the main power plant. This may be plant 8 or a plant 9 in body 1 which transmits the power over or along holders 123,124 to the drive means 8 of propeller 28. The power-driven first propeller 28 creates an airstream which drives the helicopter forwards and which is directed towards the second propeller 29. This airstream is revolving the second propeller 29 with the substantially horizontal axis substantially as if it would be the propeller of a wind mill. The airstream-driven propeller 29 revolves over a holding arrangement 123,124 with a transmission portion 8 over further transmission portions 70,71 the transmission portions 107 which bear and revolve the propellers 7. In other words, the power-operated propeller 28 creates the airstream which drives the airstream driven propeller 29, while the airstream power which operates the airstream driven propeller 29 also operates and drives the carrying propellers 7 of the helicopter with body 1. Such style of operating and driving the carrying propellers 7 of the craft is not every economic, because it has losses at many places. For example losses of power in the first propeller 28 when this propeller creates the air stream; further losses in the second propeller 29 when the airstream drives this propeller, and further losses in the transmission between the second propeller 29 and the carrying propellers 7.

However, the arrangement of this embodiment of the invention is a very safe system of flying. It is especially convenient for beginning flyers. Because it provides an automatic gliding of the craft to the ground, when the drive means of driving the power-driven propeller 28 fails. Because, when the propeller 28 fails and comes to rest, an automatic device, depending on the power supply, will shift the gravity centre of the craft from location 72 to location 73. The craft which before had the location parallel to line 74 will thereby get the inclination parallel to line 75. This is the angle of gliding of the craft. The craft continues to glide forwards along the path parallel to dotted line 75 and thereby has enough forward speed to continue to drive the second propeller 29. Because since propeller 29 moves through the air forwardly it is the similar effect as if the first propeller 28 would blow an airstream towards the second propeller 29. Propeller 29 therefore continues to revolve and continues to drive the lifting propellers 7 which carry the craft. No operation of the pilot is required because the transformation from powered flight to powerless gliding occurs automatically. The craft therefore provides greater safety for a chance of a successful emergency landing. The possibilities of crashing at landing are not much greater than those of a glider plane. Quite naturally, the angle of attack especially of propellers 28,29 and 7 must be made suitable and so must be the diameters in order that propeller 29 has the capability to drive the carrying propellers 7.

Figure 44:
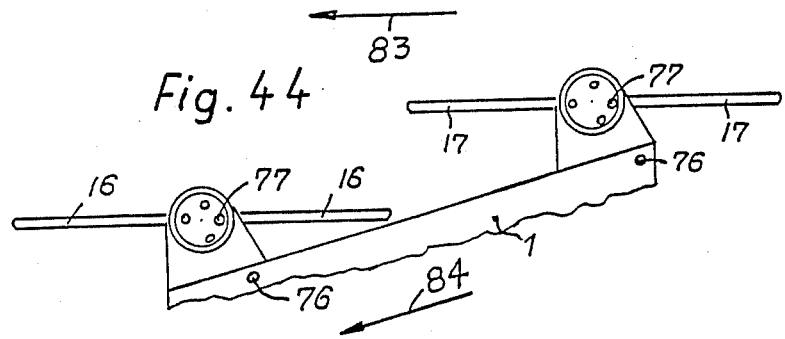
FIG. 44 shows the vehicle of FIG. 41 by a portion thereof and modified.

FIGS. 43 and 44 demonstrate a still further embodiment of a selftransforming helicopter-glider of the invention. Body 1 of this craft has at least two propellers 16,17 which are borne on pivot members 15,25 or pivot bodies 15,25. The bodies 15,25 have holding provisions 77 and the body 1 has second holding provisions 76. An automatic element 78 has third holding provisions 82 on the ends of the element. The element 78 is basically a cylinder and has therein a reciprocable piston 79 with a spring 178 on one end thereof and a pressure chamber 81 on the other end thereof. An entrance 80 permits a pressure fluid to enter into chamber 81. One holding provision of the third holding provisions is on the cylinder 78, the other on the piston 79. The automatic elements 78 are mounted with their third holding provisions to the first and second holding provisions 77,76 of the pivot bodies 15,25 and the body 1. The automatic element 78 thereby pulls the right arms of the propellers 16,17 downwards, whereby the left or front arms of the propellers are pivoted upwards. The entrances 80 of the automatic elements 78 are communicated to a fluid pressure pump of the power plant. The power plant also is provided with transmission means or power transfer means to revolve the propellers 16 and 17. When the power plant gives enough power supply, the propellers 16 and 17 are revolving and the fluid which enters into the space 81 in the automatic elements 78 now compresses the springs 178 and moves the pistons 79 upwards. Thereby the right or rear sides of the propellers 16,16 are moved upwards, whereby the left or front arms of the propellers are inclined downwards. They now have the positions as in FIG. 42. The pivot bodies 15, are thereby pivoted in their bearing bodies or bearing housings 14,24. The craft is now lifting upwards and flies forward under the forward inclination of the propellers 16 and 17. When now in flight the power plant fails, or the drive means to revolve the propellers 16,17 fails, the pressure supply into space or chambers 81 of the automatic element 78 fails also. The springs 178 are now pressing the piston 79 inwards, whereby the rear portions of the propellers 16,17 are pulled downwards and the front portions are pulled upwards to obtain the positions of FIG. 44. The helicopter is now a gyrocopter and glides under an angle 84 downwards to the ground. Respective automatic drive means with forward-flight response, like resistance bodies 8 of FIGS. 36 to 39 or the like might be added to the propellers 16,17. Thereby also this craft assures a gliding forward flight under inclination 84 to the ground.

FIGS. 34 and 35, partially also FIG. 33, demonstrate an auto-rotation actuation device of the invention. It may be actuated by a control action of the pilot. I prefer however the automatic actuation, when the power suplly device fails. According to this embodiment of the invention the propeller blade 77 is provided with a swing-portion or extension portion 7 and/or 39. The second-left bottom portion of FIG. 35 shows the propeller 7 in the normal form. Contrary thereto the rightmost figure on the bottom of figure 35 shows the propeller portion 777 in a pivoted angle and with extended extension blades 39. The usual form of the mentioned second-left figure is usually fixed and non-changeable. The variable or pivot portion 777 is pivotably borne in bearing 45 of the propeller blade. For automatic actuation of the auto-rotation of the propeller, the medial propeller portion has a fluid supply line 22 which continues as fluid line 23-35 towards a chamber 33 in a cylinder arrangement 32 with a reciprocable piston 34 therein. The opposite end of the piston 34 is loaded by a spring 30. Spring 30 presses the piston 34 with piston shaft 36 thereon rightwards in the figur, or, for example, outwards in the propeller arm. Piston shaft 36 has swing connectors 37 with respective connection arms 137 which are connected by connectors 38 to extendable blades 39. The blades 39 are guided in a slot 40. When the spring 30 presses the piston 34 outwards, the linkages and connectors 37,137,38 are pressing the extensions or blades 39 outwards in guide slot(s) 40. Piston shaft 36 has in the figure also a pivot-arrangement portion or guide arm 44. Arm 44 extends through a recess 42 in the inner bearing body into an inclined pivotion guide recess 43 in the propeller arm. The movement of arm 44 in the inclined guide slot 43 provides a pivotion of the pivot portion 777 in the propeller arm 77. When the piston shaft 36 moves leftward under a fluid force in chamber 33 against the spring 30, the pivot portion 7 pivotes into the position of equality to the propeller blade, namely into the direction of blade portion 7,77 of the second-left bottom portion of FIG. 35. When the piston shaft 36 moves to the right in the figure, the guide slot 43 with finger 44 therein pivotes the pivot portion 777 into the position of the rightes bottom portion of the figure. FIG. 34 shows the propeller arm seen from front or rear. When no fluid pressure is in chamber 33, the pivot portion 777 has at all times the location or position of the rightmost bottom portion of FIG. 35. This is the auto-rotation position. If however the power plant supplies power to revolve the propeller(s), a fluid pump, driven by the power plant supplies a fluid under pressure to passage 22. From there it is passed through passages 23,35 into chamber 33 in cylinder 32 to compress the spring 30 and thereby to retract the piston arm 36. At this retraction, the finger or feeling arm 44 slides in recess 43 and thereby pivots the pivot portion 777 into the normal position of the angle as in the second-left bottom figure. At the same time the retracting piston shaft 36 retracts over arrangements 37,137,38 the extensions or blades 39 fully back into the guide slot or holding slot(s) 40. The pivot portion 777 has then become a normal propeller portion as that in the second left bottom figure and acts as a usual propeller-portion.

If however, the power supply fails, the fluid pressure in passage 22 also fails. The pressure in chamber 33 fails also and the spring 30 acts as usual, namely by pressing the piston 34 outwards to pivot the pivot portion 777 of the invention into the angular direction of the rightest bottom figure, while at the same time the extensions 39 are moved outwards into the outermost extended location.

The craft now starts to decend. The pivoted propeller-portion 777 is now in an airstream from the left to the right in the bottom FIG. 35. Actually it sinks in the air and the arrangement is 90 degrees turned in actuality. The pivoted portion together with extensions or blades 39 now provide a big resistance against the air. The almost rectangular angle with only slight inclination relatively to the right angle to the air forces the pivoted portion 777 to move with a high speed in the direction of the arrow of FIG. 35. The force of the air onto the pivoted portion 777 is very high, because the "Cw" factor of drag is almost "1", and the area with the extended blades 39 is great. The mentioned force is thereby able to force the propeller to revolve. The rest of the propeller, the normal propeller then continues to act as a typical helicopter propeller and carries the craft down to the ground with a certain speed of descent. The speed of descent depends on the sizes, angles of the arrangement of the invention and of the size and angles of attack of the rest of the propeller blade(s) which revolve in this state of auto-rotation by the pivot portion 777 of this embodiment of the invention.

Figure 45:
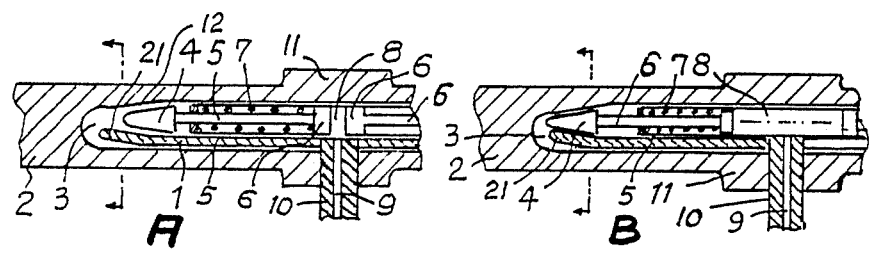
FIG. 45 shows sectional views through a propeller portion.

FIG. 45 demonstrates in its figure portions A to D still another arrangement of the invention for automatic provision and actuation of the auto-rotation of a helicopter blade when the drive means to drive the blade fails. The propeller arm 2 is provided with a reception space 1. A support member 1 is located in the reception space 3. Support member 1 may be borne by the shaft 10 of the propeller. Support member 1 forms a preferredly tapered thrust portion 21, while a complementary thrust portion of preferredly opposite and diametric tapered form is formed by 12 in blade 2 on reception space 3. The reception space 3 contains also a cylinder 5 with a one-end spring loaded reciprocable piston 6 therein. The piston shaft 6 carries on one of its ends a thruster 4 of preferredly also tapered configuration for possible fitting and thrusting into the space between the mentioned thrust-portions 12 and 21. In the position of rest, which is also the position for auto-rotation of the propeller blade(s) 2, the piston 6 is pressed by spring 7 into the cylinder 5 for the innermost position therein. The thruster 4 is then remote from the thrust portions 12 and 21. The propeller has now the angle of attack suitable for auto-rotation. This angle is commonly about 4 to 12 degrees smaller than the angle of attack for flight as a helicopter. Figure portions C and D are sections along the arrowed lines of figure portions A and/or B. Figure portion D shows the cross-section of the propeller blade 2 in helicopter flight position with angle "alpha" the angle demonstrated under portion D. Figure Portion C shows the usual or resting position of the propeller blade 2, which is also the auto-rotation position with angle of attack "beta", (see the angle "beta" under the figure portion "C").

The propeller is usually under the position "C" of angle "beta". When however the power plant starts to supply enough power, a fluid pump driven by the power plant of the craft supplies a fluid under pressure through the passage 9, which may be set through the propeller bearing shaft 10 into the chamber 8 in cylinder 5. This pressure in fluid compresses the spring 7 and moves the respective piston(s) 6 outwards in the respective cylinder 5 into the outermost position. Thereby the thruster 4 on the other end of piston or piston shaft 6 moves into the clearance between the thrust portions 12 and 21 of the support member 1 and of the reception space 3 of blade 2. Thereby thruster 4 presses the thrust portions 12 and 21 away from each other. The propeller blade 2 is of slightly deformable material, like for example, aluminium or carbon fibre and the blade portion between centre 11 and thrust portions 12 and 21 has no other choice, but to deform slightly under the thrust of thruster 4 to obtain the position of figure portion "D" of angle of attack "alpha" for flight operation as a helicopter. Thus, as soon as the power plant supplies enough power, the rest of the propeller blade is tilted into the helicopter operation position of figure portion "D" and this effect appears automatically. The helicopter is ready to start and to fly. As long as the power plant supplies enough power, the pump maintains the pressure in chamber 8 and the propeller blade's main portion maintains the position "D" of helicopter flight operation. When however the engine or power plant fails, for example during the flight of the helicopter, the pump also fails to supply the fluid into chamber 8. The spring 7 then presses the thruster 4 away from the thrust portions 12 and 21 because it presses the piston 6 inwards to the innermost position, the position of rest. The thrust portions 12 and 21 can now move towards each other again and they do so under the stresses in the propeller blade portion between parts 11,12,21, because the spanned stress in this blade portion now automatically forces the blade 2 back into the free, resting and not twisted or stressed position of rest and of auto-rotation of figure portion "C". The helicopter will now descend in auto-rotation as a usual helicopter. However, the change from flight to auto-rotation has been accomplished automatically with the arrangement of this figure of the invention. The invention has thereby freed the pilot from any action for change of flight to auto-rotation. The craft which is provided with this embodiment of the invention has thereby obtained an additional safety.

Figure 48:
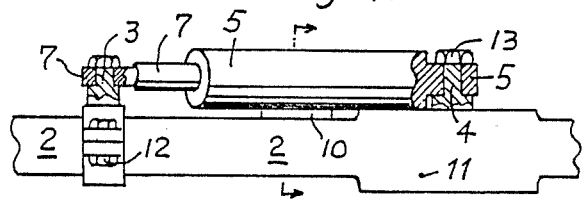

FIGS. 46 to 48 demonstrate another sample of an embodiment of the invention for the provision of an automatic auto-rotation to a helicopter blade or to helicopter blades. This embodiment of the invention can be provided to existing propeller blades of helicopters, when the blades are made of slightly flexible materail for example of aluminium, Kevlar, Carbon fibre or the like. A holder 1 becomes fastened around a portion of the propeller blade 2. It may be fastened by holders 12. Holder 1 has a holding bar 3. The medial propeller portion 11 becomes provided with a second holding bar 4. A cylinder 5 becomes pivotably fastened with its end to holding bar 4, while the reciprocable piston 6 of cylinder 5 becomes fastened with the end of its shaft 7 to the holder bar 3 of holder 1. A fluid line 9 becomes provided and connected to a fluid line which is not shown in the figure to transfer fluid by a communication to entrance 8 of cylinder 5 into the outer chamber 55 in cylinder 5. The fluid through passage or fluid line 9 is supplied from a pump, which is driven by the power plant of the craft. It has a pressure overflow or relieve valve for safety to prevent too high a pressure in fluid line 9.

Usually there is no pressure in chamber 55 of cylinder 5. The piston 6 is without load. The outer portions of the propeller blades 2 have the position of rest or of auto-rotational angle, as in figure portion "C" of FIG. 45.

When however the power plant starts to supply enough power to revolve the propeller blade(s) 2 with enough rotary speed, the mentioned pump starts to supply a fluid under pressure to fluid line 9. This fluid moves under this pressure into chamber(s) 55 in cylinder(s) 5 and presses the piston(s) 6 inwards in the cylinder(s) 6. Thereby the distance between the holder bars 3 and 4 shortens. The portion of the proepller blade 2 between holders 1 and the medial portion 11 has now no other choice, but to transform under stress from the resting position of FIG. 45-C into the helicopter operation position of FIG. 45-D. This position is maintained as long as the power plant operates and the helicopter flies under power. When however the power plant fails to supply enough power, for example in flight, by accident, the pressure and fluid in line 9 disappears and it also thereby disappears in chamber 55 of the respective cylinder 5. The blade 2 re-forms under its stress in the portion between 1 and 11 to the position of rest and of auto-rotation of FIG. 45-C. The helicopter now descends to the ground under autorotation of the propeller blades(s) 2.

Again, the change from power flight to power-less auto-rotation of the propeller(s) of the helicopter has become accomplished automatically and without a pilot-action by the embodiment of the invention. FIG. 46 shows the propeller portion from the top. FIG. 47 shows the position of FIG. 46 seen from in front and FIG. 48 is a cross-sectional view through FIG. 47 along the arrowed line of the figure. Shown in FIGS. 46 to 48 is also the layerbody 10, which may be laid between the cylinder 5 and the surface of the blade 2 in order to assist the bending action of the piston 6,7. Seen is also in the mentioned figures, that the holder bar 3 of the holder 1 may be located in the front portion of the blade, while the holder bar 4 should be located in the thereto relatively rear portion of the medial portion 11 of the propeller 2. This location assists the easy deformation or bending of the propeller blade from resting or auto-rotation position 45-C to the helicopter operating position 45-D.

FIG. 49 demonstrates, how I prefer to build my wings or propellers, when they shall be of extremely light weight, but still of great strength. I apply a basic first sheet of metal of fibre, like aluminium or carbon fibre or other suitable material and form it in its length as shown in portion D of the figure. A second sheet of material is formed in the cross-section as shown in portion E of the figure. The second profiled sheet 3 is then inserted into the first profiled sheet 1. It may be rivetted, bolted, or glued to sheet 1, as shown in portion C of the figure. Thereafter portion 11 of profile sheet is bent over profile sheet 2 and glued, rivetted or bolted or otherwise fastened with its end 4 to the other end of the first profile sheet 1. This propeller blade or wing of an aircraft, because this system is not only useable as propeller blades, but also as wings for aircraft, is now visible in portions B and C of the figure. FIG. C is thereby a cross-sectional view through portion B of this figure.

Portion F of the figure demonstrates, that still a greater strength can be added to the wing or propeller arm, by the insertion of a third profile sheet 12. This sheet is cut or formed to the upper portion of portion F of the figure. It is therafter bent to plane portions and inclined portions, which are visible in the bottom figure of figure portion F. The third profile sheet 12 is then fastened into the space between the medial portions 6,7,8 of the second profile sheet 3. Fastening portions 16 may be formed on the inclined portions 14 and 16 of the third profile sheet. They may be bent to fit along the inclined face portions 6 or 8 of the second profile sheet 3. After the third profile sheet 3 is inserted into the space between the medial portions 6,7,8 of the second profile sheet 3, the portions 15 of the third profile are fastened to the medial portion 7 of the second profile sheet 3, while the bent fastening portions 16 of the third profile sheet 12 are fastened to the inclined medial portions 6 and 8 of the second profile sheet 3. The fastening is preferredly done by rivetting or by glueing. With this work done, the medial portion of the second profile sheet 3 is much stengthened and the combined profile sheets 2 and 3 give a rigid structure as shown in figure portion E. The rearward extension 5 of the second profile sheet 3 is formed to fit along the bottom portion 1 of the first profile sheet 1. The forward extension 9 of the second profile sheet 3 is also formed to fit along the respective portion of the bottom portion 1 of the first profile sheet 1. Portions 5 and 9 of the second profile sheet 3 are then fastened to the bottom portion 1 of the first profile sheet 1. The plane portions 13 of the third profile sheet 12 may also become fastened to the bottom portion 1 of the first profile sheet 1 if so desired. The forward extension 9 of the second profile sheet 3 may form on its outermost portion a configuration 10 to fit into the bent portion 2 of profile sheet 1 of figure portion D and it may be fastened thereinto. The feature of this arrangement is first of all the obtainment of a great rigidity and strength at very low weight and low cost. But another feature of the arrangement is also, that all described profile sheets can be cut by single cutting steps to proper profile and size under a respective press. And, which is very important and convenient, the insertion of the third profile sheet into the second profile sheet can be done under a press in respective forms, whereby it becomes easy and possible to glue the sheets properly together or to rivett them without movement of the sheets relatively to each other and without any space between them at their respective adjacent faces. In the same way, the portions 5 and 9 of the second profile sheet 3 can be pressed under a form press onto the respective portions 1 of the first profile sheet 1 and thereby glued together under pressing action or respectively rivetted together. When the combined second and third profile sheets 3 and 12 are fastened to the bottom portion 1 of the first profile sheet 1, the curved front portion 10 of the second profile sheet 3 is also inserted into the inner wall of the curved portion 2 of the first profile sheet 1 and fastened thereto if so desired. It is now easy to press the upper portion 11 of the first profile sheet 1 downwards until it meets the medial upper portion 7 of the second profile sheet 3 and until the outermost end portion 4 of the upper portion 11 of the first profile sheet 1 comes to lay and rest on the outermost end portion 4 of the first profile sheet 1. Here the ends 4 of profile sheet 1 are then either rivetted together by rivets 17 of figure portion B, bolted together there to replace the rivets 17 or the end portions 1 of the first profile sheet 1 are glued together by the then innermost and adjacend faces of the end portions 4 of profile sheet 1. The combined ends 4 of profile sheet 1 are now forming the trailing edge of the propeller arm or of the aircraft wing. The three profile sheets, the first profile sheet 1, the second profile sheet 3 and the third profile sheet 12 are shown in the longitudinal sectional view of figure portion A of FIG. 49. Seen therein is also, how the plane portions 7 and 15 are laying on the upper portion 11 of the profile sheet 1 and how the plane portions 13 of the third profile sheet 12 may lay on the bottom portion 1 of the first profile sheet 1. The figure portion A has a left and a right portion, whereof the left portions shows the sectional view through figure portion E along the arrow A—A and the right portions shows the view through figure portion E along the arrow B—B. Therefore, in the right portion of portion A of FIG. 49 shows also, how the portions 5 and 9 of the second profile sheet 3 will lay on the bottom portion 1 of the first profile sheet 1.

Since the first profile sheet 1 has a certain strength and resistance against deformation itself, the arrangement of FIG. 49 is in many cases satisfactory for low loaded propellers or aircraft wings. Instead of providing a single third profile sheet 12, it is also possible to insert single or individual tapered sheets 14 with or without extended plane portions or curved portions 13 or 15 into the medial space between portions 6,7 and 8 of the second profile sheet 3. When however specific higher resistance of the profile sheet 1 against deformation under heavy relative air speed or load is required, respective fourth and or fifth profile sheets may be inserted into the chambers 25 and/or 26 of the wing or propeller arm of FIG. 49 or 50.

FIG. 50 demonstrates how the flap or resistance body 88 might be assembled to the wing or propeller arm of FIG. 49. The resistance body or drag-flap 88 may correspond in principle to the resistance body 8 of FIGS. 28,29, or 30 to 32. Instead of providing two flaps 8, the FIG. 50 shows, that sometimes it might also be enough to provide a single resistance body or drag flap 88. The figure shows such single flap 88. But it could also be provided with two or more of such resistance bodies or drag flaps 8 or 88. Drag flap 8 of FIG. 50 has an inner portion which forms a pivot bearing portion 21. It is laid around a pivot bar 20. Pivot bar 20 is fastened by extension through tapered portions 14 of FIG. 49 in these tapered portions 14 in FIG. 50. Instead as shown in the figure, the flap 88 may also use a bar 20 as the inner bearing portion, while the wing's profile sheet or sheets may hold the pivot bearing(s) 21. Any other suitable arrangement is also perimissible if the rules of the invention are obeyed. Resistance flap 88 may have as its outremost portion in the rear portion 4 to be laid onto the respective portion 4 of the rear portion of the inner portion of the first profile sheet 1, when the flap 88 will be retracted into the wing or into the propeller's arm.

Bearing faces 11 may be provided in the arrangement to give support to the flap 88, when it retracts into the wing or into the propeller-arm.

Regarding FIG. 49 it is also of interest, that the replacement of the inclined portions 14 of figure portion "F" by inclined and bowed portions 24 of figure portion 49 "G" would still further increase the strength, if such portions are fastened into medial space between 6,7 and 8 of the second body 3 or into spaces 25 or 26 of the propeller arm or wing of FIG. 49.

FIG. 51 shows a longitudinal sectional view through an automatically acting overflow valve. This valve is preferred to be used in machines which use gases as an operatingg fluid and liquids or other gases as a lubrication fluid. For example, in a combustion engine the air or burned gases are used, to operate the device or to be handled in the device. Such gases are commonly not good for sealing and/or lubrication. Liquids, for example, oil, are better for such lubrication and/or sealing purposes. But on the other hand, the periodically changing pressures in the operating gases are required for balancing purposes in some devices of my invention(s). The operation fluids and the lubrication fluids should not mix with one another. Body 1 of the valve of this embodiment of the invention therefore has a chamber 4 with two axially moveable bodies 5 and 10 therein. The first body 10 is a thrust body and it is subjected to the lubrication fluid in chamber 14. The lubrication fluid, which may also act as a sealing fluid, is led from a supply source through passage 9 which should mostly contain a one way check valve 8 into the first chamber 14. This lubrication fluid presses from chamber 14 the thrust piston 10 against the face of the means to be sealed, for example, against body 13. The working gas pressure is led from the working place, for example from the compression or expansion cylinder of a gas-handling device into the chamber 4. Body 3 may close chamber 4 in the outward direction. The gas or fluid may be passed through passage 2 into chamber 4. Thrust body 10 may be provided with a passage 11 to communicate the chamber 14 with a fluid pressure pocket 12 in the other end of thrust body 10. A sealing land (or lands) surround the pocket 12 to prevent escape of sealing fluid thereout. The sealing land is complementary configurated respective to the seal face of the body, for example 13, wherealong it shall seal and thrust. The sealing fluid which is led through passage 9 into chamber 14 and into fluid pressure pocket 14 acts therefore with a respective pressure in pocket 12. This pressure would however likely be the constant pressure of the supply arrangement. But the gas pressure would change periodically often drastically and quickly. The valve of the invention is therefore provided with an overflow arrangement which is a chamber 6 with an outlet 6. When the seal fluid pressure become periodically higher than the gas pressure, the separation piston 5 moves upwards in chamber 4 and opens chamber 14 to exit chamber 6. The seal fluid flows along the bottom of piston 5, which separates the both fluids, into the outflow or overflow arrangement 6. As soon as the gas pressure in chamber 4 becomes higher, the seal piston 5 moves downward again and closes the overflow chamber 6, whereby chamber 14 is closed again. The arrangement may for example, be used for sealing of the arrangements of the invention, for example of rotary valves, pistons or piston shoes of the combustion engines and like of the application. It perfectly supplies the pressure of the gases into the seal fluid containing fluid pressure pockets.

FIG. 52 gives simple calculation formulas for a number of configurations of propellers. These calculations are first estimates and do not claim absolute accuracy. However, the accuracy appears to be close enough for first estimates of the resistances, which are also called drag(s) and for the torques of the respective propellers. Therefrom also the integral medial radii can be found and the power(s) required. These formulas are for example very helpful to design the resistance or drag bodies or flaps 8,88 of the invention, to change a helicopter into a glider, when the engine(s) or power supply(ies) fail. They are also helpful for the calculation of the blades of helicopters generally.

FIG. 52 explains, how I have developed the equations of FIG. 53. Since everything in FIGS. 52 and 53 is written in strictly useable mathematical terms with defined technological sizes and configurations(s), the FIGS. 52 and 53 are self-explanatory and do not require any further description here. If further information is desired, the inventor might be contacted at his permanent residence, which will appear on the applied for patent. It is recommended, to calculate the respective propeller for 1000 RPM. Any other values for other RPM can then be found by multiplying the obtained value with the 2nd power of the fraction (RPM/1000, namely by: $(RPM/1000)^2$.

FIG. 54 explains the basic values of the physics involved with helicopter propellers. Figure portion "B" explains the propeller with its medial chord "B" and with its integral medial resistance and torque responsive integral radius "R". This integral medial radius is o,7 in blades with equal chord "B" but it reaches higher values, for example at up to higher than o,77 in the propeller types 3 of FIG. 52. Figure portion "C" shows the airstream through the propeller, wherefrom the equations and novel results of my co-pending patent application 229,910 are arrived. Figure portions "D" and "E" demonstrate how the situation of figure portion "A" is exchanging, when the axis of the propeller is inclined. "D" shows the range of economic helicopter flight, where the power required is less than in hovering, while portion "C" shows an uneconomic speedy flight range, where the power required is higher than in hovering and much higher than in the economic flight of "D" at lower speed. For the calculation of the propeller usually the angle of attack "delta" of figure portion "A" is to be used. Since however, the propeller at hovering or at vertical flight must also accellerate the airstream of figure portion "C", the propeller will at this stage have to use the angle of attack "alpha". The angle of attack "beta" is then the angle of attack required to accellerate the airstream of figure portion "C". This angle of attack and this power required thereby is commonly much higher, than the angle of attack "alpha" and the power required by it.

When however the helicopter flies forward with a certain forward speed "Vo" the propeller moves out of the downward airstream of figure portion "C" whereby the angle of attack required reduces to "delta". The power required is then drastically reduced and the economic flight range of figure portion "D" is obtained. When a constant pitch of angle "alpha" is used, the RPM of the propeller can be and will be respectively reduced, whereby the power requirement reduces.

FIG. 55 explains, that the rear propeller might still be partially or entirely in the downwash airstream of FIG. 54,C, when the front propeller has already left it. When deciding the medial forward speed of the helicopter this fact should be considered. For example, by adjusting the propeller accordingly, for example, by other angles of FIG. 54,A, than the front propeller. To have an impression of the change of power in forward flight I have considered the movement of the respective propeller out of the propeller downwash airstream of portion "C" of FIG. 54.

FIG. 65 demonstrates the power consumption of a propeller at different angles "gamma" of inclination of the propeller axis in accordance with my estimate-calculation. For more excact details the inventor may be contacted at his residence.

FIG. 57 with the thereto belonging cross-sectional FIGS. 58 and 59 show a piston shoe for very high pressure. Occasionally very high pressures are required especially in hydraulic liquid, for example in oil or water. When the pressure reaches rates of tenthousand or more psi the material of the piston shoes may tire out by the high frequencies of the periodic varyfication of the pressure. At high RPM such tiring may also appear already at the fivethousand psi pressure ranges. That may lead to deformations of the piston shoe's outer face. In other applications of the piston shoe a large area may be required as outer face, for example, when the outer face shall run along a non-rotary piston stroke guide face. The bearing face will then carry only a limited load per size of area. But the centrifugal forces at high RPM may be very high. The embodiment of the invention of these figures therefore applies radial strengtheners 6 to the piston shoe and these may include axial elongations. Thereby the shoe shall overcome the described difficulties of the piston shoes of the former art.

The piston shoe-piston- and rotor-arrangement of FIGS. 57 to 59 therefore demonstrates the following novel arrangement of the invention:

Piston shoe 1 has a medial pivot portion 18 with a pivot face 3. With it the piston shoe 1 is pivotably borne in bed 19 of piston 6 between the piston's radially extending fingers 20. The medial portion of the piston shoe is provided with a recess 12 which extends radially entirely through the piston-shoe's medial portion. The medial portion of the piston shoe is also provided with inclined faces 4 which permit the pivotion of the medial piston shoe portion between the fingers 20 of the piston 6. Without the inclination of the faces 4 the piston shoe could not pivot in the piston. The inclined faces 4 therefore prevent touching of the medial shoe portion with fingers 20 of the piston shoe 1. The rotor 14 has the substantially radial cylinders 15, wherein the piston 6 are reciprocating. Radially of the cylinders and tangentially or peripherially extending therefrom are the radial extensions 17 of the rotor provided. They are however so short in the tangential or peripherial direction of the cylinder or rotor, that they are able to enter into the recess 12 of the piston shoe. The recess 12 of piston shoe 1 is therefore provided in order to receive during operation of the device with rotation of rotor 14 at least temporarily the piston's fingers 20 and the radial extensions 17 of rotor 14 at least partially. By this arrangement a relatively large piston stroke and thereby big power is obtained at a given radial outer size of the device. Rotor 14 has also outformed spaces 7 which are suitably located and configurated to receive at least temporarily the radial strengtheners 6 of the piston shoe 1. Thereby the radial strengtheners 6 can at least partially and at least temporarily be received in the outformed spaces 7 of rotor 14, when the device operates with a revolving rotor 14.

This arrangement of the invention makes it possible for a device with a relatively large piston stroke and a big power at high pressure in fluid, to extend the radial strengtheners 6 of the invention in such a size, that the desired high pressure and power can be obtained, by respective radial and-or axial extension of the strengtheners 6 of the invention. Radial passages 13 may be provided to extend through the piston 16 and through the piston shoe 1 to port into at least 1 or more fluid pressure balancing pocket(s) 8 in the outer face 2 of the piston shoe 1. Unloading recesses 9 are commonly provided to restrict the size of the sealing land(s) 30 which surround and seal the respective fluid pressure pocket(s) 8. Thereby the "unsecure areas" which might or would lead to welding are prevented. Endwards, seen in the direction of movement of outer face 2 and in the thereto opposite direction are then the very big sizeable bearing face portions 10 of the slide face or outer face 2 of the piston shoe 1. These are now capable of either providing support face sections with respective unloading recesses therebetween which lubricate without hydrodynamic pressure fields, or alternatively to serve as hydrodynamic bearing faces, when they are respectively formed and relatively slightly inclined. The piston shoe 1 may also be provided with traction faces 5 for the drawing of the piston shoe and the associated piston in the radial outwards stroke, when faces 5 are guided by a respective traction member. For a good understanding of the embodiment of the invention, FIG. 57 A is a section along the arrowed line of FIG. 58, whereby FIG. 58 is also a sction along the arrowed line A—A FIG. 57. FIG. 59 A partially shows the outer face or portion of piston shoe 1 along the arrowed line B—B of FIG. 57 and partially from top of FIG. 57. FIGS. 59 A,B and C show the piston shoe of the invention in separated demonstrations for a better view onto the decisive configurations. FIG. 59 C is therefore a cross-sectional view thriough FIG. 57-A along line A—A however, exclusivley through the piston shoe 1. FIG. 59 B shows the separated piston shoe 1 as seen from an axial end thereof.

FIG. 60 demonstrates an improvement of the holding arrangement for a piston shoe in a piston. Piston 2 has bearing bed 5 to pivotably bear thereon the pivot portion 3 of piston shoe 1. During pivotion of piston shoe 1 in piston 2 the pivot face 6 of pivot portion 3 of the piston shoe slides along the pivot bed or bed face 5 of the piston. The piston fingers 9 are extending radially from the main body of piston 2 and from bearing bed 5 or from portions thereof. The fingers 9 extend radially beyond the outer face 8 of piston shoe 1. The medial portion 3 of the piston shoe 1, which may have axial extensions 28, is formed in this figure as a cylindrical bar. According to this embodiment of the invention, a holding pin 7 is inserted into the fingers 9 of piston 2 at such a location, that the outer face portion of bar 7 meets the respective outer face portion of medial portion 3 of piston shoe 1. A radial escape of the piston shoe 1 from the piston 2 is thereby prevented. The specific feature of this embodiment of the invention is, that also an escape of pivot face 6 from bed 5 is prevented and no gap can appear between faces 5 and 6. Another feature of this embodiment of the invention is, that the main feature of prevention of a gap between faces 5 and 6 is obtained with little cost and time at manufacturing and thereby be obtained easily and comfortably.

In FIG. 60-C a holding body 10 is inserted between the fingers 7 of the piston and kept therebetween by holding pin 7. Holding body 10 is provided according to the invention with a complementary holding face portion 11 to fit along and hold the outer face portion 8 of the medial portion 3 of piston shoe 1. The face 11 is therefore complementary configured relative to the configuration of the face 8 of the medial piston shoe portion 3. FIGS. 60 A and B are sectional views along the respective arrowed line of the other of the figures.

FIG. 61 demonstrates a still further embodiment of a piston-shoe arrangement to a piston. Medial piston shoe portion 3 pivots around pivot centre 4 as in FIG. 60. A pin 8 is inserted perpendicularily through the medial portion 3 and extended into slots 7 which are provied through the respective portions of piston 2. Since slots 7 extend only radially through piston 2, the piston shoe is prevented by pins 8 in medial portion 3 and in slots 7 from escape from piston 2. In order to maintain a long piston guide, recesses 9 may be cut into the piston shoe portion to permit a good pivotion of shoe 1 in piston 2. Fluid pressure passages 10 may be provided to end in pocket(s) 11 of outer face 12. An escape of the piston shoe from the piston is thereby prevented, while a long piston guide is maintained even at an extensive pivotion of piston shoe 1 in piston 2. If recesses 9 are not provided in the piston shoe, the arrangement can be used for devices with limited piston strokes only, because the piston could then not be as highly radially extended as seen in FIG. 61. The then radially shorter outer portion of piston 2 would at larger piston strokes then lead to welding of the piston on the respective wall of the cylinder wherein the piston reciprocates. Because the guide face relationship between cylinder wall and piston outer face would be too short. This shows how important the provision of recesses 9 is. There are however limitations to the extension of recesses 9, because if they would be made too wide, the strength of the piston shoe 1 would suffer.

In FIG. 62 the pin 8 and recesses 7 of FIG. 61 are replaced by a holding body 10 which is kept by a holding pin 7 in radially extending piston fingers 9. The fingers 9 are radially extended beyond the outer face 12 of the piston shoe to provide holding portions for the holding pin 7 and holding body 10. In order to obtain a suitable holding of the piston shoe in the piston while permitting a good ability of pivotion of piston shoe 1 in piston 2, the medial portion 3 of piston shoe 1 is provided with a part-cylindrical outer face 8 to lay on and slide on a thereto complementary holding face 18 which is provided on holding body 10. The part-cylindrical outer face 8 of the medial portion 3 is ended by face-portions 13 to prevent a too large softening of the strength of piston shoe 1. Inclined faces 44 of the medial portion 3 of piston shoe 1 serve as the inclined faces 4 of FIGS. 58,59. As far as referential numbers are not specifically mentioned, the thereby defined parts are acting similiarily to those of other figures.

The recesses 7 of piston 2 of FIG. 61 may also act as tangential fluid pressure pockets between the outer face of the piston 2 and the respective wall of the cylinder wherealong the piston slides. In such case, control recesses 33 may be provided in the medial portion 3 of piston shoe 1 to control the periodic communication and discommunication of pocket-recesses 7 to and from the passage(s) 10 of piston 2. FIG. 63 shows in a rough schematic how my CCEE coal fuel is manufactured. Natural coal is taken from the coal fields of the earth. It is then pulverized, washed and centrifuged in the centriuagl arrangement of the upper portion of FIG. 63. Therein the coal is cleaned from non-coal particles. The process is several times repeated in finer and finer processes. In the press of the second portion of FIG. 63 the cleaned coal powder is pressed to very highly compressed coal fuel blocs. The bottom portions of FIG. 63 demonstrate, that the CCEE pressed coal fuel has more calories per cubic-centimeter, than typical gasoline. Namely gasoline has about 8 Kcal per cc, while the fuel of my engine has about 14 Kcal per cc.

FIG. 64 demonstrates the combustion cycle of my engine with separated combustion chamber in a P-V diagram which means in a pressure-volume diagram. Therein the states of compression, volumes and pressures are shown. The section lines show the volume of work supplied by the engine at the combustion process.

FIG. 65 shows a spherical view into a cylinder, wherein a piston reciprocates with the stroke "H". The figure is thereby a schematic explaining the action of compression or of expansion in a conpressor or in an expander of my combustion engine or in a separated compressor or expander. The data of pressure, volume and stroke as well as diameter of the piston and piston area "B" are shown in the schematic figure. It is highly desired from the sizes of cylinder and stroke to learn the work or power which the respective piston in a cylinder gives. Such calculation is however complicated and time consuming. Mostly one takes the data from a manufacturing firm, because one seldom has the time to calculate it. I have therefore developed in FIG. 65 in the mathematical portion of the FIG. 65 a method to calculate the medial pressure "$\bar{p}$" of the stroke of the piston in the cylinder from data of end locations of the stroke. By this method it is simple to calculate the power, which the piston stroke gives, by using my equation for "$\bar{p}$" multiplied with the stroke to get the power output or input in Kgcm/sec. Therefrom the HP can be easily found by dividing the result through 7500.

FIG. 66 demonstrates in a diagram data from my calculations. I am attempting either to build new kinds of combustion engines, compressors or expanders or I am attempting to remove the cylinder heads of conventional reciprocating engine and then assemble a cylinder head of my invention to the conventional common combustion engine. Thereby I am either increasing the pressure and thereby the power of the engine, or I am changing the Otto- or Diesel-Engine to my combustion engine with a separated combustion chamber between compressor and expander or between plural compressors and plural expanders.

At change from Otto- or Diesel Cycle to my cycle with separated combustion chamber, it is apparent, that dead space would limit the efficiency of my cycle. Doubts were therefore existing, whether my engine with separated combustion chamber would ever work economically or would ever become economic in oprretation, when applied to reciprocating combustion engines.

Therefore I have calculated the powers and efficiencies and shown the results in the schematic diagram of FIG. 66. Therein "V2" is the volume at the end stage of compression and given in parts of the beginning of the compression. Normally the volume "V1" at beginning of the compression is the atmospheric pressure=1. Therefore 0.20 means an end volume of 20% of "V1", while 0.02 means an end volume of 2% of starting volume "V1". Or, in other words, at the horizontal axis of the diagram the fluid is compressed at 0.2 to one fifth of the atmospheric voulume and at 0.02 to one fiftieth of the atmospheric volume V1.

Considering the handling of the accuracy of piston stroke to be suitable presently for V2=0.14 to 0.08 which is roughly 14 to 30 atmospheres of compression, one sees in FIG. 66, that this compression- and pressure-range is giving an effective engine. If however my engine of FIG. 40 would become realized, the compression ratio might even be rised to 70 atmospheres or more. Then the engine of my separated combustion chamber would be almost equal to the efficiency of the Otto engine. The upper curve in the diagram gives a comparison how many percent of efficiency of the Otto-engine versus my engine with separated combustion chamber will obtain. The curve "$\eta$than" gives the thermal efficiency of my engine with separated combustion chamber.

Another aim of my invention is, to make the engines lighter in weight. That is especially important for flying machines. In the reciprocating combustion engine the heavy expansion-cylinder is also used for the compression. But actually for the compression a lighter arrangement can be used, because the pressure is lower than at peak combustion and the temperature is also lower which permits the use of lighter building material. Since my compressor is separated from the expander, the expander can make two power strokes in my engine, where the conventional fourcycle reciprocating engine makes only one power stroke in two crankshaft revolutions. Comparing now the power of "$\Sigma \bar{p}$" of FIG. 66 one can easily find, that the power of my engine is considerably higher than that of the conventional reciprocating fourstroke engine. Because my power "$\Sigma \bar{p}$" appears twice, when the respective power in the fourstroke conventional engine appears once. At same time my engine is not subjected to the heavy noise of two stroke engines and also not to the relatively low efficiencies of the common two stroke engines.

The diagram of FIG. 66 is thereby worthwhile a consideration and it shows, that my engine can under certain circumstances run economically and give a greater power per weight of the engine.

FIGS. 67 and 68 with the thereto belonging part sectional or separated parts-demonstrating FIGS. 69 to 74 are showing an embodiment of a compact long stroke radial fluid pump, motor, compressor, expander or combustion engine of my invention.

Plural cylinders 1 are arranged in star-form, for example, 2,3,4,5,6,7,9 or other pluralities of cylinders 1. Pistons 2 are reciprocating the the cylinders 1 and may have piston rings 3, which are sealing rings, as in usual engines. Radially inwards the pistons 2 are provided with swing bed faces 5 to bear pivotably therein the piston shoes 4. The piston shoes 4 have outer faces 21 to swing along the bed faces 5 of the pistons 2 and to be borne thereon. The piston shoes also have inner faces 22 which are sliding along the guide faces or piston stroke guide faces 9 of the excentric cam ring(s) 6. The cam 6 is centrically located in the engine housing and either integral with a shaft or mounted on shaft 20 for revolving in respective bearings.

Here a first important arrangement of my invention becomes visible. The cam 6 namely is not a common cam ring, but it has radial slots 7, whereof endwards the outer portions 6 are remaining. The axial outer portions 6 of cam ring 6 have endwards of the medial slots 7 the piston stroke guide faces 9. The stroke guide faces 9 are centrically around an eccentric centre 19 which is visible in FIG. 3. The excentric centre 19 is distanced radially from the centre 18 of the revolving shaft or shaft portion 20. FIGS. 2 and 3 are demonstrating in detail and separately shown the imprtant configuration of cam ring 6 of the invention. The arrangement is important, because without the important slot 7 the engine, compressor or expander could never obtain the large piston stroke in the small space and weight of the engine of the invention.

The next important detail of the invention is closely related to the slot 7 of the cam ring 6. The separate details showing FIG. 69 demonstrates, that the lateral ends of the cylinders 1 are cut off or formed away in the radial inner portions of the cylinder body. Thereby only medial portions 8 of the walls of the cylinders are remaining and they are forming guide portions 8 with guide faces 23, which are extending radially inwardly from the innermost full cylinder portions of cylinders 1. While the engine is described as a multi- or plural-cylinder engine, it could also be a single cylinder engine, compressor or expander. FIG. 70 is a sectional view through FIG. 67 along the arrow B—B. Thereby in FIG. 70 the guide portions 16 with guide portion-faces 23 are clearly visible.

The result of the provision of the slot 7 and of the guide portions 8 of cylinders 1 is, that the guide portions 8 of the cylinders 1 are extending into the slot 7 of the cam ring 6. Thereby the engine obtains its compactness and little weight and space. When the guide portions 8 can not be assembled into the slots 7 of cam ring 6, the cam ring 6 may be built in portions and be assembled along lines 17 of FIG. 72. The word "Stroke" in FIG. 68 demonstrates the very long piston stroke, which is obtained due to the arrangement of guide portions 8 and slots 7 of the invention.

The piston's bearing bed faces 5 which are forming the bearing beds for the piston shoes 4, are provided on the inner portions 26 of the pistons 2. These inner portions are matching the guide portions 8 and are therefore also called the guide fingers 26 of the pistons 2. It will be seen from FIG. 70, that the guide fingers 26 are not necessarily fully circular. On the contrary, they are typically in cross-section only portions of a circle, as FIG. 70 demonstrates. They need only the width of the guide portions 8 in order to be guided with guide finger faces 2 along the guide portion faces 23 of the guide portions 8.

The outer portions 40 of the pistons 2 are those portions, which seal the cylinder chambers 15 and which commonly have the piston rings 3. The inner portion or guide fingers 26 are extending with medial portions 41 into the outer portions 40. Pistons 2 are commonly made of one piece material, whereby the piston portions 26, 41 and 40 are forming together the pistons 2. The respective portions have referential numbers only for explanation of the locations and configurations or effects which they are providing.

In order to assure a smooth slide and run of the pistons 2 and shoes 4, it is preferred to provide fluid pressure pockets in the respective parts with respective suitable locations and dimensioning. For example fluid pressure pockets 27 in the fingers 26 to lubricate and fluid pressure balance the run of finger faces 25 along the guide portion faces 23 of guide portions 8. Pockets 28 between the bed faces 5 and the outer faces 21 of the piston shoes and pockets 29 in the inner faces 22 of the piston shoes to lubricate the pivotion or swing of piston shoe outer faces 21 along the bed faces 23 of piston bed 5 of fingers 26 and to lubricate and pressure balance the inner faces 22 of the piston shoes at their slide along the piston stroke guide faces 9 of the outer cam portions 6. Respective passages, for example, 30, are provided to lead fluid under pressure into the pockets 27 to 29. The fluid which is led into the pockets 27 to 29 is commonly a lubrication oil or emulsion. It may be led into the mentioned pockets 27 to 29 for example through lubrication fluid provider(s) 33 over passages 34,35 or also through passage 42 of FIG. 68 or otherwise.

The purpose of pressure fluid in the mentioned pockets 27 to 29 is not only the lubrication of ajacent and along each other sliding faces, but mainly to counter balance radial and lateral forces of pressures and accellerations. When high pressure acts in the gas in the respective cylinder chamber 15, there will be a high radial load onto the respective piston, 2, piston shoe 4 and cam ring 6. This high load would make a great big friction on the sliding faces. Under the sidewards inclination of the medial angle of attack of the stroke guide face(s) 9 of cam 6 there are also appearing lateral loads onto the piston shoe 4, piston finger 26 and thereby onto the guide portion face 23 of guide portion 8 at times, when the cam 6 revolves from innermost to outermost angular location and vice versa. The pressure in the fluid in the respective pockets 27 to 29 then builds up roughly in the halves of the sealing lands of the faces which surround the pockets and they are building high pressure areas of fluid pressure pockets plus halves of the surrounding sealing lands. The load which is acting out of cylinder spaces 15 or out of accellerations should according to the invention mainly be borne by such fluid pressure areas but not by sliding faces. Accordingly the forces of the pressures in the pressure areas should roughly equalize the forces of the loads, but be contrary directed. The forces of pressure in the pockets-pressure areas are the pressure multiplied by the respective areas. Since the pressure in the gas in the chamber 15 is changing with the stroke of the piston 2 at the respective compression or expansion, the forces of fluid in the pocket high pressure areas should also varify accordingly. Such desire is obtained in several ways in my invention. For example, a passage 31 may be radially extended through the piston 2 to port into the respective cylinder space 15. The pressure in space 15 will then be transfered through passage 30 and the other passages into the respective pockets 27 to 29 respectively, whereby the pressures in spaces 15 and in pockets 27 to 29 would be equalized. A separating piston 32 may be assembled in the respective passage 31 to prevent mixing of the gas of chamber 15 with the lubrication fluid in the respective pockets 27 to 29. This piston 32 may oscillate in passage 31 under the respective loads of pressure. Another system of controlling the fluid flow and pressure to the pockets 27 to 29 is for example through passage(s) 42 from a pressure pump and pressure control device. Still a further possibility is, to supply the fluid through fluid suppliers 33 of FIG. 71, which shows a portion of FIG. 67 in separated sectional view. A pump will supply the fluid into passage 34 of fluid supply body(ies) 33 over passages(s) 35 into the respective pockets and communication passages.

A control device will control the pressure in the so supplied fluid in relation to the pressure which is at that time acting in the gas in the respective chamber 15 of the respective cylinder 1, if so desired.

Since the lateral load of the piston shoe 4 changes extensively during half a revolution of cam ring 6, it is suitable to provide not a single but plural pressure pockets 27 in the piston fingers 26 to lubricate and pressure balance along the guide faces 23 of guide portions 8. The respective pockets 27 are then cummunicated one after the other at timed relation and also discummunicated from the pressure supply alternately with location of angular revolution of cam 6 whereby a stepwise pressure force balancing between the guide portion faces 23 of guide portions 8 and the finger guide faces 16 of piston fingers 26 is obtained.

The cylinders 1 may have respective cooling means 14. A second set of cylinders may be provided axially behind the set shown in FIG. 68. The cylinders of such second set of plural additional sets which might be applied, are partially demonstrated by 13 in FIG. 68. The cylinders 1 may have cylinder heads 12 to contain the inlet and outlet valve means 10,12. The valves 10,12 may be similar to other valves of other of my patent applications or may be similar to valves of other figures of the application. They might also be conventional valves, if the pressure of the engine is not desired to be high. For high performance engines however, either the piston valves of FIGS. 101,102 should applied or the valves should be rotary valves 10,11 as in FIG. 75 or as in FIGS. 114,115,88 with the piston tops formed accordingly in order to prevent dead space in the device.

FIG. 75 demonstrates a similar cross-sectional view through a rotary valve similar to that of FIG. 114. However, while in FIG. 114 the passage 320 was a gas leading passage, the valve of FIG. 35 leads the gas through the port 322 into the inner passage 317 or in a vice versa flow direction. Thereby the hot gases of the engine are now flowing through the interior inner passage 317 of valve 310, whereby the interior outer passages 320,321 can now contain a cooling fluid to prevent deformation of the rotary valve under heat. Thereby the danger of sticking of the rotary valve in the cylinder head is reduced. The valve of FIG. 75 is now similar to that of FIG. 115 of my co-pending patent application 064,248.

FIG. 74 shows the piston 2 of FIGS. 67,68 in a separated view. Shown are the medial portion 41 with the outer and inner end portions 40 and 26. On portion 26 the fingers 26 are formed and have the finger guide faces 16. The bed and bed face 5 are formed with radius 44 around the centre axis 45 of the pivot bed 5. It is important to notice, that the fingers 26 with bed 5 are embracing the piston shoe with more than 180 degrees to prevent escape of the piston shoe 4 out of bed 5. The distance 46 shows the extension of bed face 5 over more than 180 degrees whereby it narrows again after the 180 degrees to hold the respective piston shoe 4 in bed and bed face 5. The upper portion of the figure shows, that the fingers are axially shorter than the diameter of the piston head 40 is, because the fingers need to be guided only on the axially narrow guide portions 8. Thereby the fingers 26 must axially not be much wider than the slots 7 of the rotary cam ring 6. The piston head has commonly piston ring grooves 38 to contain therein the piston rings 3. When rotary valves are assembled in the cylinder head, the top faces of the piston head should have radii 47 according to the outer face radii of the rotary valves. When piston valves are assembled in the cylinder head the top face(s) of the pistons 7 should be flat faces 47 according to FIGS. 1,6,7. At other valves to top faces 47 should have accordingly other configurations.

In order to tract the pistons and shoes radially inwardly, the traction rings 24 of FIG. 71 may be applied. They have inner traction faces 36 which run along traction guide faces 37 of the piston shoes 4. The piston shoes 4 are then tracted radially inwards by the traction rings 24. Since the piston shoes 4 are held in the embracing beds 5 of piston fingers 26, the pistons are forced to move radially inwardly, when the shoes 4 are forced radially inwardly by the traction rings 24. Respective fluid pressure pockets 29 and 39 should be provided between cam ring guide face 9, piston shoe 4 and also between the traction ring traction faces 36 and the piston shoe traction guide faces 37. The pockets should be supplied with respective pressure fluid through respective passages 34,35,30 etc..

FIG. 76 shows a preferred rotary valve of the invention assembled into a cylinder head 12. Rotary valve 10 revolves closely fitting in a respective bore in cylinder head 12. It has a passage or port 48 for the supply of gas into or out of cylinder chamber 15. Port 48 leads the gas into or out of gas passage 49. The rotary valve 10 also has cooling fluid passages 50. Under the load from pressure in cylinder chamber 15 the valve 10 would be pressed on the other side of its outer face against the face of the bore in the cylinder head, wherein the valve 10 revolves. That would lead to friction and wear. To prevent such friction and wear, the cylinder head is diametrically of the cylinder chamber 15 relative to the rotary valve provided with recesses or rooms 51. They are axially distanced from the port and chamber 48 and 15. It is preferred to set two changers 51 per port 48 or per cylinder chamber 15. A thrust piston 52 is radially moveably inserted into the respective room 51. On the inner end it has a slide face with a radius complementary to the radius of the outer face of rotary valve 10. A fluid pressure pocket 53 extends from the said face into the thrust body 52. The chamber 51 is closed in the other radial direction be closing body 54. The gas or pressure of the gas in cylinder chamber 15 is now led through passage 58 through the rotary valve 10 or through the cylinder head 12 into passage 57 and from this passage into the room or rooms 51. The pressure of the chamber 15 is now present in room 51 and presses the respective thrust body 52 against the outer face of the rotary valve 10. The direction of pressing is counter directed relatively to the pressure from cylinder chamber 15 against the rotary valve 10. It is preferred to make the sum of the half sealing lands around the pockets 53 and the pockets 53 equal to the area with which the rotary valve 10 is subjected to pressure out of cylinder chamber 15. The valve 10 is then floating between oppositionally directed equal forces of pressure in fluid. Friction and danger of sticking is drastically reduced or almost fully eliminated.

In order to prevent also here a mixing of the lubrication fluid with the gases of the cylinder chamber 15, a passage body 55 may extend from closure 54 through room 51 and through thrust body 52. It may closely fit in thrust body 52 but permit relative movement between body 55 and 52. A passage 56 extends then through the passage body 55 to lead lubrication fluid from a supply source into the pocket(s) 53. Since passage body 55 seals by close fit in thrust body 52, any mixing of gas of cylinder 15 and lubrication fluid is prevented. A respective control device should adjust the pressure in the lubrication fluid in passage(s) 56 and pocket(s) 53 to be substantially equal or close to that pressure which is at that moment acting in the respective cylinder chamber 15.

FIG. 77 is a longitudinal sectional view through an automatic control device of my invention. Housing 59 has a lubrication fluid inlet 60 and a seat for a valve 64. Valve 64 is axially moveable in its fit in hosusing 59. On one end the valve 64 is subjected to the fluid pressure in inlet 60 and on the other end to the force of a compression spring 65. When the pressure in inlet 60 is stronger in force than the force of spring 65, the valve 64 moves and opens for example by notch 61 the inlet 60 to an outlet 62. The spring 65 is provided in valve chamber 67 wherein a piston 66 is axially moveable and sealed by piston rings or other seals 3. The spring 65 is borne with one end on one end of piston 66. The chamber between the bottom of piston 66 and valve 64 is open to neutral pressure by passage 63. Instead of neutral atmospheric pressure any other pressure may be provided, if so desired. On the top end, which is the other end of piston 66 the chamber 67 is communicated by passage 68 to another pressure source, for example to the cylinder chamber 15.

There are now two forces acting on the valve 65. From one end the force of pressure in inlet 60 which may bring the lubrication fluid. With increase of pressure in chamber 15 and thereby in room 67 in the valve, which now is gas-pressure of the engine, the piston 66 moves towards valve 64 and compresses the spring 65 stronger. It moves oppositely directed when the pressure in the combustion, expansion or compression cylinder chamber 15 is decreasing whereby it then softens the spring force of spring 65. Consequently higher pressure in room 67 sets the opening of valve 64 of inlet 60 to the outlet 62 at a higher pressure. Consequently, the device of FIG. 77, when communicated by passage 68 to the respective cylinder chamber varifies the pressure in the lubrication fluid supply line 60 parallel or equal to the pressure in the cylinder chamber 15. The pressure in the lubrication fluid in the pockets of the engine, pump or compressor now varifies parallel or equal to the pressure in the gas in the respective cylinder chamber 15, when passage 68 is communicated to cylinder chamber 15 and fluid supply line 60 is communicated to the passages to the pockets in the engine, pump or compressor. The valve set of this figure may also be applied for other purposes with other communications.

FIG. 78 demonstrates a cross-sectional view through another embodiment of an engine of my invention.

This engine is especially suitable to bring the high pressure range with the higher efficiency in accordance with the diagram of FIG. 66. The volume (cc) of this engine is especially large and the dead space is extremely small. The engine can thereby run in the high pressure-high efficiency range between 0,1 and smaller "V2" of the diagram of FIG. 66. The high ratio "E" is obtained by a plurality of opposing cylinders which meet at their inner dead points in the centre of the engine.

In the FIG. 4 cylinders 1 are shown with four cylinders 2 reciprocating therein. The cam rings to drive the pistons are in this engine, compressor or expander not provided radially inside of the pistons 2 but radially outside thereof.

The piston heads 40 are in the centre of the figure shown in their innermost location. The cylinder chamber 15 of the combined plural pistons 4 is compressed to almost zero volume 15 in the centre of the figure. The top portion of the figure shows the respective position of the piston finger 26. The bottom of the figure shows the finger 26 in the outermost location in a partial sectional view and the left portion of the figure shows a half-way location of the portion of the piston finger 26 in a partial sectional view. The guide portions of the cylinders 1 are now extending radially outwards, but not radially inwards from the cylinders 1. The fingers 26 of the pistons 2 are now radially outwards of the piston heads 40 and they are guided again with the finger faces 16 along the guide portion faces 23 of the guide portions 8. The fingers 26 have again beds and bed faces 5 to bear thereon the pivotable piston shoes 4. The piston fingers may be fastened to the medial shafts 41 of the pistons 2 by fasteners 71. The fasteners 72 may fasten the pivotable piston shoes 4 to the piston fingers 26 and thereby to the pistons 2 to reciprocate with them in unison. The cam rings 6 are driven by shafts 20 or are integral therewith. They again have the slots 7 and the stroke guide faces 9. Respective traction rings 24 may be provided to tract the piston shoes with or by faces 35 and 36. FIG. 79 shows in detail how the guide portions 8, slot 7, the piston shoe 4, cam ring 6, shaft 20, piston stroke guide faces 9 and the traction rings 24 are working together.

Basically, the engine of this figure is a reversal of the drive mechanism of the engine of FIGS. 67 and 68.

However, this engine, compressor, or expander of FIGS. 78, 79, and also that of FIG. 80 have the great feature of making very high compression ratios possible by the action of plural pistons onto a single central working chamber or cylinder chamber 15 of great difference between the extremities of locations of the plural pistons 2. A seal bottom and guide bottom 7o is provided to one or more of the pistons 2 to form second chambers or second chamber groups 69 which may act as compressors, when the chamber 15 is acting as an expander.

The compressor, expander or engine of FIGS. 80 and 82 is substantially equal in principle to that of FIG. 78. However this engine is most condensed to an extremely small and compact space and weight. It is also simpler than that of FIG. 78. The second chambers or compressor chambers 69 are removed in this engine and so are the guide bottoms 70. Also the traction rings 24 may under certain circumstances be removed. The engine is so compact, that with four cylinders of 60 mm diameter and 40 mm stroke per piston, the centre axes of diametrically located shafts for rotary cams 6 have a distance "dpc" of only about 260 mm. The centre lines of shafts 20 with cam rings 6 are so close together in these figures of this embodiment of the invention, because the second chamber groups 69 of FIGS. 78,79 are spared and so are the piston shaft guiding seal bottoms 70. The pistons 2 and cylinders 1 are thereby radially very short. The guiding of pistons 2 appears only on the piston heads 40 with piston rings 3 and by the piston fingers 26 with finger faces 23 along the guide extension faces 16 guide portions 8. Piston shoes 4 are again borne in beds with faces 5 of the piston inger portions 26. The cams 6 which may be borne on shafts 20 or be integral therewith are again radially outwardly of the pistons and shoes 2 and 4 located, revolved in unison by respective gearing-or chain-means to drive the pistons 2 in their inward strokes and to guide them by stroke guide faces 9 in their outward strokes. Also shown is, that the revolving shafts 20 or cam rings 6 may be borne in respective bearings 73 in holding portions 74. The cam ring portions 6 may be provided with inner recesses 75 to spare weight to permit high revolutions. Counter weights 76 may be associated to cam rings 6 to permit a high speed and smooth running with balanced radial centrifugal forces.

In order to spare the holding of the piston shoes 4 on pistons 2 or in order to save the traction rings 24, and at same time to prevent too high inwards speeds with running of piston heads or piston top faces 40 against each other, the arrangement of FIG. 82 may be provided. In accordance with the arrangement of the invention, the outlet 78 of the interior common cylinder chamber 15 is provided with a pressure setting valve 79. It may be spring loaded by spring 80, be electronically controlled or controlled as in other control devices of my invention(s). Valve 79 will provide a respective pressure in cylinder chamber(s) 15 to stop the radial inwards running of the piston(s) 2 and thereby to prevent the running of piston heads or top faces 40 against each other. FIG. 82 also shows the inlet(s) 77 through which the respective gas for example the gas from the separated combustion chamber, will enter into the cylinder chamber or common cylinder chamber 15.

One of the aims of this arrangement of the invention is, to permit the building of a lower weight and small space, compact engine of high power. The other aim is, to build it most simply and with little cost. Still a further aim of the invention is to permit higher revolutions per unit of time, than piston enginess with crank shafts and conrods can permit. In such common crankshaft—conrod engines the centrifugal forces of the connection rods are preventing very high revolutions because of the big masses and radii of distance from the centre line of the engine.

In the engine, expander or compressor of my invention, the pistons and shoes are of very little mass, they are free from centrifugal forces, the arrangement of the cam ring of FIG. 81 is free of outwardly acting centrifugal forces, free of centrifugal forces acting on bearings, and centrifugal forces acting on bearings, and centrifugal forces are therefore no speed limiting factors in this embodiment of my invention. There are only accelleration forces and lateral forces acting on the pistons, cam rings and shoes. They are balanced by respective fluid pressure forces and for example by the arrangement of FIG. 82. The device of this invention therefore promises high rotary revolutions, high compression ratios, high efficiencies and high power in a device of smallest space, at low cost and with little weight. The device might be suitable for high power low weight and inexpensive aircraft or helicpter engines. The permanent combustion in the separated combustion chamber prevents ignition activities and the dangers of their failures.

The arrangement of the invention of FIG. 83 with the thereto belonging FIGS. 84 to 87 is preferred to be used as a compressor, expander, pump, motor or as an engine. It has a revolving rotor 82 with cylinders 1 extending radially therein. The rotor 82 has a rotor hub (centric bore) 93 to contain therein a non-revolving control body 83 with inlet and outlet passages 86,87 and with inlet and outlet control ports 84,85. The control ports 84 and 85 are aligning alteranately with the respective cylinder spaces 15 as long as they are not closed by the respective control arcs 183 of control body 82. The pistons 2 bear in bed(s) and bed face(s) 5 the piston shoe(s) 4. The piston shoes are running with the outer faces 22 along the piston stroke guide face(s) 9 of excentric cam ring 6. However, the cam ring 6 is not a full body as in the other figures, but a hollow ring wherein the respective inner face(s) 9 is the stroke guide face. Stroke guide face 9 is thereby not the radial outer end of cam ring 6 but the radial inner end of cam ring 6. All pistons and shoes as well as cylinders are thereby radially inwardly of the excentric cam ring 6. The guide portions 8 of the cylinders 1 with the guide portion faces 16 are therefore not extending radially inwardly from cylinders 1 but radially outwdly from the respective cylinders 1. To reduce or prevent dead space, the inner ends of the pistons 4 have faces of a curvature corresponding to the outer face of the control body 83 as shown by 40 in FIGS. 83 and 84. Respective fluid pressure pockets and passages 31,29,27,30 etc. are again provided at the respective parts and locations.

In such devices a radial load is appearing from the control ports 84 and/or 85 between the rotor 82 and the control body 83. That may lead to wearing and sticking. Additionally, since the gases are commonly hot a too small clearance 93 between rotor 82 and control body 83 might lead to sticking by heat expansion. It is therefore the aim of the arrangement of FIGS. 83,86 and 87 to prevent wear and sticking between rotor and control body, to permit a large enough clearance between them and at the same time to reduce the leakage between them. The control body 83 is therefore provided with radial bores 95 which extend into the high pressure passage(s) 86 and communicate therewith. It is preferred to set 2 such bores axially distanced from the ports 84,85 and to open them in a diametrically opposite direction relative to the high pressure control port 84. The invention of this embodiment inserts a respective thrust body 88 into the respective radial bore 95 and subjects it to the high pressure in the high pressure passage(s) 86. Thereby the thrust body 88 is moved radially outwards in bore 88 until it meets with the seal face 96 the inner face of the rotor 82. To prevent leakage through bore 95 out of the high pressure passage(s) 86 the thrust body 88 is provided with piston rings 3 to seal between the thrust body 88 and the wall of the bore 95. Thrust body 88 is radially moveable in bore 95. Bore 95 and thrust body 88 are inexpensive and simple in machining, because of their clear cylindrical configuration. The thrust body 88 has a inner portion 288 and an outer portion 188 with a medial portion 388 of smaller diameter there between. The medial portion 388 has a small diameter order to prevent blocking of flow in the low pressure passage(s) 87. A passage 89 may extend longitudinally through the thrust body 88 to port into the respective balancing fluid pressure pocket(s) 91 in the outer end face 96 of thrust body 88. A fluid separation piston 90 may be provided in passage 89 to prevent mixing of gases and lubrication fluids. A stopper 92 may prevent escape of separation piston 90 from the passage 89. The outer end face 96 is formed with a configuration of a part of a hollow cylinder face, having a radius and configuration corresponding to the inner face of the rotor bore 93 of the rotor 82.

The pressure in high pressure passages 86 presses the thrust bodies 88 away from the passages 86 and against the diametrically opposite portion of the inner face of rotor 82. The sealing lands 96 are portions of the outer face 96 of the thrust body and they are surrounding the fluid pressure pockets 91. Pockets 91 reduce friction between outer face 96 of thrust body 88 and inner face 93 of rotor 82. The sealing lands 96 are subjected to different pressures from their ends whereby they are obtaining a pressure gradient substantially of the half of the high pressure. This pressure gradient appears also in most other sealing lands of pockets of the other imbodiments of the invention. By dimensioning the diameters of the respective portions 288,188 of thrust body 88 and thereby of the bore 95, the friction of sealing lands 96 can become reduced to a minimum.

The result of the arrangement is, that the control body half, which contains the high pressure control port is pressed to close sealing engagement along the respective portion of the inner face of the rotor 82. The leakage flow out of high pressure port 84 is thereby reduced. The pressing action is obtained by dimensioning the cross-sectional areas of thrust body and bore 88, 95 accordingly in order to over-rule the pressure forces in the control port 84 and the surrounding sealing land. The clearance between rotor 82 and the outer face of the control body 83 has thereby obtained a narrow portion 94 which sorrounds the high pressure port 84 and thereby seals it effectively. And a wide portion 93 which is diametrically opposite located. This wide clearance portion 93 is surrounding the low pressure port 85 and does therefore not need to seal against high pressure. The widening of the clearance 93 in this area is therefore not too much restricting the efficiency of the machine. The arrangement of these figures obtains a much higher sealing effect for the control port 84 than it provides leakage by bore 95, thrust bodies 88 or sealing lands 96. The reduction of leakage is very considerable compared to the former art, where the rotor 82 and control body 83 were located centrically relative to each other. Naturally a means to permit radial free movement betwen rotor and control body 82 and 83 must be provided. This is known for example from my U.S. Pat. No. 3,223,046. Compared to the common centric arrangement the eccentric arrangement of the control body of FIGS. 43,46,47 reduces the leakage of gas and of lubrication fluid to a small fraction. Because the narrowing of the clearance width the narrowed portion 94 reduces leakage with the third power of the width of the clearance.

In FIG. 88 another effect of another embodiment of the invention is demonstrated. FIG. 88 is generally the apparatus of FIG. 115. The difference between FIGS. 115 and 88 is, that the rotary valve or any other valve 310 closes the cylinder chamber 309 earlier than valve 310 of FIG. 115. See, that in FIG. 88 the port 312 is already closed, while the port is still open in FIG. 115. In FIG. 88 the valve closes the cylinder chamber 309 before the piston 372 reaches the inner dead point. The result therefore is, that, since the drive mechanismus for piston 372 is still driven by another cylinder and continues to move the piston deeper into the cylinder 11. A second compression, a compression to very high pressure then occurs in cylinder 309 until the piston reaches its inner dead point therein. A fuel or a second fuel is then injected through injector passage 97 into the cylinder chamber 309. At the high compression the temperature in the cylinder is high and ignites the fuel immediately, whereupon the piston 372 becomes driven outwardly in a very strong working stroke under the high pressure in cylinder 11. A gear may be provided on the respective valve for example 310 to permit the work of combustion cycle of FIGS. 114,115 or selectively or automatically the work of second compression of FIG. 88. It is therefore possible by this invention to have a first compression in the compressor and a second compression in the expansion cylinder of FIG. 83. Respectively a first combustion may be occuring in the external separated combustion chamber, while a second combustion and second supply of fuel may occure in the expansion cylinder of FIG. 88. With a respective variable transmission or control arrangement relative to valve 312 or to another valve, the change from the processing of FIGS. 114,115 to that of FIG. 88 and vice versa may become steplessly variable.

FIG. 89 demonstrates in a simplified sectional view a rotary speed responsive control arrangement. Since many actions of the devices of the invention are effected by the rotary angular velocity of the cams or rotors, for example the accelleration forces on pistons or shoes etc. it is desired to have the respective forces controlled in addition to other forces by the running speed of the engine, pump, motor or compressor. Rotary body 98 is running with a speed parallel to the working speed of the engine. This is obtained by a respective mounting. Centrifugal-force responsive weights 100 are pivotable around pins 99 and they have arms 103 which act with increasing speed whereby the weights 100 move in the direction of the arrows, against the inner piston 101 and thereby against the spring 102. The play of opposing forces between spring 102 and responsive weights 100 are moving the piston 101 in body 98. The extension of this movement is then utilized to control the respective device in the engine, compressor, pump or motor. For example, to control the pressure in fluid pressure pockets or overlay the control thereof in relation to the other described forces or details or portions thereof.

Some of the arrangements of the invention may also be used in hydraulic pumps, motors or transmissions. For example the thrust body arrangements of FIGS. 83,86,87, the valves of the invention or the cams, pistons and cylinders, guide portions etc. of the present invention.

FIGS. 90 to 92 show how a typical engine of my considerations to FIGS. 64, 65 and 66 is actually built. It shows basically the compression chamber 1 with piston 2 therein. which delivers the compressed air through passage 6 into the exterior combustion chamber 7. Fuel is supplied thereinto through a fuel inlet 40,43,8 and ignited typically at least once by ignition device 9. 10 to 21 are mixers and cleaners for for air and fuel. The burned or burning fuel-air mixture is passed from the exterior combustion chamber 7 through passages 20,21,58,22 and over valves, for example 24, into the expander chamber of cylinder 25, wherein it drives the power transfer means or piston 26 in the expansion stroke. Valve 27 lets the exhaust gas pass out through exit 28 of the expansion chamber 25. More details of this figure and of this device are explained in my co-pending patent application, Ser. No. 186,587.

FIGS. 93 and 94 demonstrate, how one of my engines can burn coal blocs instead of liquid fuels. These figures are therefore showing how an engine of the system of FIGS. 63 and 64 can be buil in actuality. This engine also uses the principles of FIGS. 65 and 66. Compressor 1 delivers over passage 16 the compressed air into the exterior combustion chamber 3. Cleaning and separation devices 9,10 may be applied. The compressed coal blocs of preparation as in FIG. 63, which may be packed in clean white skins, are stored in the tank or fuel container 19, from which they are supplied by automatons 20,21 to a pulverizer 7, which delivers the pulverized coal to an injection device 18 which transfers the desired amounts of coal fuel into the exterior combustion chamber 3 for burning and heating the air therein to a suitable value of expansion. Through passage 13 the expanding gases are flowing for example over a second cleaning arrangement 11,12 and further through passage 14 into the expander 2. Inlet port 15 suctions the air into the compressor and outlet port 30 exhausts the gases from the expander.

In each of FIGS. 90 to 94 the respective expander is used to supply the power to the outside of the engine for practical power supply to a car, aircraft or other power consuming devices. The expander(s) may however also be used to drive the respective compressor(s) of the respective engine. The engine of FIGS. 93 and 94 is more in detail described in my co-pending application Ser. No. 224,772.

FIG. 95 shows in part in a longitudinal sectional view an improvement of my rotary combustion engines, pumps or compressors. For example, improvements related to my elder Pat. Nos. 3,254,489; or 3,273,342 and also of those of my elder patents which show details of rotary vane machines. These patents are very numerous and therefore not mentioned in detail.

Thus, the pump, compressor, expander or engine portion of FIG. 95 has a rotor 41 with substantially radial slots wherein vanes are guiding inwards and outwards to separated the individually intervane spaces 491 from each other and thereby to periodically increase and decrease the volumes of the respective chambers or intervane spaces 491. According to this embodiment the arrangement employs first and second end walls 403,404 and 405,406 on the medial rotor portion 401 therebetween. At least one of the innermost or first endwalls 403 or 404, or both, are provided with rotary inlet and outlet valves 414,415. Gear means 410 to 413 are provided to revolve the rotary valves in proper timing in relation to the angle of rotation of the rotor arrangement and thereby in relation to the increasing and decreasing of volumes of chambers 491. The rotary valves 414,415 have inlet ports 417 and outlet ports 418, which may be distanced angularily and radially relative to the axes of the respective valves 414,415. Inlet passages 419 supply a respective fluid to the respective valve of the mentioned valves and outlet passages 420 are arranged to exhaust the fluid from the chambers 491 out of the rotor-arrangement or to other chambers in the respective engine. The innermost seal faces 416 of valves 414,415 are closely fitting with the end faces of the medial rotor and aligned with the innermost radially plane faces of the innermost rotor end walls 403 or 404.

By the arrangement of this embodiment of the invention, the radial fluid passages through the medial rotor 401 of my earlier patents are spared and the dead spaces, which resulted therefrom, are prevented. The internal compression losses in fluid of my earlier patents are reduced by the embodiment of the invention. At the same time the arrangement simplifies the production of such rotary compressors, expanders, pumps, motors, engines, hydraulic transmissions and the like and it improves the sealing of the chambers thereof. As a side effect, the power and efficiencies are increased thereby. And the rotary valves 414,415 permit a higher revolution and higher angular velocity of the device.

FIG. 96 demonstrates another aircraft of the invention, in this figure seen from above. Th body 313 is provided with four holders 314 to 317 which form a pair of front holders 314,315 and a pair of rear holders 316,317. The holders are bearing respective pivotable structures 318,319, which on their outer ends carry drive means 307 to 304 to drive respective propellers 305, 306,307 or 308 with substantially vertical axes. Structure portions 320 are also set to the drive means 301,302,303 or 304 respectively and they are incorporated in the arrangement to swing or pivot the drive means 301,302,303 or 304 into or out of the body 313 of the craft. The mentioned drive means 301,302,303,304 carry propellers 305,306,307 or 308 respectively and drive these propellers. The aircraft may have a side rudder 322 and elevateros 324 with drive means 309 to drive propellers 325, and 326 which have substantially horizontal axes. Thereby the aircraft is driven forward. The aircraft also has a pair of wing portions 311 and 312 which form the wing of the craft and extend oppositionally directed laterally away from body 313 and thereby symmetrically to the medial vertical imaginary plane of the body of the craft.

Vertical take off and landing may be effected by pivoting the drive means and propellers 301 to 304 and 305 to 308 out of the body 313 and into the positions as shown in FIG. 96. The propellers 305 to 308 will than bear the craft at substajtially vertical or inclined between vertical and horizontal hovering, ascent or descent. At forward flight with enough forward speed the drive means, structures and propellers 301 to 308 and 314 to 320 are then retracted into the body 313 and the craft flies forward on its wings 311 and 312. The wings 311 and 312 may have ailerons 321.

While sich a convertible aircraft with laterally pivotable propellers is also already shown in FIG. 10, the propeller carrying arms of FIG. 10 are held rather in the middle of the body of the craft, while the propeller discs are swung forward or rearward for retraction into the body. As far as other arrangements may use laterally swingable propeller pairs, they may not be suitable to maintain the stability of the the craft or to obtain the desired maximum of capability to lift with the smallest possible amount of power.

The embodiment of FIG. 96 of the invention deals therefore with the provision of an aircraft, which shall obtain the maximum of capability of lift at vertical ascent and descent with the smallest possible amount of power, while at the same time it shall obtain and maintain stable condition of location in the air during all occuring maneuvers and movements of flight.

The maximim of lift with smallest investment and use of power is obtained thereby, that the craft has at least four propellers with substatial vertical axes located, when fully pivoted out of the body 313 of the craft, firstly laterally of the body 313 and secondly forward and rearward of the wings 311 and 312. Thereby it is assured, that the body and wings are out of the substantially vertically directed air streams of the craftbearing propellers 305 to 308 with their vertical axes. The four propellers diagonally symmetrically located to the vertical medial axes of the body 313 and of respective portions of wings 311,312 and having equal thrusts and lifts, obtaining and maintaining a stable direction of the craft in the air with the wings 311,312 and body 313 substantially parallel to the ground at all conditions of rest and flight in the air. To obtain and maintain the equal thrusts on symmetric locations on the medial portion of the craft, the drive means may be hydraulic motors 301 to 304, obtaining flows of fluid of equal rate of flow through holding portions, which then may be pipes or fluid lines, 318,319, and returning them through means 320 or others.

The problem of such craft is, that the holdings 318 to 320 with holding means 314 to 317 and 320 must be provided at places, where their provision is possible on the body 313 and at same time it must be in accordance with this invention, assured, that the propellers 301 to 304 are away from the body and wings, at time of carrying the craft in order to prevent downwash streams ion the body or wings. The holders 314 and 315 are therefore located in the front portion of the craft, while the holders 316 and 317 are located in the rear portion of the craft. The propellers 305 to 308 and the drive means 301 to 404 together with the respective arms 318,319,320, are pivoted into the medial portion of the body 313. This is seen in FIG. 98, which shows the vertical lift propellers and drive means retracted into the body 313.

FIGS. 97 and 98 show the craft of FIG. 96 seen from the side. FIG. 97 shows it with pivoted out propellers with vertical axes, while FIG. 98 shows it with swand in or retracted drive means and propellers with vertical axes.

The importance of the invention of this embodiment of the nvention consits also therein, that the front propellers with their acessories are located at another hight relatively to the body 313 than the rear propellers are. One finds the front drive means and propellers 301,302,305,306 lower located and the rear drive means and propellers 303,304,307,308 higher located relatively to the body 313 of the craft. This is important, because this makes it possible to pivot propellers 303 to 308 of biggest possible diameters into the medial portion of the body 313. This is seen in FIG. 98 where at retraction into body 313 the rear propellers are located above the front propellers or vice versa. The same applies to the drive means of the front propellers and of the rear propellers of the lift or carry arrangement of propellers with substantially vertical axes. Without locating either the rear pair above the front pair or vice versa the front pair of drive means and propellers above the rear pair respectovely to the body 313 of the craft, it would not be possible to obtain the maximality of diameters of the lift propellers 305 to 308 respectively to the size of a given body 313. Without a maximum of diameter and at least four propellers for lift, which means propellers with substantially vertical axes, the maximum of lift can not be obtained with the smallest amount of power. This is in accordance withe the calculations of my co-pending patent application Ser. No. 229,910. The sum of lift of a set of propellers depends on the number of propellers and the diameter of the propellers at a certain amount of utilization of power. The details thereof, which are very important and which have a very great effect, might be taken from my co-pending patent application No. 229,910 or example from the equations and the lift factor "Ftl" diamgram thereof.

FIG. 99 shows the same craft as FIG. 96 does, and again, seen from above. In FIG. 99 however, the drive means and propellers for the vertical lift arrangement are retracted into the body 313. That means, that they are pivoted into the body 313. The respective means of the arrangement for vertical lift and for carrying of the craft at substantially vertical or inclined ascent and descent are in this figure visible by the dotted lines, which show, that these means are now located inside of the body 313 of the craft and therefore are not directly visible. That is indicated by showing tjem in dotted lines inside of body 313 in FIG. 99.

FIG. 100 shows a portion of the front half or end of the craft of FIG. 96 in a larger scale. In FIGS. 100 and 101 the vertical lift propellers are driven hydrostatically with separated flows of equal rate of flow as in my older patents. The holding housings or bearings 314 hold pivotable vertical or substantially vertical bars or shafts 360, 361. The structure arms 318,319 or each one thereof extend laterally away from said vertical pivotable shafts 360 and thereby away from body 313 when, as in FIG. 100, the lift propellers are pivoted out. The bars 360 and/or the structure arms 318,319 may then be hollow to form fluid flow leading pipes. The drive means 301 to 304 are then fluid motors, which are driven by the flows of fluid through pipes 318 to 320 or some of them. The motor-remote ends of holding arms 320 are in FIGS. 100 and 101 provided with pivot bearing portions 356 which connect the said ends of the arms 320 to the piston shafts 354 or 355 of respective pistons in the respective cylinders 352 or 353. FIG. 101 is a cross-sectional Figure through through FIG. 100 along the arrowed line therein and therefore, most of the means, which are now discussed at hand of FIG. 100 are visible also in FIG. 101 in the respective section. The rear ends of cylinders 352,352 are pivotably borne with their ends 351 on a holding shaft 350.

The mentioned means 314,315,313,360,361,318,319,320,354, 355 and the like of FIG. 100 are also shown in FIG. 101. FIG. 101 demonstrates in addition, that flexible ho es 362 may be mounted to supply fluid into or out of the hollow interiors in bars, shafts or pipes 360 and/or 361. Unstead of flexible hoses repsective pivotable transfer passages may be set. Shown also is in FIG. 101, that the interior(s) of bars, shafts, pipes, 360,361 may be separated by a medial bloc or stopper, sealer 363 to permit entrance flow in one portion of bar 360 or 361 and return flow in the other portion of the respective pivot means 360 or 361. The arrangements of FIGS. 100 and 102 are by way of example only. Modifications are posible, when the gist of the invention of this embodiment of FIGS. 96 to 99 is obeyed. Piston rods 354 and 355 may together with the fluid pressure supplied into the respective chambers in cylinders 352 and 353 effect the control of the retraction of the lift means and of the pivote-out operation of the lift means of the four propellers with the substantial vertical axes and the drive and holding means thereof. A corresponding arrangement as in FIGS. 100 and 101 may be also applied for the rear arrangements of lift propellers of the craft of FIGS. 96 to 99.

FIGS. 102 and 103 demonstrate the practical application of an example of the arrangement of FIG. 2 of the invention. A boot, ship or serf-board 370 holds a mast 376 which is provided with the first propeller 374. This propeller is directed with its axes parallell to the flow of the air or to the wind. For safety it is arranged in a fan-housing or safety net 375. Through shaft or mast 376 extends the shaft 3 of FIG. 2 over a further angular gear means 381 towards a shaft 378 which carries the propeller 5. Propeller 5 is now in the water. While propeller 374 is driven by the wind, the propeller 379 is inside of the water 380 and drives the body 370 of the vehicle. Respective gears and shafts are provided between the driven propeller 374 and the driving propeller 379. The driven propeller 374 corresponds now in principle to the first propellers 1 to 4 or of one thereof and the driving propeller 370 corresponds now in principle to the propellers 5 of FIGS. 1 to 3 or of one thereof.

A platform may be provided on a sled to comfort the use of the vehicle as a wind-surfer. For example, sled 373 may be longitudinally adjustable along the body 370. The sled 373 may carry a rotary playform 372 which may be pivotable or rotatable on sled 373 or on body 370. The respective shafts, gears or other transmission means may transfer the power from the driven propeller 374 to the driving propeller 379, for example over mast 376 and shaft 378 and respective gears, clutches or couplings, while the mentioned power may also be driven through the sled 373 and/or the platform 372.

FIGS. 104 to 107 demonstrate an embodiment of the invention, which shows a retractable propeller 200 in a portion 2008 of a wing or of a body. The fluid pipes 6,7,8 of FIG. 105 hold a housing 2011 with an interior space 2012. Housing 2011 may be fastened to the ends and flanges 13 of the pipes or fluid lines 6,7,8. A fluid motor 2004 may be axially moveable in housing 2011 or in a housing 2003. Flexible hoses or fluid lines 2006 and 2007 may extend to the fluid motor 2004 to drive the shaft thereof and to permit the axial movement of the motor in the housing. Housing 2011 bay be provided inside of the hollow interior of the wing or body 2008. The shaft 2001 of the motor 2004 holds and revolves a propeller 200. The wing or body 2008 is provided with a compartment slot 2009. When the propeller 200 is set to rest, the fluid motor 2004 is tracted rearwards in the housing 2003 or 2011–2012 until the propeller 200 if fully retracted into the compartment slot 2009 to come to rest therein. It is suitable to form the cross-sectional area of the compartment slot to correspond substantially to the cross-sectional area or the blade of the propeller 200. See hereto FIG. 106. The arms of the propeller 200 are set into zero position, which is the angle of attack of roughly ninety degrees to permit the propeller blades to enter into the slotcompartment 2009 comfortably.

FIG. 108 demonstrates in a longitudinal sectional view a pre-combustion or pre-injection device of the invention. A first fluid or powder is injected from injector 2028 through channel 2029 into the pre-mixing-chamber 2022. A second fluid or powder is added to said first fluid or powder and mixed with it in pre-chamber 2022 by supplying the second fluid or powder by pistons 2026 which are driven in cylinders 2025 by shafts 2027 over jets 2024 or over nozzles 2024 into the pre-chamber 2020. The so mixed first an d and second fluids or powders may then flow in unison out of injection nozzle or burner 2021. The system is es ecially suitable to inject poweder, slurry, coal, water or other mixtures into engines or to utilize a pre-burning in chamber 2022 in housing 2020 to increase the pressure in the mixture and thereby to increase the force of injection or supply through nozzle 2021.

FIG. 109 demonstrates a further embodiment of the invention.

An intake assage 430 is provided before a burning chamber 1414 in the wing or in a combustion providing drive flame arrangement of a craft. Fuel is injection into jet or combustion chamber 414 through injectors 414. When wing or body 403 moves forward in the air, ram air is entered through inlet passage 430 into the ram jet engine space 1414 as long as the forward speed is high. When there is not a high forward speed the compressor blades 423 are driven by a fluid motor or engine 405 inside of a tube 2042. The tube 2042 may be transferred by actuator or drive means 2041 alternatingly into and out of entrance passage 430 in dependance on the forward speed of the body 403 or in dependance on the pilots control action.

What is claimed, is:

1. A propeller consisting substantially of a rigid single body, having a medial portion and two arms of propeller blades which extend substantially radially from said medial portion, one of said arms in one radial direction and the other of said arms in the thereto opposed other radial direction, with said arms having cross-sectional areas which form airfoil sections while said medial portion of said propeller is borne by a revolvable shaft which has a passage communicated with its first end to a fluid under pressure and with its other end to a space which is provided in said medial portion of said propeller to supply fluid under pressure into said space in said medial portion;
   wherein each of said arms is provided individually with a cylinder and a piston reciprocable in said cylinder;
   wherein said pistons are subjected temporarily and in unison to a variable pressure in fluid which is supplied by said fluid under pressure through said shaft;
   wherein said arms are of slightly plasticly deformable material in the plastically deformable range of said material by which said material provides a resistance against deformation;
   wherein said pistons on said cylinders are used in unison to act at equal times against said resistance to overcome portions of said resistance to slightly deform said arms, by which to change the inclinations and thereby the angles of attack of said airfoil sections of said arms of said propeller,
   wherein said propeller is provided with an interior space which extends from said medial portion into said arms,
   wherein said cylinders and pistons are located in said interior space,
   wherein said pistons are subjected to springs which are located in said interior space and force said pistons towards the middle of said interior space,
   wherein said fluid from said shaft is supplied into said cylinders medially inwards of said pistons and acts contrary directed to said action of said springs against said springs, and;
   wherein relative inclined walls are provided on said interior spaces and portions of shafts of said pistons which meet said inclined walls, by which to thrust under said pressure in said fluid against said inclined walls thereby to bow the outer portions of said arms of said propeller while said arms return under their inner stresses to their unbowed configuration when said pressure decreases.

* * * * *